US012654355B2

(12) United States Patent (10) Patent No.: US 12,654,355 B2
Graham et al. (45) Date of Patent: Jun. 16, 2026

(54) COEXTRUDED HEMP COMPOSITE BOARD

(71) Applicants: John D. Graham, Portland, OR (US);
John J. Bradley, Harlingen, TX (US)

(72) Inventors: John D. Graham, Portland, OR (US);
John J. Bradley, Harlingen, TX (US)

( * ) Notice: Subject to any disclaimer, the term of this
patent is extended or adjusted under 35
U.S.C. 154(b) by 0 days.

(21) Appl. No.: 18/278,984

(22) PCT Filed: May 26, 2023

(86) PCT No.: PCT/US2023/023777
§ 371 (c)(1),
(2) Date: Aug. 25, 2023

(87) PCT Pub. No.: WO2024/054266
PCT Pub. Date: Mar. 14, 2024

(65) Prior Publication Data
US 2025/0196394 A1 Jun. 19, 2025

Related U.S. Application Data

(60) Provisional application No. 63/443,324, filed on Feb.
3, 2023, provisional application No. 63/404,344, filed
on Sep. 7, 2022.

(51) Int. Cl.
*B27N 3/28* (2006.01)
*B27N 1/00* (2006.01)
(Continued)

(52) U.S. Cl.
CPC ................. *B27N 3/28* (2013.01); *B27N 1/00*
(2013.01); *B32B 3/06* (2013.01); *B32B 15/10*
(2013.01);
(Continued)

(58) Field of Classification Search
CPC .... B27N 1/00; B27N 3/28; B32B 3/06; B32B
15/10; B32B 17/062; B32B 21/02;
(Continued)

(56) References Cited

U.S. PATENT DOCUMENTS 5,891,374 A 4/1999 Shah et al.
2009/0181207 A1* 7/2009 Michalik ................. B29C 48/07
264/176.1

(Continued)

*Primary Examiner* — Catherine A. Simone
(74) *Attorney, Agent, or Firm* — AdamsIP, LLC; Edward
Brinkley Garner, III; James Hunter Adams

(57) ABSTRACT

A co-extruded hemp composite board (CHB) is provided.
By combining hemp feedstocks with virgin and/or recycled
binder materials and subsequently coextruding them into a
coextruded extrudate sheet, an environmentally friendly
alternative to traditional construction materials is created.
Secondary feedstocks and waste products from other pro-
duction streams may be added during the coextrusion pro-
cess to enhance the physical characteristics of the coex-
truded extrudate sheet as well to reduce waste/cost of
production and create a more environmentally friendly con-
struction material. The coextruded extrudate sheet produced
using such materials possesses superior physical properties
when compared to traditional construction materials due to
the structural characteristics of dispersed hemp feedstocks;
the complete encapsulation of hemp feedstocks in the binder
material; and the lower hygroscopic and higher pest resis-
tance properties of hemp feedstocks. A downstream extru-
sion arrangement may be used to pattern the extrudate sheet
and/or create molded shapes that are difficult to achieve in
traditional construction materials, increasing the customiza-
tion potential of finished CHB products relative to tradi-
tional construction materials.

21 Claims, 40 Drawing Sheets

(51) Int. Cl.

| | |
|---|---|
| *B32B 3/06* | (2006.01) |
| *B32B 15/10* | (2006.01) |
| *B32B 17/06* | (2006.01) |
| *B32B 21/02* | (2006.01) |
| *B32B 21/04* | (2006.01) |

(52) U.S. Cl.

CPC ............ *B32B 17/062* (2013.01); *B32B 21/02* (2013.01); *B32B 21/042* (2013.01); *B32B 21/045* (2013.01); *B32B 2260/021* (2013.01); *B32B 2260/046* (2013.01); *B32B 2262/065* (2013.01); *B32B 2264/065* (2013.01); *B32B 2307/746* (2013.01); *B32B 2607/00* (2013.01)

(58) Field of Classification Search

CPC ................ B32B 21/042; B32B 21/045; B32B 2260/021; B32B 2260/046; B32B 2262/065; B32B 2264/065; B32B 2307/746; B32B 2607/00; E04F 15/02038

See application file for complete search history.

(56) References Cited

U.S. PATENT DOCUMENTS

| | | | |
|---|---|---|---|
| 2012/0046394 A1* | 2/2012 | Lu ......................... | B29C 70/506 264/103 |
| 2014/0329060 A1 | 11/2014 | Vivier et al. | |
| 2019/0003189 A1* | 1/2019 | Döhring ................. | B32B 5/022 |
| 2019/0270263 A1 | 9/2019 | Mukherji | |

* cited by examiner

1200

Fiber and Binder / View From Transverse Direction
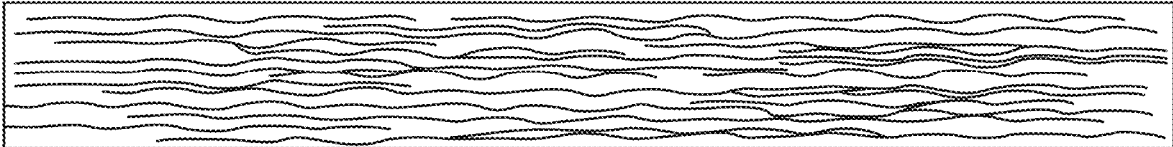
Hurd and Binder / View From Transverse Direction
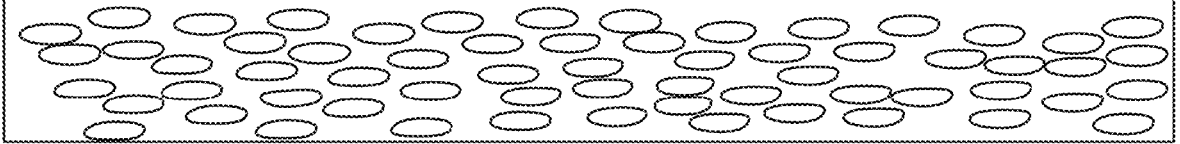
Fiber, Hurd and Binder / View From Transverse Direction
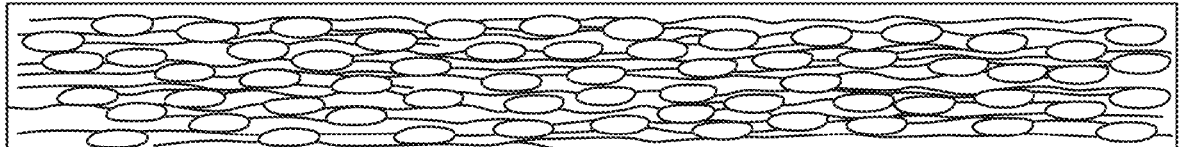
Fiber / View From Top of Board Fibers Will Orient
In The Machine Direction, But
Overlap Creating Strength
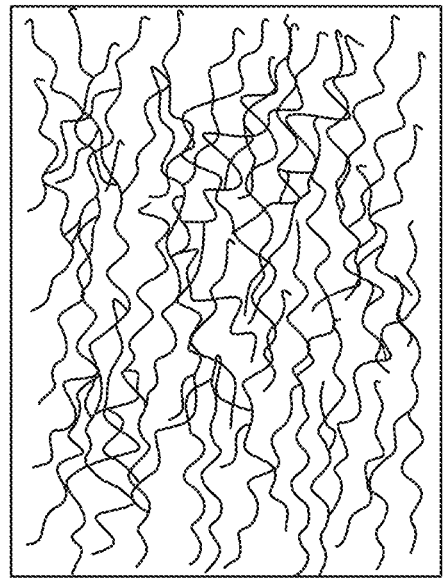
FIG. 15

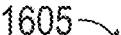
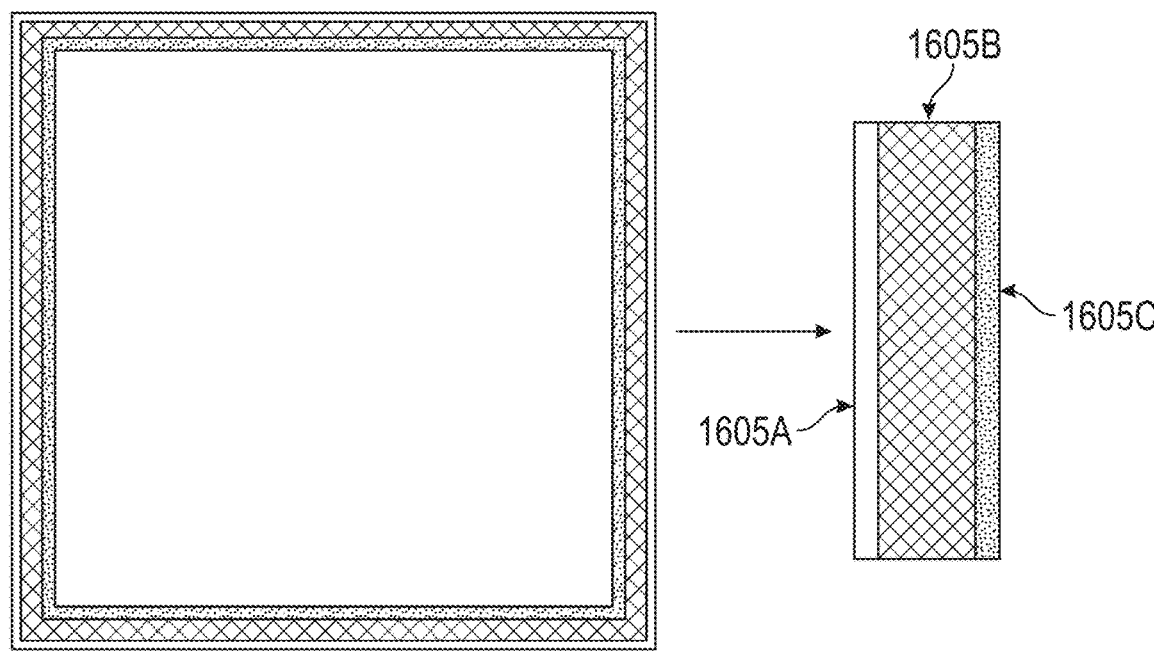
FIG. 16

| TOTAL BOARD THICKNESS "INCHES" | BOARD | COEXTRUDED LAYER (I.E. "LAYER 1 OF 5") | BINDER TYPE | % BINDER | HEMP TYPE | % HEMP TYPE | ADDITIVES | ATTRIBUTE BY LAYER | THICKNESS |
|---|---|---|---|---|---|---|---|---|---|
| 1/4" | 1 | LAYER 1 | THERMOPLASTIC (VIRGIN / RECYCLED / OR BOTH) | 40% TO 95% | FIBER, HURD, OR BOTH | 5% TO 60% | TIO2 (WHITE PIGMENT) | PUNCTURE RESISTANCE / WHITE COLOR ON INSTALL | 1/8" |
| 1/4" | 1 | LAYER 2 | THERMOPLASTIC (VIRGIN / RECYCLED / OR BOTH) | 40% TO 95% | FIBER, HURD, OR BOTH | 5% TO 60% | FLAME RETARDANT / GREEN PIGMENT OR CARBON BLACK PIGMENT | STIFFNESS AND FLAME RETARDANCY | 1/8" |
| 3/8" | 2 | LAYER 1 | THERMOPLASTIC (VIRGIN / RECYCLED / OR BOTH) | 40% TO 95% | FIBER, HURD, OR BOTH | 5% TO 60% | TIO2 (WHITE PIGMENT) | PUNCTURE RESISTANCE / WHITE COLOR ON INSTALL | 1/8" |
| 3/8" | 2 | LAYER 2 | THERMOPLASTIC (VIRGIN / RECYCLED / OR BOTH) | 40% TO 95% | FIBER, HURD, OR BOTH | 5% TO 60% | FLAME RETARDANT / GREEN PIGMENT OR CARBON BLACK PIGMENT | STIFFNESS AND FLAME RETARDANCY | 1/4" |
| 1/2" | 3 | LAYER 1 | THERMOPLASTIC (VIRGIN / RECYCLED / OR BOTH) | 40% TO 95% | FIBER, HURD, OR BOTH | 5% TO 60% | TIO2 (WHITE PIGMENT) | PUNCTURE RESISTANCE / WHITE COLOR ON INSTALL | 1/8" |
| 1/2" | 3 | LAYER 2 | THERMOPLASTIC (VIRGIN / | 40% TO 95% | FIBER, HURD, OR BOTH | 5% TO 60% | FLAME RETARDANT | STIFFNESS AND FLAME RETARDANCY | 1/4" |

FIG. 18A

| | # | Layer | Material | % | Reinforcement | % | Additive | Property | Thickness |
|---|---|---|---|---|---|---|---|---|---|
| 1/2" | | | RECYCLED / OR BOTH) | 40% TO 95% | FIBER, HURD, OR BOTH | 5% TO 60% | FLAME RETARDANT / GREEN PIGMENT OR CARBON BLACK PIGMENT | PUNCTURE RESISTANCE | 1/8" |
| 1/2" | 3 | LAYER 3 | THERMOPLASTIC (VIRGIN / RECYCLED / OR BOTH) | 40% TO 95% | FIBER, HURD, OR BOTH | 5% TO 60% | FLAME RETARDANT / GREEN PIGMENT OR CARBON BLACK PIGMENT | PUNCTURE RESISTANCE | 1/8" |
| 1/2" | 4 | LAYER 1 | THERMOPLASTIC (VIRGIN / RECYCLED / OR BOTH) | 40% TO 95% | FIBER, HURD, OR BOTH | 5% TO 60% | TI02 (WHITE PIGMENT) | PUNCTURE RESISTANCE / WHITE COLOR ON INSTALL | 1/8" |
| 1/2" | 4 | LAYER 2 | THERMOPLASTIC (VIRGIN / RECYCLED / OR BOTH) | 40% TO 95% | FIBER, HURD, OR BOTH | 5% TO 60% | FLAME RETARDANT | STIFFNESS AND FLAME RETARDANCY | 1/4" |
| 1/2" | 4 | LAYER 3 | THERMOPLASTIC (VIRGIN / RECYCLED / OR BOTH) | 40% TO 95% | FIBER, HURD, OR BOTH | 5% TO 60% | FLAME RETARDANT / GREEN PIGMENT OR CARBON BLACK PIGMENT | PUNCTURE RESISTANCE | 1/8" |
| 5/8" | 5 | LAYER 1 | THERMOPLASTIC (VIRGIN / RECYCLED / OR BOTH) | 40% TO 95% | FIBER, HURD, OR BOTH | 5% TO 60% | TI02 (WHITE PIGMENT) | PUNCTURE RESISTANCE / WHITE COLOR ON INSTALL | 1/8" |
| 5/8" | 5 | LAYER 2 | THERMOPLASTIC (VIRGIN / RECYCLED / OR BOTH) | 40% TO 95% | FIBER, HURD, OR BOTH | 5% TO 60% | FLAME RETARDANT | STIFFNESS AND FLAME RETARDANCY | 3/8" |

FIG. 18B

| | | | | | | | | | |
|---|---|---|---|---|---|---|---|---|---|
| 5/8" | 5 | LAYER 3 | THERMOPLASTIC (VIRGIN / RECYCLED / OR BOTH) | 40% TO 95% | FIBER, HURD, OR BOTH | 5% TO 60% | FLAME RETARDANT / GREEN PIGMENT OR CARBON BLACK PIGMENT | PUNCTURE RESISTANCE | 1/8" |
| 5/8" | 6 | LAYER 1 | THERMOPLASTIC (VIRGIN / RECYCLED / OR BOTH) | 40% TO 95% | FIBER, HURD, OR BOTH | 5% TO 60% | TI02 (WHITE PIGMENT) | PUNCTURE RESISTANCE / WHITE COLOR ON INSTALL | 1/8" |
| 5/8" | 6 | LAYER 2 (FOAMED) | THERMOPLASTIC (VIRGIN / RECYCLED / OR BOTH) | 50% TO 95% | FIBER, HURD, OR BOTH | 5% TO 50% | FLAME RETARDANT, FOAMING AGENT | STIFFNESS AND FLAME RETARDANCY | 1/2" |
| 3/4" | 7 | LAYER 1 | THERMOPLASTIC (VIRGIN / RECYCLED / OR BOTH) | 40% TO 95% | FIBER, HURD, OR BOTH | 5% TO 60% | TI02 (WHITE PIGMENT) | PUNCTURE RESISTANCE / WHITE COLOR ON INSTALL | 1/8" |
| 3/4" | 7 | LAYER 2 (FOAMED) | THERMOPLASTIC (VIRGIN / RECYCLED / OR BOTH) | 50% TO 95% | FIBER, HURD, OR BOTH | 5% TO 50% | FLAME RETARDANT, FOAMING AGENT | STIFFNESS AND FLAME RETARDANCY | 5/8" |

FIG. 18C

| | | | | | | | | |
|---|---|---|---|---|---|---|---|---|
| LAYER 1 | 8 | THERMOPLASTIC (VIRGIN / RECYCLED / OR BOTH) | 40% TO 95% | FIBER, HURD, OR BOTH | 5% TO 60% | TiO2 (WHITE PIGMENT) | PUNCTURE RESISTANCE / WHITE COLOR ON INSTALL | 1/8" | 1" |
| LAYER 2 (FOAMED) / WITH A .5 INCH DEEP BY 1.5 INCH WIDE CHANNEL TO ACCEPT DRYWALL INTO RECESS MILLED INTO BOARD (SEE DRAWING) | 8 | THERMOPLASTIC (VIRGIN / RECYCLED / OR BOTH) | 50% TO 95% | FIBER, HURD, OR BOTH | 5% TO 50% | FLAME RETARDANT, FOAMING AGENT | STIFFNESS AND FLAME RETARDANCY, SECONDARY PROCESSING TO ADD CHANNEL | 7/8" | 1" |

(TABLE 1)

FIG. 18D

| TOTAL BOARD THICKNESS "INCHES" | BOARD | COEXTRUDED LAYER (I.E. "LAYER 1 OF 5") | BINDER TYPE | % BINDER | HEMP TYPE | % HEMP | ADDITIVES | ATTRIBUTE BY LAYER | THICKNESS |
|---|---|---|---|---|---|---|---|---|---|
| .5" | 9 | LAYER 1 | THERMOPLASTIC (VIRGIN / RECYCLED / OR BOTH) | 40% TO 95% | FIBER, HURD, OR BOTH | 5 TO 60% | TIO2 (WHITE PIGMENT) | PUNCTURE RESISTANCE / WHITE COLOR ON INSTALL | 1/8" |
| .5" | 9 | LAYER 2 PREVIOUSLY EXTRUDED, FOAMED BOARD, FED THROUGH EXTRUDER | THERMOPLASTIC (VIRGIN / RECYCLED / OR BOTH) | 50% TO 95% | FIBER, HURD, OR BOTH | 5 TO 50% | FLAME RETARDANT, FOAMING AGENT | STIFFNESS AND FLAME RETARDANCY. | 1/4" |
| .5" | 9 | LAYER 3 | THERMOPLASTIC (VIRGIN / RECYCLED / OR BOTH) | 50% TO 95% | FIBER, HURD, OR BOTH | 5 TO 50% | CARBON BLACK FROM NATURAL SOURCES | PUNCTURE RESISTANCE AND PROTECTIVE LAYER, UV RESISTANCE | 1/8" |
| 1" | 10 | LAYER 1 | THERMOPLASTIC (VIRGIN / RECYCLED / OR BOTH) | 40% TO 95% | FIBER, HURD, OR BOTH | 5 TO 60% | TIO2 (WHITE PIGMENT) | PUNCTURE RESISTANCE / WHITE COLOR ON INSTALL | 1/8" |
| 1" | 10 | LAYER 2 PREVIOUSLY EXTRUDED, FOAMED BOARD, FED THROUGH EXTRUDER | THERMOPLASTIC (VIRGIN / RECYCLED / OR BOTH) | 50% TO 95% | FIBER, HURD, OR BOTH | 5 TO 50% | FLAME RETARDANT, FOAMING AGENT | STIFFNESS AND FLAME RETARDANCY. | 1/2" |

FIG. 19A

| | | | | | | | | | |
|---|---|---|---|---|---|---|---|---|---|
| 1" | LAYER 3 HEMP FABRIC NON-WOVEN LAYER FED FROM ROLL | 10 | THERMOPLASTIC (VIRGIN / RECYCLED / OR BOTH) | | | | | 1/8" | ADDED FOR INCREASED TENSILE STRENGTH OF THE BOARD, INCREASED EDGE STRENGTH, AND INCREASED DEFLECTION STRENGTH |
| 1" | LAYER 4 | 10 | THERMOPLASTIC (VIRGIN / RECYCLED / OR BOTH) | 50% TO 95% | FIBER, HURD, OR BOTH | 5 TO 50% | CARBON BLACK FROM NATURAL SOURCES | 1/4" | PUNCTURE RESISTANCE AND PROTECTIVE LAYER, UV RESISTANCE |

(TABLE 2)

FIG. 19B

| LAYER NUMBER | LAYER THICKNESS | Attribute | OSB | Floor Board #1 | Floor Board #2 | Floor Board #3 | Floor Board #4 | Floor Board #5 | Floor Board #6 | KEY PERFORMANCE ADDITIVES PER LAYER (INCLUDING BUT NOT LIMITED TO) | FEATURES BASED ON PREFERRED EMBODIMENTS, OR FOR EXAMPLES, (INCLUDING BUT NOT LIMITED TO THE FOLLOWING) MAY INLCUDE BASED ON APPLICATION |
|---|---|---|---|---|---|---|---|---|---|---|---|
| 1 | 1/8" | Board Thickness (in.) | 5/8" | 5/8" | 5/8" | 5/8" | 5/8" | 5/8" | 5/8" | EXAMPLES | |
| 1 | 1/8" | Binder Material (% by volume) | ~5% to ~10% | ~30% to ~40% | ~40% to ~50% | ~50% to ~60% | ~60% to ~70% | ~70% to ~85% | ~85% to ~95% | IMPACT MODIFIERS | "CROSS MICRO GROOVING" FOR INCREASED ADHESION OF GLUES, MASTICS, AND OTHER METHODS OF ADHESION OF FLOORING TILES, AND FLOOR FINISHES |
| | | | | | | | | | | COLOR PIGMENTS | |
| 1 | 1/8" | Hemp Feedstock (% by volume) | ~90% to ~95% | ~60% to ~70% | ~50% to ~60% | ~40% to ~50% | ~30% to ~40% | ~15% to ~30% | ~5% to ~15% | PARTICLE DIAMETER ~2 TO ~500 MICRON | |
| | | | | | | | | | | PARTICLE LENGTH ~2 TO ~3500 MICRON | |
| 2 | 1/4" | Binder Material (% by volume) | ~5% to ~10% | ~30% to ~40% | ~40% to ~50% | ~50% to ~60% | ~60% to ~70% | ~70% to ~85% | ~85% to ~95% | FLAME RETARDANTS | IN A PREFERRED EMBODIMENT (INCLUDING BUT NOT LIMITED TO THE FOLLOWING, ALONE OR IN COMBINATION) PREVIOUSLY EXTRUDED, FOAMED BOARD, FED THROUGH EXTRUDER, OR NON WOVEN HEMP LAYER FED THROUGH EXTRUDER. |
| | | | | | | | | | | BONDING AGENTS | |
| 2 | 1/4" | Hemp Feedstock (% by volume) | ~90% to ~95% | ~60% to ~70% | ~50% to ~60% | ~40% to ~50% | ~30% to ~40% | ~15% to ~30% | ~5% to ~15% | PARTICLE DIAMETER ~20 TO ~1500 MICRON | |
| | | | | | | | | | | PARTICLE LENGTH ~20 TO ~7000 MICRON | |
| 3 | 1/4" | Binder Material (% by volume) | ~5% to ~10% | ~30% to ~40% | ~40% to ~50% | ~50% to ~60% | ~60% to ~70% | ~70% to ~85% | ~85% to ~95% | COLOR PIGMENTS | |
| | | | | | | | | | | IMPACT MODIFIERS | |

FIG. 20A

| | Hemp Feedstock (% by volume) | ~90% to ~95% | ~60% to ~70% | ~50% to ~60% | ~40% to ~50% | ~30% to ~40% | ~15% to ~30% | ~5% to ~15% | PARTICLE DIAMETER ~20 TO ~1500 MICRON |
|---|---|---|---|---|---|---|---|---|---|
| 3 | 1/4" | | | | | | | | PARTICLE LENGTH ~20 TO ~7000 MICRON |

(TABLE 3)

FIG. 20B

| LAYER NUMBER | LAYER THICKNESS | Attribute | OSB | Floor Board #7 | Floor Board #8 | Floor Board #9 | Floor Board #10 | Floor Board #11 | Floor Board #12 | KEY PERFORMANCE ADDITIVES PER LAYER (INCLUDING BUT NOT LIMITED TO) | FEATURES BASED ON PREFERRED EMBODIMENTS, OR FOR EXAMPLES, (INCLUDING BUT NOT LIMITED TO THE FOLLOWING) MAY INLCUDE BASED ON APPLICATION |
|---|---|---|---|---|---|---|---|---|---|---|---|
| 1 | 1/4" | Board Thickness (in.) | 3/4" | 3/4" | 3/4" | 3/4" | 3/4" | 3/4" | 3/4" | EXAMPLES | |
| | | Binder Material (% by volume) | ~5% to ~10% | ~30% to ~40% | ~40% to ~50% | ~50% to ~60% | ~60% to ~70% | ~70% to ~85% | ~85% to ~95% | IMPACT MODIFIERS | "CROSS MICRO GROOVING" FOR INCREASED ADHESION OF GLUES, MASTICS, AND OTHER METHODS OF ADHESION OF FLOORING TILES, AND FLOOR FINISHES |
| 1 | 1/4" | Hemp Feedstock (% by volume) | ~90% to ~95% | ~60% to ~70% | ~50% to ~60% | ~40% to ~50% | ~30% to ~40% | ~15% to ~30% | ~5% to ~15% | COLOR PIGMENTS; PARTICLE DIAMETER ~2 TO ~500 MICRON; PARTICLE LENGTH ~2 TO ~3500 MICRON | |
| 2 | 1/4" | Binder Material (% by volume) | ~5% to ~10% | ~30% to ~40% | ~40% to ~50% | ~50% to ~60% | ~60% to ~70% | ~70% to ~85% | ~85% to ~95% | FLAME RETARDANTS; BONDING AGENTS | |
| 2 | 1/4" | Hemp Feedstock (% by volume) | ~90% to ~95% | ~60% to ~70% | ~50% to ~60% | ~40% to ~50% | ~30% to ~40% | ~15% to ~30% | ~5% to ~15% | PARTICLE DIAMETER ~20 TO ~1500 MICRON; PARTICLE LENGTH ~20 TO ~7000 MICRON | IN A PREFERRED EMBODIMENT (INCLUDING BUT NOT LIMITED TO THE FOLLOWING, ALONE OR IN COMBINATION) PREVIOUSLY EXTRUDED, FOAMED BOARD, FED THROUGH EXTRUDER, OR NON WOVEN HEMP LAYER FED THROUGH EXTRUDER. |
| 3 | 1/4" | Binder Material (% by volume) | ~5% to ~10% | ~30% to ~40% | ~40% to ~50% | ~50% to ~60% | ~60% to ~70% | ~70% to ~85% | ~85% to ~95% | COLOR PIGMENTS; IMPACT MODIFIERS | |

FIG. 21A

| | Hemp Feedstock (% by volume) | ~90% to ~95% | ~60% to ~70% | ~50% to ~60% | ~40% to ~50% | ~30% to ~40% | ~15% to ~30% | ~5% to ~15% | PARTICLE DIAMETER ~ 20 TO ~1500 MICRON |
|---|---|---|---|---|---|---|---|---|---|
| | | | | | | | | | PARTICLE LENGTH ~20 TO ~7000 MICRON |
| 3 | 1/4" | | | | | | | | |

(TABLE 4)

FIG. 21B

| LAYER NUMBER | LAYER THICKNESS | Attribute | OSB | Floor Board #13 | Floor Board #14 | Floor Board #15 | Floor Board #16 | Floor Board #17 | Floor Board #18 | KEY PERFORMANCE ADDITIVES PER LAYER (INCLUDING BUT NOT LIMITED TO) | FEATURES BASED ON PREFERRED EMBODIMENTS, OR FOR EXAMPLES, (INCLUDING BUT NOT LIMITED TO THE FOLLOWING) MAY INLCUDE BASED ON APPLICATION |
|---|---|---|---|---|---|---|---|---|---|---|---|
| | | Board Thickness (in.) | 1 1/8" | 1 1/8" | 1 1/8" | 1 1/8" | 1 1/8" | 1 1/8" | 1 1/8" | EXAMPLES | |
| 1 | 3/8" | Binder Material (% by volume) | ~5% to ~10% | ~30% to ~40% | ~40% to ~50% | ~50% to ~60% | ~60% to ~70% | ~70% to ~85% | ~85% to ~95% | IMPACT MODIFIERS | "CROSS MICRO GROOVING" FOR INCREASED ADHESION OF GLUES, MASTICS, AND OTHER METHODS OF ADHESION OF FLOORING TILES, AND FLOOR FINISHES |
| 1 | 3/8" | Hemp Feedstock (% by volume) | ~90% to ~95% | ~60% to ~70% | ~50% to ~60% | ~40% to ~50% | ~30% to ~40% | ~15% to ~30% | ~5% to ~15% | MOLD AND MILDEW REISTANCE ADDITIVES / PARTICLE DIAMETER ~2 TO ~500 MICRON / PARTICLE LENGTH ~2 TO ~3500 MICRON | "U SHAPED GROOVE" FOR RADIANT FLOORING TUBES IN LAYERS 1 AND 2 |
| 2 | 1/2" | Binder Material (% by volume) | ~5% to ~10% | ~30% to ~40% | ~40% to ~50% | ~50% to ~60% | ~60% to ~70% | ~70% to ~85% | ~85% to ~95% | FLAME RETARDANTS | "U SHAPED GROOVE" FOR RADIANT FLOORING TUBES IN LAYERS 1 AND 2 |
| 2 | 1/2" | Hemp Feedstock (% by volume) | ~90% to ~95% | ~60% to ~70% | ~50% to ~60% | ~40% to ~50% | ~30% to ~40% | ~15% to ~30% | ~5% to ~15% | BONDING AGENTS / PARTICLE DIAMETER ~20 TO ~1500 MICRON | IN A PREFERRED EMBODIMENT (INCLUDING BUT NOT LIMITED TO THE |

FIG. 22A

| | | | | | | | | | | FOLLOWING, ALONE OR IN COMBINATION) PREVIOUSLY EXTRUDED, FOAMED BOARD, FED THROUGH EXTRUDER, OR NON WOVEN HEMP LAYER FED THROUGH EXTRUDER. |
|---|---|---|---|---|---|---|---|---|---|---|
| | | | | | | | | | | PARTICLE LENGTH ~20 TO ~7000 MICRON |
| 3 | 1/4" | Binder Material (% by volume) | ~5% to ~10% | ~30% to ~40% | ~40% to ~50% | ~50% to ~60% | ~60% to ~70% | ~70% to ~85% | ~85% to ~95% | MOLD AND MILDEW REISTANCE ADDITIVES / IMPACT MODIFIERS |
| 3 | 1/4" | Hemp Feedstock (% by volume) | ~90% to ~95% | ~60% to ~70% | ~50% to ~60% | ~40% to ~50% | ~30% to ~40% | ~15% to ~30% | ~5% to ~15% | PARTICLE DIAMETER ~20 TO ~1500 MICRON / PARTICLE LENGTH ~20 TO ~7000 MICRON |

(TABLE 5)

FIG. 22B

| LAYER NUMBER | LAYER THICKNESS | Attribute | OSB | Roof Board #1 | Roof Board #2 | Roof Board #3 | Roof Board #4 | Roof Board #5 | Roof Board #6 | KEY PERFORMANCE ADDITIVES PER LAYER (INCLUDING BUT NOT LIMITED TO) | FEATURES BASED ON PREFERRED EMBODIMENTS, OR FOR EXAMPLES, (INCLUDING BUT NOT LIMITED TO THE FOLLOWING) MAY INLCUDE BASED ON APPLICATION |
|---|---|---|---|---|---|---|---|---|---|---|---|
| 1 | 1/8" | Board Thickness (in.) | 3/4" | 3/4" | 3/4" | 3/4" | 3/4" | 3/4" | 3/4" | | |
| 1 | 1/8" | Binder Material (% by volume) | ~5% to ~10% | ~30% to ~40% | ~40% to ~50% | ~50% to ~60% | ~60% to ~70% | ~70% to ~85% | ~85% to ~95% | UV RESISTANCE; FLAME RETARDANT | |
| 1 | 1/8" | Hemp Feedstock (% by volume) | ~90% to ~95% | ~60% to ~70% | ~50% to ~60% | ~40% to ~50% | ~30% to ~40% | ~15% to ~30% | ~5% to ~15% | PARTICLE DIAMETER ~2 TO ~500 MICRON; PARTICLE LENGTH ~2 TO ~3500 MICRON | |
| 2 | 1/2" | Binder Material (% by volume) | ~5% to ~10% | ~30% to ~40% | ~40% to ~50% | ~50% to ~60% | ~60% to ~70% | ~70% to ~85% | ~85% to ~95% | BINDING AGENT; FLAME RETARDANT | IN A PREFERRED EMBODIMENT (INCLUDING BUT NOT LIMITED TO THE FOLLOWING, ALONE OR IN COMBINATION) PREVIOUSLY EXTRUDED, FOAMED BOARD, FED THROUGH EXTRUDER, OR NON WOVEN HEMP LAYER FED THROUGH EXTRUDER. |
| 2 | 1/2" | Hemp Feedstock (% by volume) | ~90% to ~95% | ~60% to ~70% | ~50% to ~60% | ~40% to ~50% | ~30% to ~40% | ~15% to ~30% | ~5% to ~15% | PARTICLE DIAMETER ~2 TO ~500 MICRON; PARTICLE LENGTH ~2 TO ~3500 MICRON | |

FIG. 23A

| | | Binder Material (% by volume) | ~5% to ~10% | ~30% to ~40% | ~40% to ~50% | ~50% to ~60% | ~60% to ~70% | ~70% to ~85% | ~85% to ~95% | UV RESISTANCE |
|---|---|---|---|---|---|---|---|---|---|---|
| 3 | 1/8" | | | | | | | | | IMPACT MODIFIER |
| 3 | 1/8" | Hemp Feedstock (% by volume) | ~90% to ~95% | ~60% to ~70% | ~50% to ~60% | ~40% to ~50% | ~30% to ~40% | ~15% to ~30% | ~5% to ~15% | PARTICLE DIAMETER ~2 TO ~500 MICRON |
| | | | | | | | | | | PARTICLE LENGTH ~2 TO ~3500 MICRON |

(TABLE 6)

FIG. 23B

| LAYER NUMBER | LAYER THICKNESS | Attribute | OSB | Roof Board #7 | Roof Board #8 | Roof Board #9 | Roof Board #10 | Roof Board #11 | Roof Board #12 | KEY PERFORMANCE ADDITIVES PER LAYER (INCLUDING BUT NOT LIMITED TO) | FEATURES BASED ON PREFERRED EMBODIMENTS, OR FOR EXAMPLES, (INCLUDING BUT NOT LIMITED TO THE FOLLOWING) MAY INLCUDE BASED ON APPLICATION |
|---|---|---|---|---|---|---|---|---|---|---|---|
| 1 | 1/8" | Board Thickness (in.) | 5/8" | 5/8" | 5/8" | 5/8" | 5/8" | 5/8" | 5/8" | | FEATURES BASED ON PREFERRED EMBODIMENTS, OR FOR EXAMPLES, (INCLUDING BUT NOT LIMITED TO THE FOLLOWING) MAY INLCUDE BASED ON APPLICATION |
| 1 | 1/8" | Binder Material (% by volume) | ~5% to ~10% | ~30% to ~40% | ~40% to ~50% | ~50% to ~60% | ~60% to ~70% | ~70% to ~85% | ~85% to ~95% | UV RESISTANCE / FLAME RETARDANT | |
| 1 | 1/8" | Hemp Feedstock (% by volume) | ~90% to ~95% | ~60% to ~70% | ~50% to ~60% | ~40% to ~50% | ~30% to ~40% | ~15% to ~30% | ~5% to ~15% | PARTICLE DIAMETER ~2 TO ~500 MICRON / PARTICLE LENGTH ~2 TO ~3500 MICRON | |
| 2 | 3/8" | Binder Material (% by volume) | ~5% to ~10% | ~30% to ~40% | ~40% to ~50% | ~50% to ~60% | ~60% to ~70% | ~70% to ~85% | ~85% to ~95% | BINDING AGENT / FLAME RETARDANT | IN A PREFERRED EMBODIMENT (INCLUDING BUT NOT LIMITED TO THE FOLLOWING, ALONE OR IN COMBINATION) PREVIOUSLY EXTRUDED, FOAMED BOARD, FED THROUGH EXTRUDER, OR NON WOVEN HEMP LAYER FED THROUGH EXTRUDER. |
| 2 | 3/8" | Hemp Feedstock (% by volume) | ~90% to ~95% | ~60% to ~70% | ~50% to ~60% | ~40% to ~50% | ~30% to ~40% | ~15% to ~30% | ~5% to ~15% | PARTICLE DIAMETER ~2 TO ~500 MICRON / PARTICLE LENGTH ~2 TO ~3500 MICRON | |
| 3 | 1/8" | Binder Material (% by volume) | ~5% to ~10% | ~30% to ~40% | ~40% to ~50% | ~50% to ~60% | ~60% to ~70% | ~70% to ~85% | ~85% to ~95% | UV RESISTANCE / FLAME RETARDANT | |
| 3 | 1/8" | Hemp Feedstock (% by volume) | ~90% to ~95% | ~60% to ~70% | ~50% to ~60% | ~40% to ~50% | ~30% to ~40% | ~15% to ~30% | ~5% to ~15% | PARTICLE DIAMETER ~2 TO ~500 MICRON / PARTICLE LENGTH ~2 TO ~3500 MICRON | |

(TABLE 7)

FIG. 24

| LAYER NUMBER | LAYER THICKNESS | Attribute | DECK / FENCE BOARD #1 | DECK / FENCE BOARD #2 | DECK / FENCE BOARD #3 | DECK / FENCE BOARD #4 | DECK / FENCE BOARD #5 | DECK / FENCE BOARD #6 | KEY PERFORMANCE ADDITIVES PER LAYER (INCLUDING BUT NOT LIMITED TO) | FEATURES BASED ON PREFERRED EMBODIMENTS, OR FOR EXAMPLES, (INCLUDING BUT NOT LIMITED TO THE FOLLOWING) MAY INLCUDE BASED ON APPLICATION |
|---|---|---|---|---|---|---|---|---|---|---|
| 1 | 1/8" | Board Thickness (in.) | 2" X4" (1.5X3.5 ACTUAL) | 2" X4" (1.5X3.5 ACTUAL) | 2" X4" (1.5X3.5 ACTUAL) | 2" X4" (1.5X3.5 ACTUAL) | 2" X4" (1.5X3.5 ACTUAL) | 2" X4" (1.5X3.5 ACTUAL) | EXAMPLES | THIS LAYER WOULD HAVE A FINAL PIGMENT FOR INCREASED UV STABILIZATION OR IN A NATURAL COLOR A UV INHIBITOR FOR INCREASED UV RESTANCE OVER THE LIFE OF THE BOARD. |
| | | Binder Material (% by volume) | ~30% to ~40% | ~40% to ~50% | ~50% to ~60% | ~60% to ~70% | ~70% to ~85% | ~85% to ~95% | IMPACT MODIFIERS / COLOR PIGMENTS/UV INHIBITOR | ADDITION OF TEXTURING OR PATTERN FOR INCREASED TRACTION OR AESTHETIC EFFECT BASED ON APPLICATION. MAY INCLUDE FURTHER PROCESSING AFTER EXTRUSION TO INCLUDE MICRO GROOVES OR OTHER PATTERN IN A DECKING APPLICATION. |
| 1 | 1/8" | Hemp Feedstock (% by volume) | ~60% to ~70% | ~50% to ~60% | ~40% to ~50% | ~30% to ~40% | ~15% to ~30% | ~5% to ~15% | PARTICLE DIAMETER ~ 2 TO ~500 MICRON / PARTICLE LENGTH ~2 TO ~3500 MICRON | |

FIG. 25A

| Layer | Thickness | Material | | | | | | | Component | Description |
|---|---|---|---|---|---|---|---|---|---|---|
| 2 | 1.25" | Binder Material (% by volume) | ~30% to ~40% | ~40% to ~50% | ~50% to ~60% | ~60% to ~70% | ~70% to ~85% | ~85% to ~95% | FLAME RETARDANTS; BONDING AGENTS. FOAMING AGENT, | IN A PREFERRED EMBODIMENT (INCLUDING BUT NOT LIMITED TO THE FOLLOWING, ALONE OR IN COMBINATION) PREVIOUSLY EXTRUDED, FOAMED BOARD, FED THROUGH EXTRUDER, OR FOAMED IN LINE AND IN SERIES AS PART OF A MULTIPLE EXTRUDER SETUP TO REDUCE WEIGHT AND INCREASE STIFFNESS |
| 2 | 1.25" | Hemp Feedstock (% by volume) | ~60% to ~70% | ~50% to ~60% | ~40% to ~50% | ~30% to ~40% | ~15% to ~30% | ~5% to ~15% | PARTICLE DIAMETER ~20 TO ~1500 MICRON; PARTICLE LENGTH ~20 TO ~7000 MICRON | |
| 3 | 1/8" | Binder Material (% by volume) | ~30% to ~40% | ~40% to ~50% | ~50% to ~60% | ~60% to ~70% | ~70% to ~85% | ~85% to ~95% | COLOR PIGMENTS | THIS LAYER WOULD HAVE A FINAL PIGMENT FOR INCREASED UV STABILIZATION OR IN A NATURAL COLOR A UV INHIBITOR FOR INCREASED UV RESTANCE OVER THE LIFE OF THE BOARD. |
| | | | | | | | | | IMPACT MODIFIERS | ADDITION OF TEXTURING OR PATTERN FOR INCREASED TRACTION OR AESTHETIC EFFECT BASED ON APPLICATION |

FIG. 25B

| | Hemp Feedstock (% by volume) | ~60% to ~70% | ~50% to ~60% | ~40% to ~50% | ~30% to ~40% | ~15% to ~30% | ~5% to ~15% | PARTICLE DIAMETER ~20 TO ~1500 MICRON |
| --- | --- | --- | --- | --- | --- | --- | --- | --- |
| 3 | 1/8" | | | | | | | PARTICLE LENGTH ~20 TO ~7000 MICRON |

(TABLE 8)

FIG. 25C

| LAYER NUMBER | LAYER THICKNESS | Attribute | DECK / FENCE BOARD #7 | DECK / FENCE BOARD #8 | DECK / FENCE BOARD #9 | DECK / FENCE BOARD #10 | DECK / FENCE BOARD #11 | DECK / FENCE BOARD #12 | KEY PERFORMANCE ADDITIVES PER LAYER (INCLUDING BUT NOT LIMITED TO) | FEATURES BASED ON PREFERRED EMBODIMENTS, OR FOR EXAMPLES, (INCLUDING BUT NOT LIMITED TO THE FOLLOWING) MAY INLCLUDE BASED ON APPLICATION |
|---|---|---|---|---|---|---|---|---|---|---|
| 1 | 1/8" | Board Thickness (in.) | "1X4" (3/4"X3.5" ACTUAL) | "1X4" (3/4"X3.5" ACTUAL) | "1X4" (3/4"X3.5" ACTUAL) | "1X4" (3/4"X3.5" ACTUAL) | "1X4" (3/4"X3.5" ACTUAL) | "1X4" (3/4"X3.5" ACTUAL) | EXAMPLES | |
| | | Binder Material (% by volume) | ~30% to ~40% | ~40% to ~50% | ~50% to ~60% | ~60% to ~70% | ~70% to ~85% | ~85% to ~95% | IMPACT MODIFIERS | THIS LAYER WOULD HAVE A FINAL PIGMENT FOR INCREASED UV STABILIZATION OR IN A NATURAL COLOR A UV INHIBITOR FOR INCREASED UV RESTANCE OVER THE LIFE OF THE BOARD. |

FIG. 26A

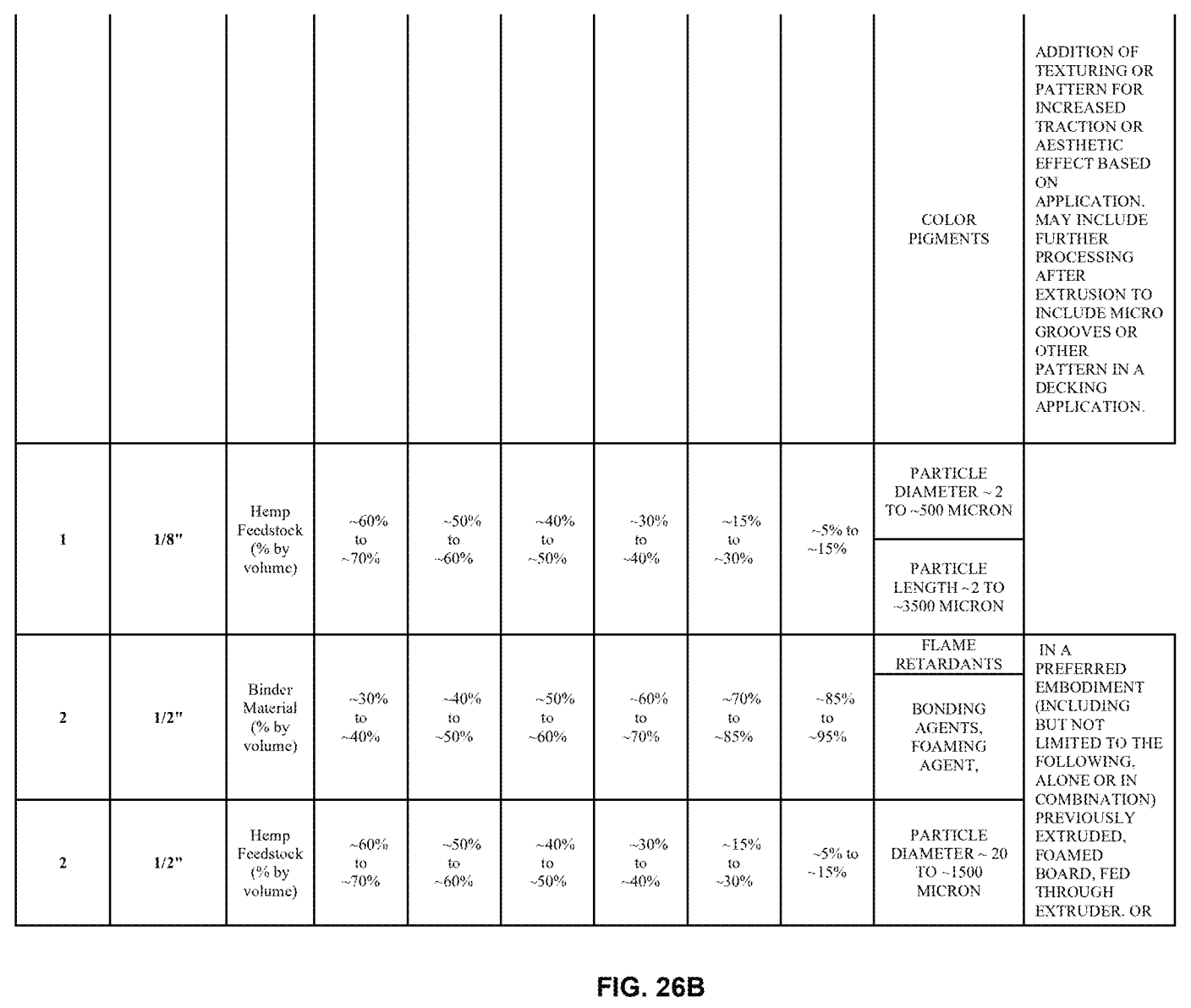

Column headers (left to right):

- ADDITION OF TEXTURING OR PATTERN FOR INCREASED TRACTION OR AESTHETIC EFFECT BASED ON APPLICATION. MAY INCLUDE FURTHER PROCESSING AFTER EXTRUSION TO INCLUDE MICRO GROOVES OR OTHER PATTERN IN A DECKING APPLICATION.
- COLOR PIGMENTS
- PARTICLE DIAMETER ~2 TO ~500 MICRON
- PARTICLE LENGTH ~2 TO ~3500 MICRON
- FLAME RETARDANTS
- BONDING AGENTS, FOAMING AGENT,
- PARTICLE DIAMETER ~20 TO ~1500 MICRON
- IN A PREFERRED EMBODIMENT (INCLUDING BUT NOT LIMITED TO THE FOLLOWING, ALONE OR IN COMBINATION) PREVIOUSLY EXTRUDED, FOAMED BOARD, FED THROUGH EXTRUDER. OR

| PARTICLE DIAMETER ~2 TO ~500 MICRON | BONDING AGENTS, FOAMING AGENT, | PARTICLE DIAMETER ~20 TO ~1500 MICRON |
|---|---|---|
| ~5% to ~15% | ~85% to ~95% | ~5% to ~15% |
| ~15% to ~30% | ~70% to ~85% | ~15% to ~30% |
| ~30% to ~40% | ~60% to ~70% | ~30% to ~40% |
| ~40% to ~50% | ~50% to ~60% | ~40% to ~50% |
| ~50% to ~60% | ~40% to ~50% | ~50% to ~60% |
| ~60% to ~70% | ~30% to ~40% | ~60% to ~70% |
| Hemp Feedstock (% by volume) | Binder Material (% by volume) | Hemp Feedstock (% by volume) |
| 1/8" | 1/2" | 1/2" |
| 1 | 2 | 2 |

FIG. 26B

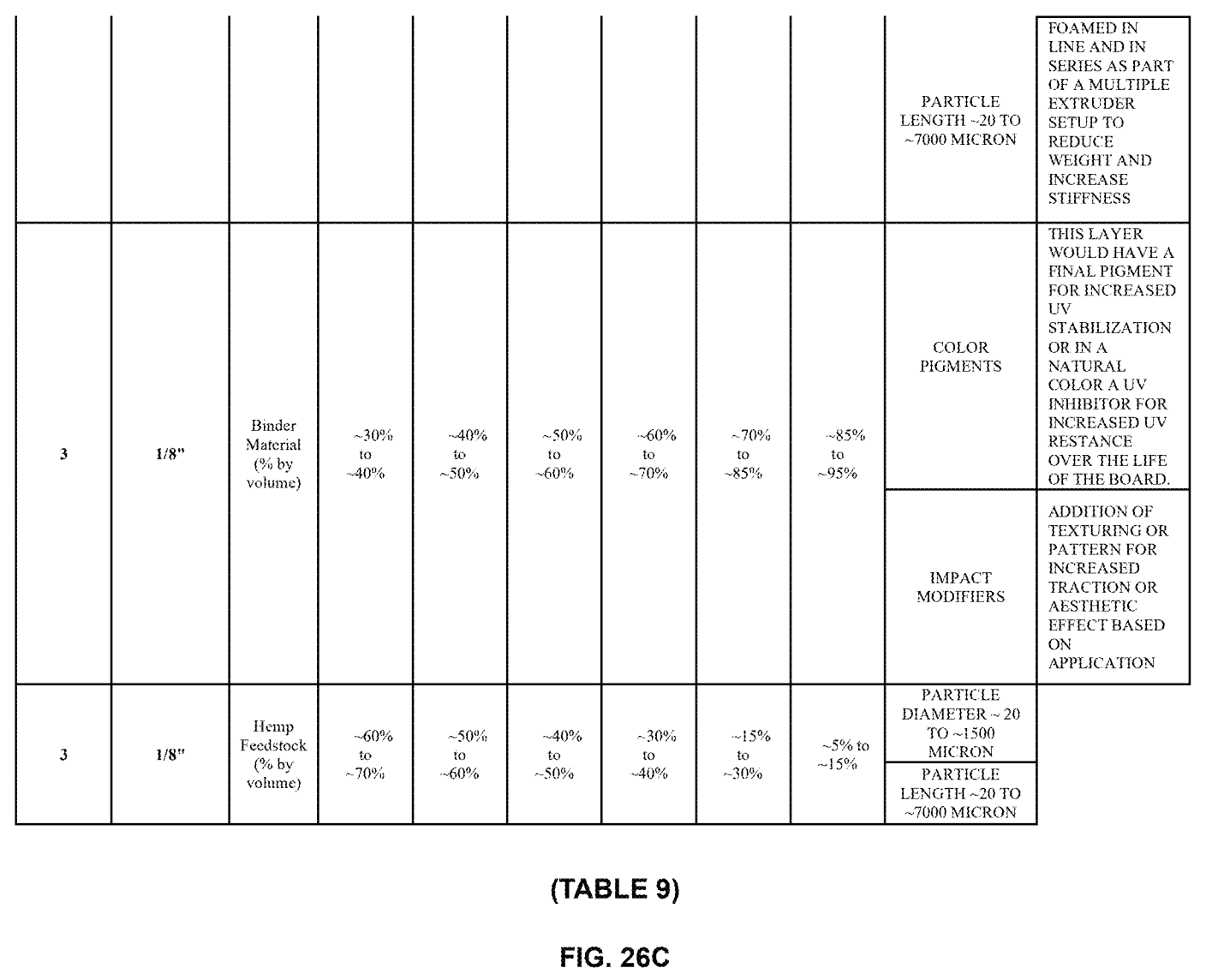

| | PARTICLE LENGTH ~20 TO ~7000 MICRON — FOAMED IN LINE AND IN SERIES AS PART OF A MULTIPLE EXTRUDER SETUP TO REDUCE WEIGHT AND INCREASE STIFFNESS | COLOR PIGMENTS — THIS LAYER WOULD HAVE A FINAL PIGMENT FOR INCREASED UV STABILIZATION OR IN A NATURAL COLOR A UV INHIBITOR FOR INCREASED UV RESTANCE OVER THE LIFE OF THE BOARD. | IMPACT MODIFIERS — ADDITION OF TEXTURING OR PATTERN FOR INCREASED TRACTION OR AESTHETIC EFFECT BASED ON APPLICATION | PARTICLE DIAMETER ~20 TO ~1500 MICRON | PARTICLE LENGTH ~20 TO ~7000 MICRON |
|---|---|---|---|---|---|
| | | ~85% to ~95% | | ~5% to ~15% | |
| | | ~70% to ~85% | | ~15% to ~30% | |
| | | ~60% to ~70% | | ~30% to ~40% | |
| | | ~50% to ~60% | | ~40% to ~50% | |
| | | ~40% to ~50% | | ~50% to ~60% | |
| | | ~30% to ~40% | | ~60% to ~70% | |
| | | Binder Material (% by volume) | | Hemp Feedstock (% by volume) | |
| | | 1/8" | | 1/8" | |
| | | 3 | | 3 | |

(TABLE 9)

FIG. 26C

COEXTRUDED HEMP COMPOSITE BOARD

CROSS-REFERENCE TO RELATED APPLICATIONS

This application claims the benefit of U.S. Provisional Application Ser. No. 63/404,344, filed on Sep. 7, 2022, and U.S. Provisional Application Ser. No. 63/443,324, filed on Feb. 3, 2023, and International Application Serial No. PCT/US23/23777, filed on May 26, 2023, which are incorporated herein in their entirety by reference.

FIELD OF THE DISCLOSURE

The subject matter of the present disclosure refers generally to a coextruded composite board comprising hemp feedstocks and binder material.

BACKGROUND

The three dominant construction boards used in building construction and remodeling have been primary building ingredients for decades. Plywood began to be used in the United States as a general building material in the 1920's and 30's for prefabricated houses focused on quick fabrication and easy disassembly and low cost. Drywall was invented in 1916. It was originally marketed as a wallboard to protect homes from urban fires, and as the poor man's alternative to plaster walls. Oriented Strand Board (OSB) was originally called waferboard and was created in the 1960's as a cheaper alternative to plywood.

Today, these three common construction boards in their various forms cover most interior and exterior walls, ceilings, roofs, and floors throughout the United States. Though each of the three boards can provide many benefits as building materials, each board has similar inherent drawbacks. The production of plywood and OSB are waste-intensive processes, emitting large amounts of wood wastes, water wastes, resin and wax wastes, and volatile emissions. Drywall production also has a noticeable environmental impact. Processing the gypsum releases particulates from the gypsum powder in addition to sulfur dioxide, nitrous oxide, and carbon monoxide. Heating the gypsum throughout the production process also has a high energy cost.

Each of these construction boards can degrade over their service life due to the inherent problems that exist in their material composition, process of manufacture, and product application. In particular, the hygroscopic properties of the wood pieces that comprise both plywood and OSB and the porous nature of gypsum used as the base material for drywall can make them a poor construction material choice in situations where they might be exposed to consistent patterns of moisture and humidity.

Hemp biomass is a renewable, recyclable, and compostable. Hemp plants are relatively easy to grow in most climates with a fast yield, typically reaching maturity in 85-100 days. Its capability to be grown almost anywhere creates maximum flexibility for site location and the ability to minimize the transportation footprint. Hemp returns 50% of the nutrients it takes from the soil and has the highest yield per acre of any natural fiber. Importantly, hemp fiber is ten times stronger than wood fiber, is lighter and less expensive to produce.

Accordingly, there is a need in the art for a lower cost, superior quality construction board made from sustainable feedstocks and that possess improved mechanical and physical properties when compared to conventional construction boards.

SUMMARY

A co-extruded hemp composite board (CHB) configured to be used as an environmentally friendly alternative to traditional construction materials is provided. In one aspect, the system is a finished CHB product made from a combination of hemp bast fiber, hemp hurd, and binder material that is mixed and extruded to create construction materials of different grades, depending on the application in which the finished CHB is to be used. In another aspect, the finished CHB product may be configured to match or exceed the strength of conventional construction materials, including oriented strand board (OSB), plywood, gypsum board, subflooring, flooring, etc. In yet another aspect, the finished CHB product may be configured to be weather resistant, pest resistant, rot resistant, fire resistant, insulative, etc. to increase the service life when compared to that of traditional construction materials. In yet another aspect, the finished CHB product may be made with sustainably sourced feedstocks and industrial/residential waste streams to reduce the impact on the environment. In yet another aspect, the method produces replacement construction material products that can, through the use of extrusion dies and post extrusion processing, create molded, shaped and patterned construction materials designed to reduce installation times as well as prevent water penetration. Generally, the system of the present disclosure is designed to be an environmentally friendly alternative to traditional constructions materials that possess increased physical properties, have longer functional lifetimes, and reduce carbon footprints of construction projects.

A finished CHB product preferably comprises a top surface, bottom surface, and a plurality of sides and is made from a coextruded extrudate sheet having at least two layers formed by an upstream extrusion arrangement, wherein each layer of said at least two layers comprises extrudate made using hemp feedstock and binder material. The extrudate created within the extruder of the upstream extrusion arrangement is pushed through a die where the extrudate is shaped into a coextruded extrudate sheet and modified via post extrusion processing until the finished CHB product is obtained. Shear force created during the extrusion process and acting on the extrudate will force the binder fibers/chains to align in the output direction of the extruder as the extrudate exits the die outlet of the manifold, resulting in a coextruded extrudate sheet that is anisotropic in behavior due to alignment of the binder material and hemp feedstocks in a single direction. Though the hemp feedstocks encapsulated within the binder material will also generally align in the output direction of the extruder, the highly varied structure of the hemp feedstocks will cause the composite material to have both the positive physical/mechanical properties of a material having highly ordered binder fibers/chains as well as the cross-bonding of layers due to the hemp-binder matrix, enhancing properties such as edge strength and pull strength. The amount of hemp biomass relative to the binder is the primary variable that determines the various physical/mechanical properties of the coextruded extrudate sheet and allows for the creation of a finished CHB product for a desired application.

The process of making a finished CHB product involves processing and separating hemp biomass into hemp feedstocks, primarily that of hemp bast fiber and hemp hurd, via the separation arrangement. These hemp feedstocks are then mixed with a binder material via the upstream extrusion arrangement to create an extrudate that is subsequently molded and processed into a finished CHB product via the downstream extrusion arrangement. In a preferred embodiment, hemp hurd used to create the finished CHB product comprises a particle size of 0.002-8 millimeters, and the hemp bast fiber used to create the finished CHB product comprises a diameter range of 0.002-0.200 millimeters and a length range of 0.002-36 millimeters. However, one with skill in the art will understand that hemp hurd and hemp bast fiber having other diameters and/or lengths may be used without departing from the inventive subject matter described herein.

The upstream extrusion arrangement generally comprises at least one hopper, at least one dryer, at least one extruder, and manifold. The feedstocks may be fed by the at least one hopper into the at least one extruder individually or as a blend of dry components. The at least one dryer may be used to dry the feedstocks before being fed to the at least one extruder, which will result in the creation of one or more extrudates with a more consistent moisture content. Alternatively, the feedstocks may be dried in another device/ section of the system, allowing the at least one hopper heater to simply maintain the moisture content within the dried feedstocks prior to injection into the at least one extruder as well as to maintain a desirable feedstock temperature. The at least one extruder is used to mix the feedstocks under high shear force to create the one or more extrudate used to create the co-extruded extrudate sheet that forms the basis of the finished CHB product. In a preferred embodiment, the at least one extruder generally comprises a motor, gear box operably connected to the motor, screw operably connected to the gear box, barrel, and manifold. The screw is configured to mix the feedstocks within the barrel. Feedstocks are injected into the barrel via a throat of the barrel, wherein the feedstocks are processed into an extrudate as it moves through said barrel due to action of the screw.

The one or more extrudates are pushed through an opening of said barrel of the at least one extruder and into the manifold, which is configured to accept the one or more extrudates from the barrels via an entry channel and distribute said one or more extrudates across a width of a die outlet. The die outlet of the manifold molds the one or more extrudates produced by the at least one extruder into a coextruded extrudate sheet having a desired shape, wherein said desired shape may or may not require further processing via a choker bar, lower lip, flex-lip, and/or machinery of a downstream extrusion arrangement to produce a finished CHB product. In a preferred embodiment, coextrusion feed block manifolds, slit manifolds, and multimanifolds may be used to create the coextruded extrudate sheet that is to be shaped into finished CHB products. An asymmetrical die outlet may be used to create features such as "tongue and groove", slots, depressions, linear scoring, ridges, waves, thicker or thinner sections, angles, profiles, etc. For example, the asymmetrical die outlet may be configured to mold an extrudates(s) optimized for furniture construction into a finished CHB product having the shape of furniture frame components, which can used to replace plywood or OSB, resulting in furniture that is less expensive to produce and results in lower waste.

In some embodiments, the one or more extrudates are extruded onto a substrate layer to form the coextruded extrudate sheet. The substrate preferably comprises a sheet consisting of one or more layers of material. For example, a substrate layer may comprise a polymer sheet having chain link and/or mesh incorporated onto the top and bottom surfaces. For example, a substrate layer may comprise a circuit board possessing all the circuitry necessary for solar panels. The substrate layer may be moved to the upstream extrusion arrangement (preferably via a plurality of rollers or other means of supplying a substrate), wherein the manifold of the upstream extrusion arrangement may be configured to extrude one or more extrudates thereon. For example, an upstream extrusion arrangement comprising two manifolds may create a coextruded extrudate sheet by extruding a first extrudate on a top surface of the substrate and a second extrudate on a second surface of said substrate. The resulting coextruded extrudate sheet may then undergo post-extrusion processing via the downstream extrusion arrangement to produce a finished CHB product.

Blends of hemp feedstocks of varying sizes can impart the previously mentioned benefits that feedstocks having only minimal size ranges might not produce due to a wider variety of bonding. For example, where blends of the hemp bast fiber and hemp hurd contain variable lengths (potentially not discernible to the human eye, but as measured in microns), micronized hemp bast fiber and micronized hemp hurd will fill in voids (voids being defined as areas where there is significantly more binder material than hemp feedstock as observed under a microscope) between larger hemp bast fibers or hemp hurd to create a hemp composite material with increased strength and fewer defective areas due to a more consistent hemp-binder matrix. Additionally, orientation of dispersed/distributed hemp bast fiber and/or hemp hurd of various lengths within the extruded composite will create product advantages when the machine direction versus transverse direction of the final product is considered since it will result in a final product with increased flexural modulus, increased tensile strength, and natural UV inhibition.

The amount of hemp feedstock as a percentage of the extrudate depends on the targeted end use application of the CHB. The desired material and board performance are achieved based on the increase or decrease in all the various feedstock combinations plus the impact of the board thickness. For example, boards of a thinner design may have a higher hemp bast fiber to hemp hurd ratio combined with a harder binder material to achieve a balance of impact resistance, fastener retention, and flexural modulus. Boards of a thicker design and comprising a softer binder could achieve the same desired properties with an increased hemp hurd content and lower bast fiber content, assuming highly effective dispersion and a broad array of hurd sizes are used (for instance, ranging from 5 micron to 16 mm). Types of materials that may act as the binder material include, but are not limited to, starch-based binders, polymers (Thermoplastic and Thermoset), polyester resin, phenolic resins, polyisocyanurate(PIR)), epoxy resin, polyurethane resin, ISO resin, vinyl ester resin, and methyl ethyl ketone peroxide (MEKP). In a preferred embodiment, a finished CHB product preferably comprises at least 30% binder material. In comparison, typical oriented strand board (OSB) contains only 5% to 10% binder resulting in a much lower encapsulation of the wood particles.

Some embodiments of a finished CHB product may further comprise secondary feedstocks and/or chemical treatment of the hemp feedstocks. Secondary feedstocks may be added to the hemp feedstocks and binder material to optimize a finished CHB product so that it has physical/ mechanical properties designed for a specific purpose. Types of secondary feedstocks that may be used to optimize a finished CHB product include, but are not limited to, bio-derived carbon, gypsum, glass fiber, wood fines, blowing agents, additive flame retardants, anti-static agents, antimicrobial agents, coupling agents, protective agents, or any combination thereof. Blowing agents may be defined as an additive used to produce a cellular structure within the finished CHB product by causing a foaming process within the extrudate before or after it is ejected from the extruder. The cellular structure resulting from the use of blowing agents decreases density and price of a blown, finished CHB product as well as increases the insulative properties of such blown, finished CHB products.

Flame retardants may be defined as secondary feedstocks designed to inhibit/prevent the ignition of the binder material and/or hemp feedstocks of the finished CHB product. In a preferred embodiment, flame retardants suppress the ignition of the binder material and/or hemp feedstocks by creating a layer of charring on the outer surface of the finished CHB product when said finished CHB product is exposed to heat and/or a flame. In a preferred embodiment, red phosphorus is incorporated during the extrusion process and may act as a flame retardant. Anti-static agents may be defined as secondary feedstocks designed to reduce the static retention of the finished CHB product. In a preferred embodiment, carbon may be used as the antistatic agent. Types of carbon that may be used as an antistatic agent include but are not limited to a bio-based carbon, graphene, carbon nanotubes, carbon fibers, carbon black, graphite, or any combination thereof.

UV stabilization agents may be defined as secondary feedstocks that combat the deterioration of the binder material and significantly extend the life span of the finished CHB product by inhibiting the photo oxidation process. UV stabilization agents may be effective at only 0.1-0.5% by weight relative to the weight of the binder material and can be added during the extrusion process. In a preferred embodiment, types of secondary feedstocks that may be used as the UV stabilization agent include, but are not limited to, UV absorbers, quenchers, hindered amine light stabilizers, or any combination thereof. Antimicrobial agents may be defined as secondary feedstocks designed to prevent the growth of bacteria, microbes, and other organic growth that may reduce the effective lifetime of the finished CHB product. In a preferred embodiment, an antimicrobial additive is applied to the finished CHB product after extrusion. However, some embodiments of the finished CHB product may comprise antimicrobial additives (such as Zinc Omadine, etc.) that are added during the extrusion process. In a preferred embodiment, metal nanoparticles may be used as a secondary feedstock that act as an antimicrobial agent and may be added to the hemp feedstock and binder material during the extrusion process. In some preferred embodiments, colorants may be added during the extrusion process to assist with the identification of a finished CHB product, reduce the number of labor steps during construction, increase thermal stability, etc.

Secondary feedstocks in the form of materials obtained from various waste streams may also be used as secondary feedstocks. By including materials from industrial/residential waste streams, a finished CHB product may have a reduced cost and a positive environmental impact. In a preferred embodiment, materials obtained from waste streams and used as secondary feedstocks include, but are not limited to, wood fines, bio-carbon, gypsum, glass, post-consumer/industrial plastics, or any combination thereof. The use of post-consumer/industrial plastic may be particularly useful for a finished CHB product optimized for applications in which slight reductions in physical and mechanical properties due to the degradation of the polymeric material are acceptable. Additionally, the environmental benefits of the said foamed, finished CHB product are superior to that of gypsum board due to the waste usage and carbon capture advantages of the hemp plant. For example, finished CHB products optimized for decking board and/or fencing board applications are preferably made from post-consumer/post-industrial recycled thermoplastics and thermoplastics, or a blend of other highly loaded recycled materials plus small amounts of virgin material to increase flow rates. For instance, a finished CHB product may incorporate bio-carbon obtained via pyrolysis, resulting in carbon neutral/negative construction material.

Finished CHB product combinations have superior physical properties when compared to traditional construction boards like OSB, plywood, drywall, and treated lumber in every building application. For example, a finished CHB product optimized for use as exterior sheathing may comprise a first non-foamed layer containing 30% hemp feedstock by volume and 70% binder material by volume and a second foamed layer containing 60% hemp feedstock by volume and 40% binder material by volume. The resulting finished CHB product could be installed in a way such that the more water resistant first layer faces the exterior of a structure whereas the more insulative second layer faces the interior of the structure, resulting in an exterior sheathing that is more water, pest, and mold resistant than traditional construction materials. For example, a finished CHB product optimized for use as low-profile roof board may comprise a first non-foamed layer containing 40% hemp feedstock by volume and 60% binder material by volume; a second non-foamed layer containing 50% hemp feedstock by volume and 50% binder material by volume; and a third non-foamed layer containing 40% hemp feedstock by volume and 60% binder material by volume. The resulting finished CHB product possesses superior moisture resistance, thermal/hydraulic stability, edge strength, stiffness, impact strength, and sound deadening properties when compared to that of OSB and plywood.

In some embodiments, finished CHB products may be optimized as ordered components that make up a part of a structure and/or frame. Due to the die outlet and processing via the downstream extrusion arrangement, finished CHB products in the form of ordered components, and possessing forms that plywood furniture components may not easily accommodate, allows for easy assembly of furniture frames and structures. These ordered components are preferably configured to fit together in a very specific manner, and may include, but are not limited to, boards, beams, flooring, wallboard, roof board, decking, and fencing. Finished CHB products optimized for boards, beams, decking, and/or fencing may be expected to perform better than wood boards due to a higher water/pest resistance. More consistent "grain," resulting from the dispersive mixing, disruptive mixing, and fiber/chain alignment, should also reduce the likelihood of warping that boards, beams, decking, and/or fencing sometime experience.

Once the coextruded extrudate sheet has been pushed through the die outlet, it may be further shaped and gradually cooled by the downstream extrusion arrangement. The downstream extrusion arrangement may comprise a plurality of rollers, heater/coolers (chemical, mechanical, gas, water, etc.), cutters, molders, sanders, planers, painters, and stacker. Initial sizing past the manifold may be accomplished via the plurality of rollers that compress the coextruded extrudate sheet to the desired thickness and/or corrugate the coextruded extrudate sheet with a desired texture.

The downstream extrusion arrangement may be used to form patterns on one or more surfaces of the coextruded extrudate sheet while it is still pliable and/or form molded shapes, such as base architectural molding, crown architectural molding, ceiling molding, and corner architectural molding. Additionally, the planers, sanders, routers, etc. of the downstream extrusion arrangement may be used to transform the sides of the coextruded extrudate sheet into interlocking edges. The downstream extrusion arrangement may also be used to create texture to increase bonding of laminates, paper, films, paint, tar, wax, glue, or any combination thereof that is applied to the surface of the coextruded extrudate sheet. In other embodiments, the downstream extrusion arrangement may be used to create channels located on the bottom surface of the coextruded extrudate sheet and sized in a way such that electrical hardware, plumbing, and radiant heating may installed in the channels.

An optional fastener may be used to fasten the finished CHB product to a frame and/or structure. The optional fastener preferably comprises a cylindrical body comprising a trailing end, advancing end, and proximal portion having plurality of barbs, wherein the head of the optional fastener is located at the trailing end and generally has a larger radius than the plurality of barbs located on the proximal portion. The proximal portion of the optional fastener may have a fixed diameter, or it may have a varied diameter. This may allow a user to implant an optional fastener without the need of predrilling a hole into the building frame in which the optional fastener is to be placed. The plurality of barbs of the proximal portion may vary in form, angle, and depth, depending on the need. A washer may be used in combination with the optional fastener to reduce water penetration into the finished CHB product. For instance, some embodiments of the washer may comprise a water-resistant material such as rubber and silicon which may seal the area in which optional fastener penetrates into the finished CHB product.

Due to the use of recycled materials and sustainable hemp feedstocks, the various finished CHB products described herein will result in a tremendous benefit to the environment when evaluated through a life cycle analysis (LCA). Finished CHB products under LCA will show that by using sustainable hemp feedstocks, reclaimed "waste" materials from construction and manufacturing processes, reduced shipping weights, and streamlined processing will dramatically offset the carbon offenses in the construction industry, and provide permanent carbon sequestration opportunities that currently do not exist today in available solutions. Additionally, the finished CHB products described may include carbonized materials by way of secondary feedstocks, allowing for high carbon sequestration crops, such as hemp and/or bamboo, to be grown and turned into biocarbon via pyrolysis before incorporation into the finished CHB products as a carbon sink. As such, when compared with traditional construction materials, the LCA will show that the finished CHB products described herein are not only superior in terms of carbon capture, lifespan, and physical properties but are also more sustainable.

The foregoing summary has outlined some features of the system and method of the present disclosure so that those skilled in the pertinent art may better understand the detailed description that follows. Additional features that form the subject of the claims will be described hereafter. Those skilled in the pertinent art should appreciate that they can readily utilize these features for designing or modifying other methods for carrying out the same purpose of the methods disclosed herein. Those skilled in the pertinent art should also realize that such equivalent modifications do not depart from the scope of the methods of the present disclosure.

DESCRIPTION OF THE DRAWINGS

These and other features, aspects, and advantages of the present disclosure will become better understood with regard to the following description, appended claims, and accompanying drawings where:

FIG. 15 illustrates the hemp bast fiber alignment within the binder material and embodying features consistent with the principles of the present disclosure.

FIG. 16 illustrates a cross-sectional view of ductwork made from coextruded hemp duct board (CHDB) and embodying features consistent with the principles of the present disclosure.

FIG. 18A illustrates a table containing various layer combinations that may be used to create CHB embodying features consistent with the principles of the present disclosure.

FIG. 18B illustrates a table containing various layer combinations that may be used to create CHB embodying features consistent with the principles of the present disclosure.

FIG. 18C illustrates a table containing various layer combinations that may be used to create CHB embodying features consistent with the principles of the present disclosure.

FIG. 18D illustrates a table containing various layer combinations that may be used to create CHB embodying features consistent with the principles of the present disclosure.

FIG. 19A illustrates a table containing various layer combinations that may be used to create CHB embodying features consistent with the principles of the present disclosure.

FIG. 19B illustrates a table containing various layer combinations that may be used to create CHB embodying features consistent with the principles of the present disclosure.

FIG. 20A illustrates a table containing various layer combinations that may be used to create CHB embodying features consistent with the principles of the present disclosure.

FIG. 20B illustrates a table containing various layer combinations that may be used to create CHB embodying features consistent with the principles of the present disclosure.

FIG. 21A illustrates a table containing various layer combinations that may be used to create CHB embodying features consistent with the principles of the present disclosure.

FIG. 21B illustrates a table containing various layer combinations that may be used to create CHB embodying features consistent with the principles of the present disclosure.

FIG. 22A illustrates a table containing various layer combinations that may be used to create CHB embodying features consistent with the principles of the present disclosure.

FIG. 22B illustrates a table containing various layer combinations that may be used to create CHB embodying features consistent with the principles of the present disclosure.

FIG. 23A illustrates a table containing various layer combinations that may be used to create CHB embodying features consistent with the principles of the present disclosure.

FIG. 23B illustrates a table containing various layer combinations that may be used to create CHB embodying features consistent with the principles of the present disclosure.

FIG. 24 illustrates a table containing various layer combinations that may be used to create CHB embodying features consistent with the principles of the present disclosure.

FIG. 25A illustrates a table containing various layer combinations that may be used to create CHB embodying features consistent with the principles of the present disclosure.

FIG. 25B illustrates a table containing various layer combinations that may be used to create CHB embodying features consistent with the principles of the present disclosure.

FIG. 25C illustrates a table containing various layer combinations that may be used to create CHB embodying features consistent with the principles of the present disclosure.

FIG. 26A illustrates a table containing various layer combinations that may be used to create CHB embodying features consistent with the principles of the present disclosure.

FIG. 26B illustrates a table containing various layer combinations that may be used to create CHB embodying features consistent with the principles of the present disclosure.

FIG. 26C illustrates a table containing various layer combinations that may be used to create CHB embodying features consistent with the principles of the present disclosure.

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components. The term "hemp feedstocks" and grammatical equivalents thereof are used herein to mean the hemp hurd and hemp bast fiber obtained from hemp plants via processing. For example, a hemp-based composite board may comprise a feedstock having at least one of hemp hurd, hemp bast fiber, and lignin which may all be combined with a binder to create the extrudate(s) that forms the coextruded extrudate sheet. The term "distributive mixing" may be defined as the physical process of blending two feedstocks such that the physical separation distances are reduced to scale where diffusion can occur, leading to more homogonous extrudates. The term "dispersive mixing" may be defined as the break-up of the minor components of a mixture into smaller size particles, which increases encapsulation of feedstocks in binder material.

Figure 1:
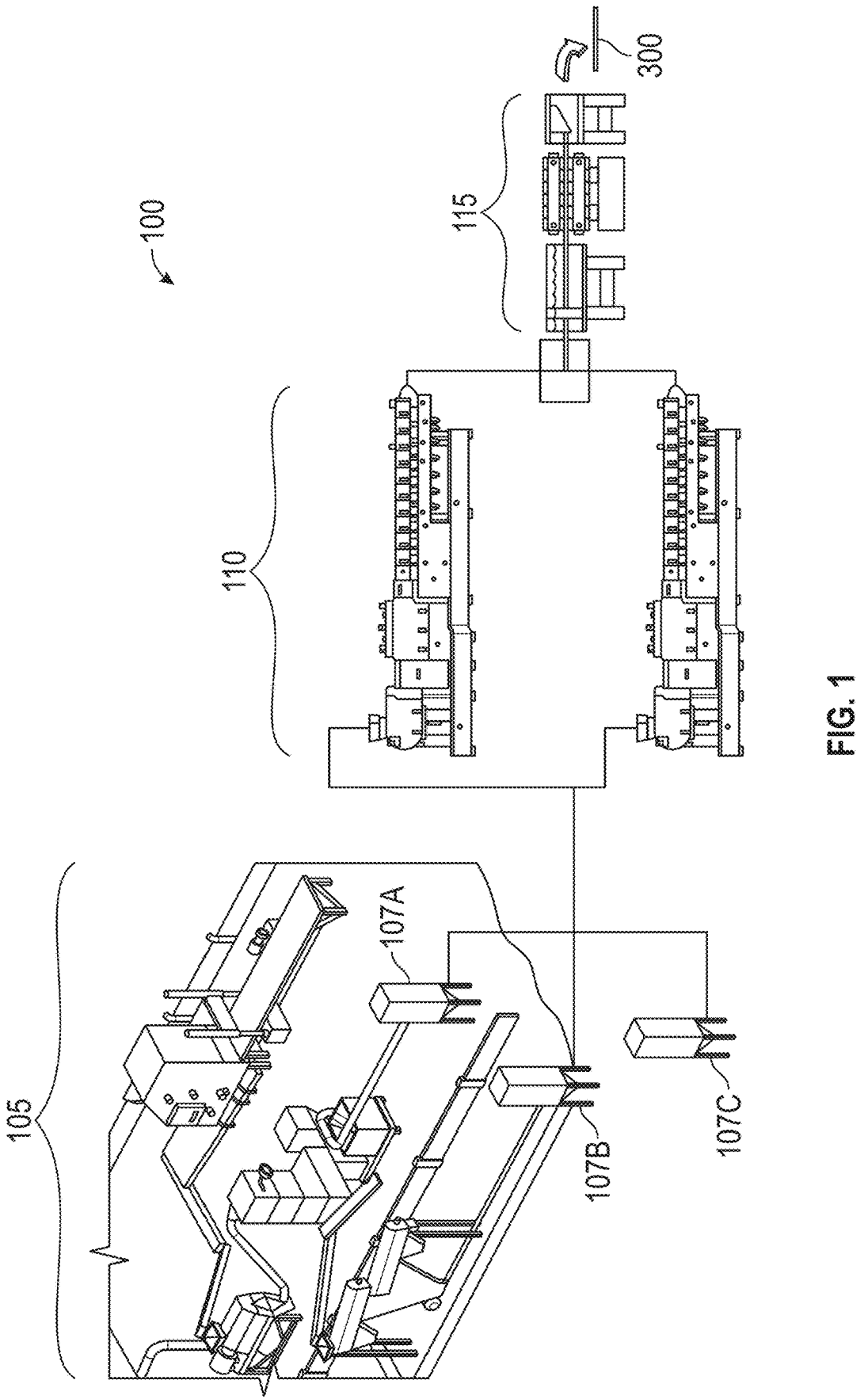
FIG. 1 illustrates a system configured to produce a finished coextruded hemp composite board (CHB) product and embodying features consistent with the principles of the present disclosure.
Figure 2A:
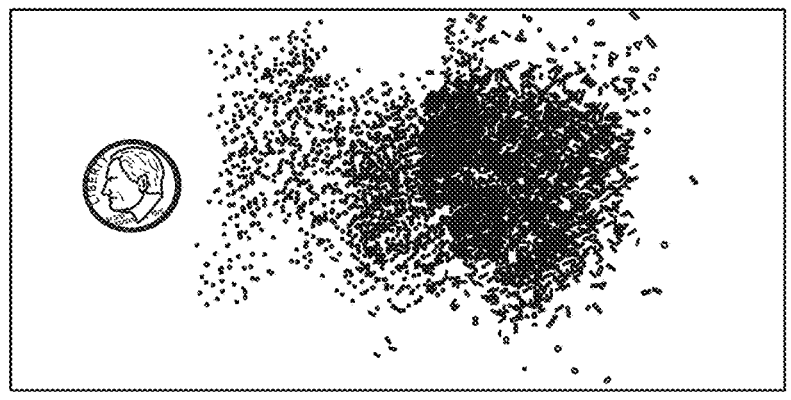
FIG. 2A illustrates hemp feedstock embodying features consistent with the principles of the present disclosure.
Figure 2B:
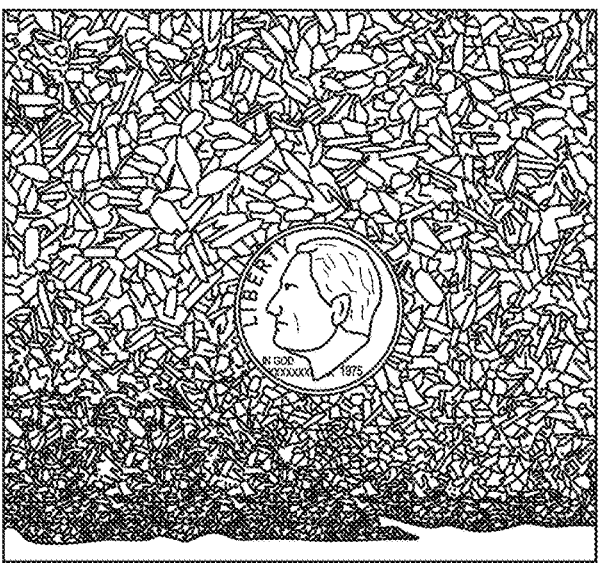
FIG. 2B illustrates hemp feedstock embodying features consistent with the principles of the present disclosure.
Figure 2C:
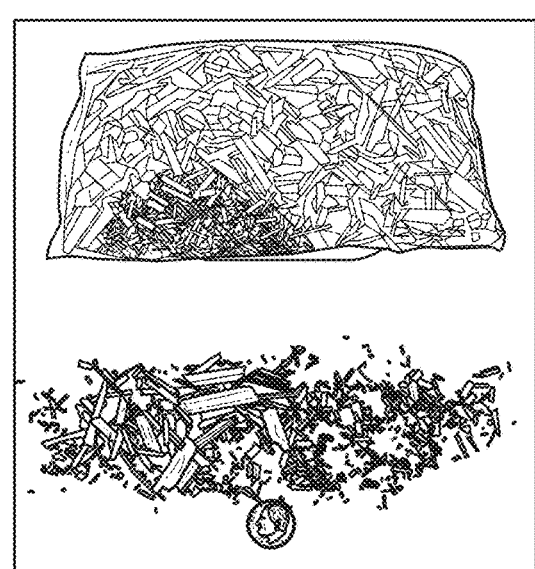
FIG. 2C illustrates hemp feedstock embodying features consistent with the principles of the present disclosure.
Figure 3A:
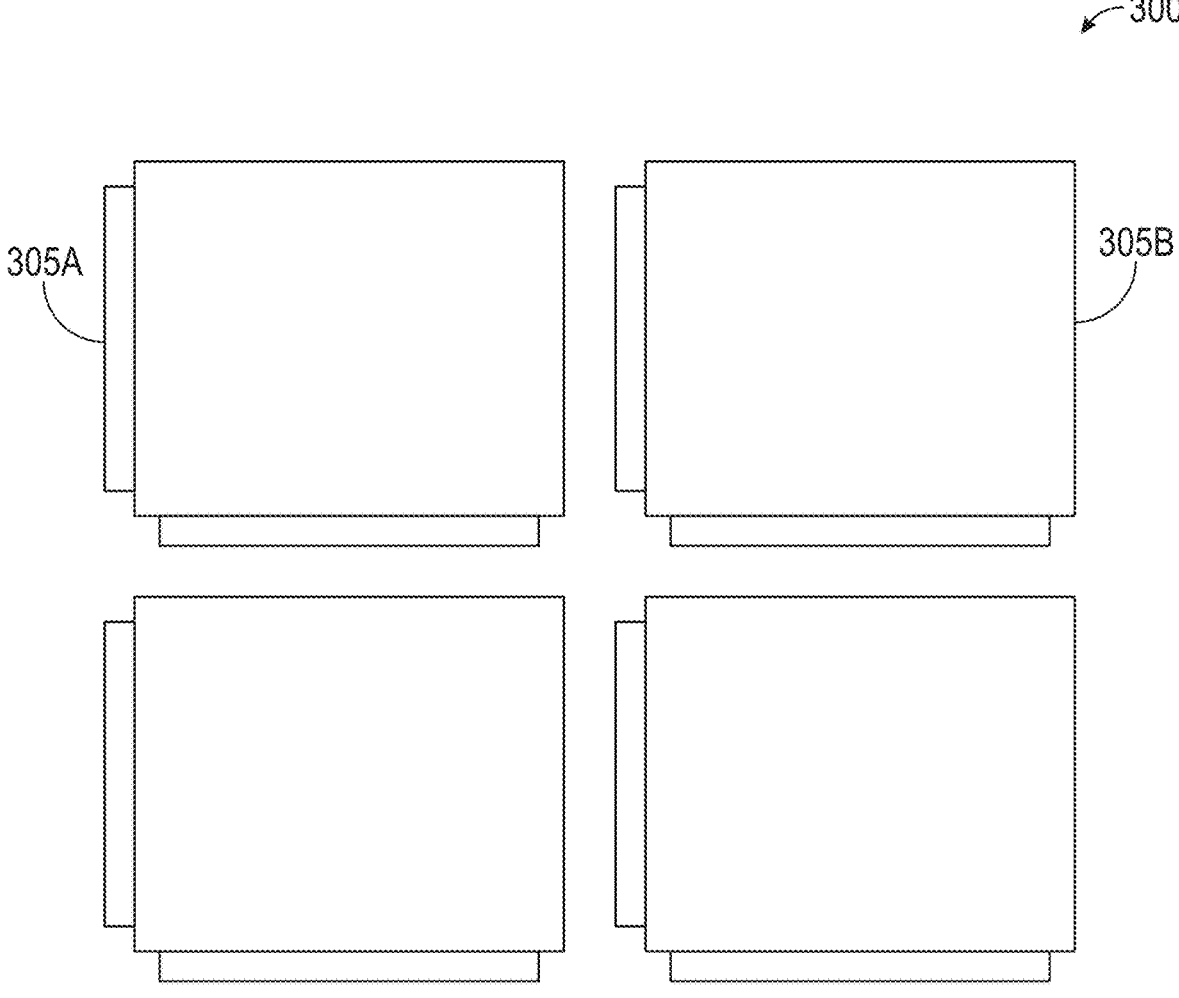
FIG. 3A illustrates a top view of a finished CHB product embodying features consistent with the principles of the present disclosure.
Figure 3B:
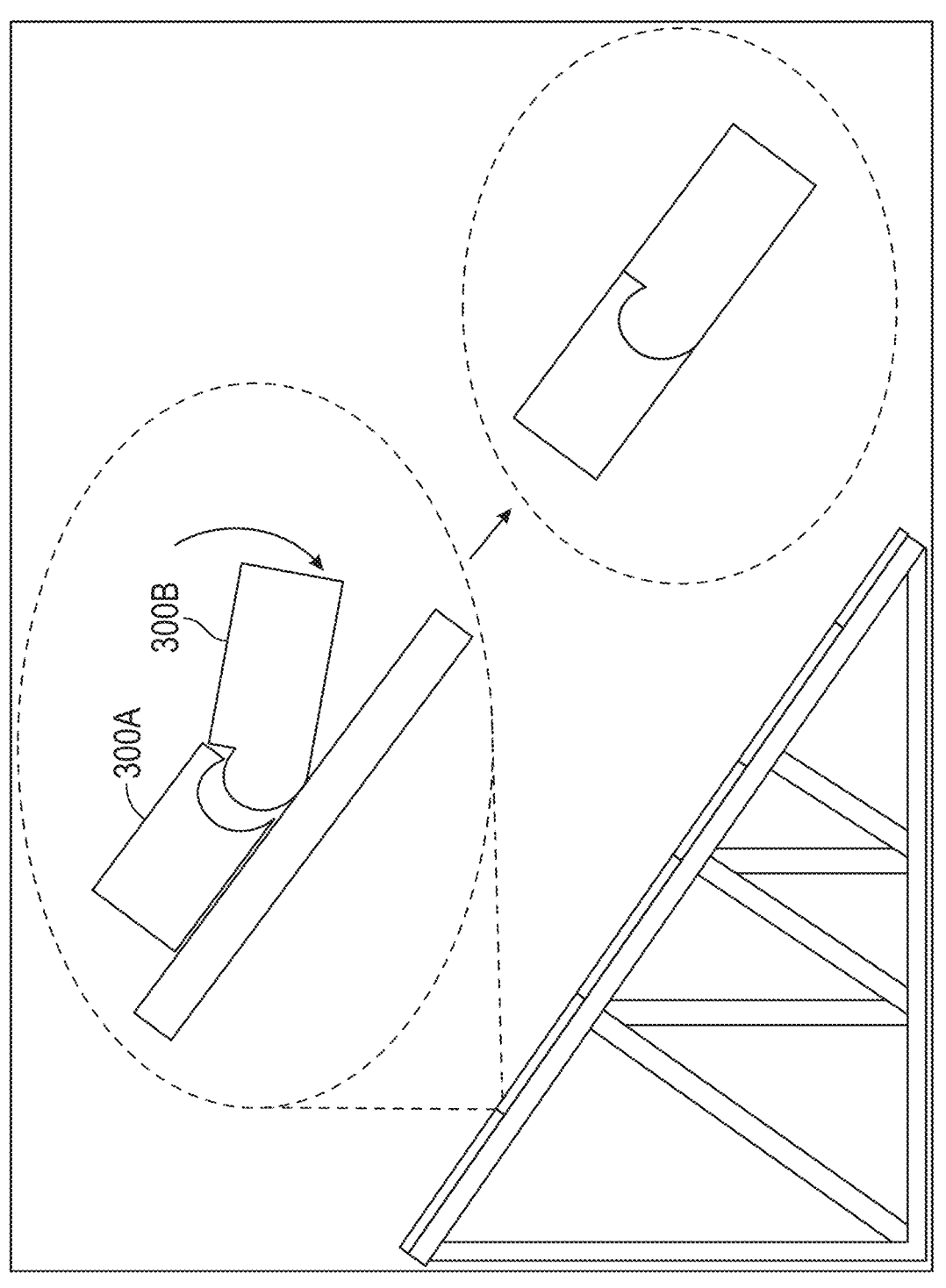
FIG. 3B illustrates a top view of a finished CHB product embodying features consistent with the principles of the present disclosure.
Figure 3C:
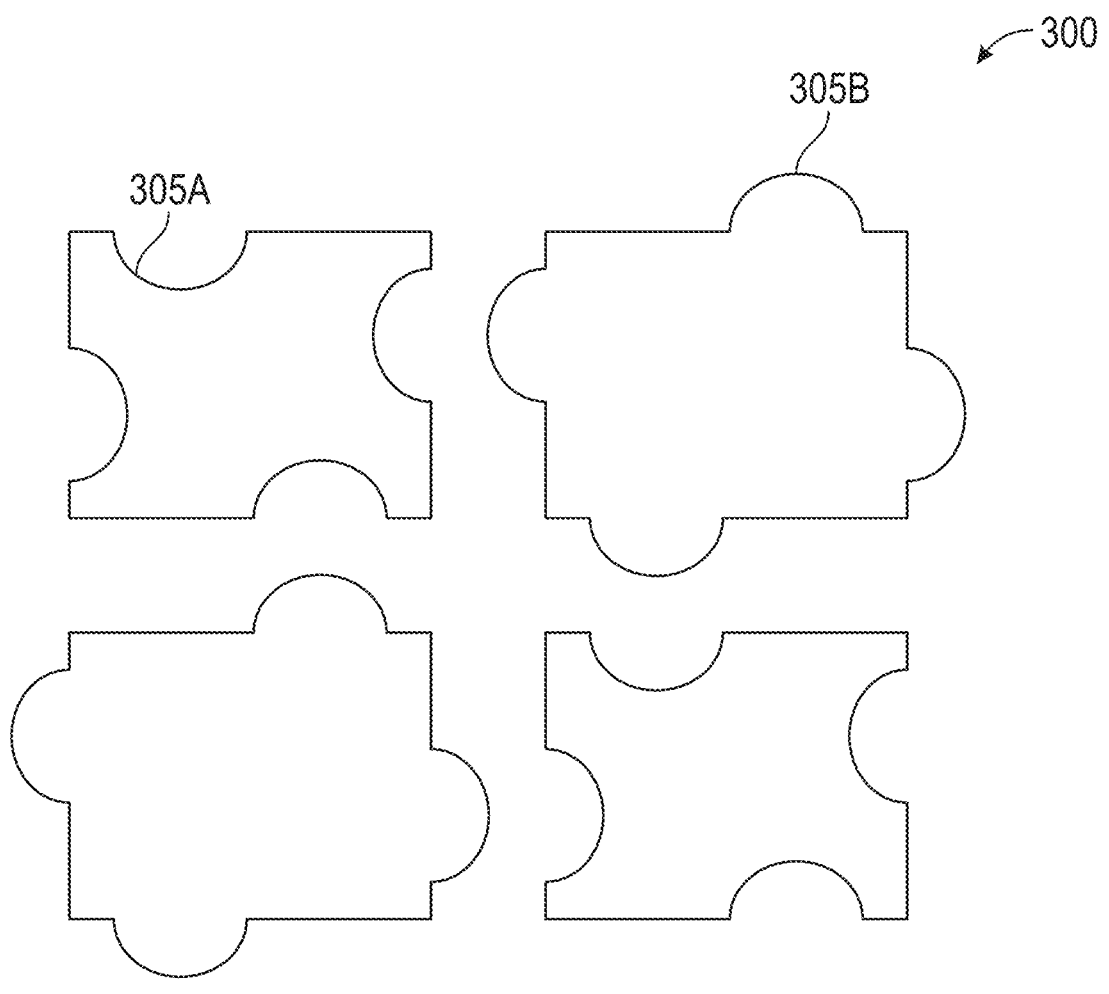
FIG. 3C illustrates a top view of a finished CHB product embodying features consistent with the principles of the present disclosure.
Figure 4:
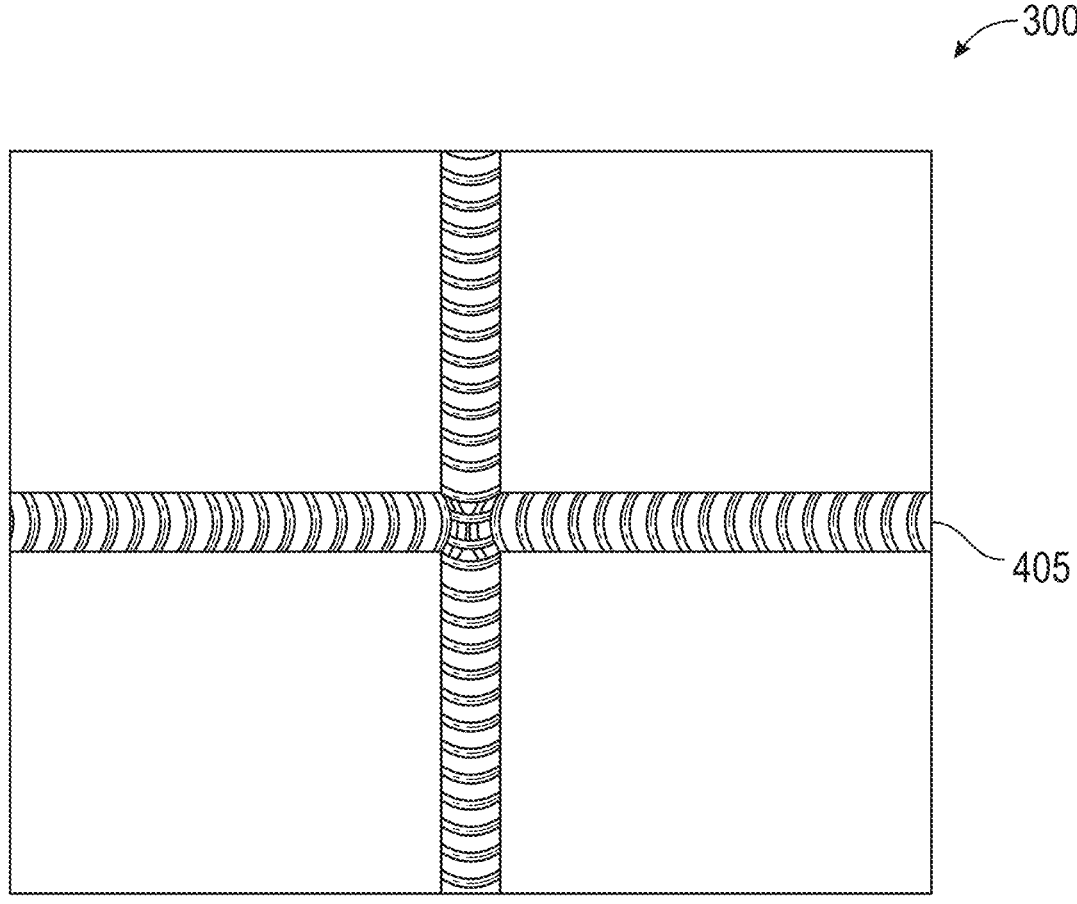
FIG. 4 illustrates a bottom view of a finished CHB product embodying features consistent with the principles of the present disclosure.
Figure 5:
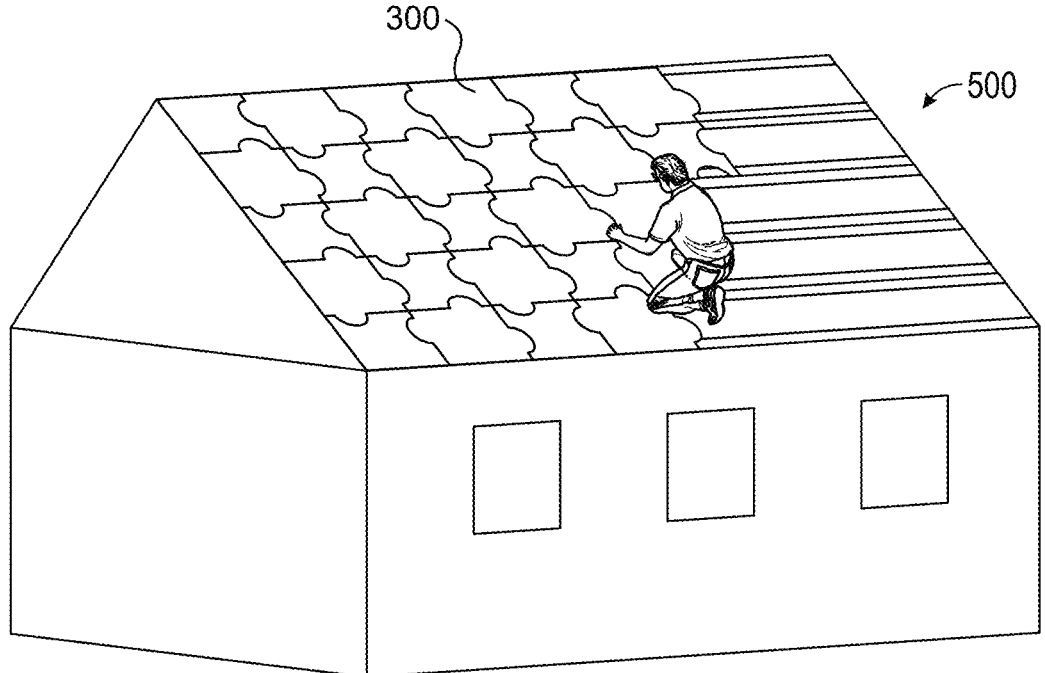
FIG. 5 illustrates an environmental view of a finished CHB product embodying features consistent with the principles of the present disclosure.
Figure 6:
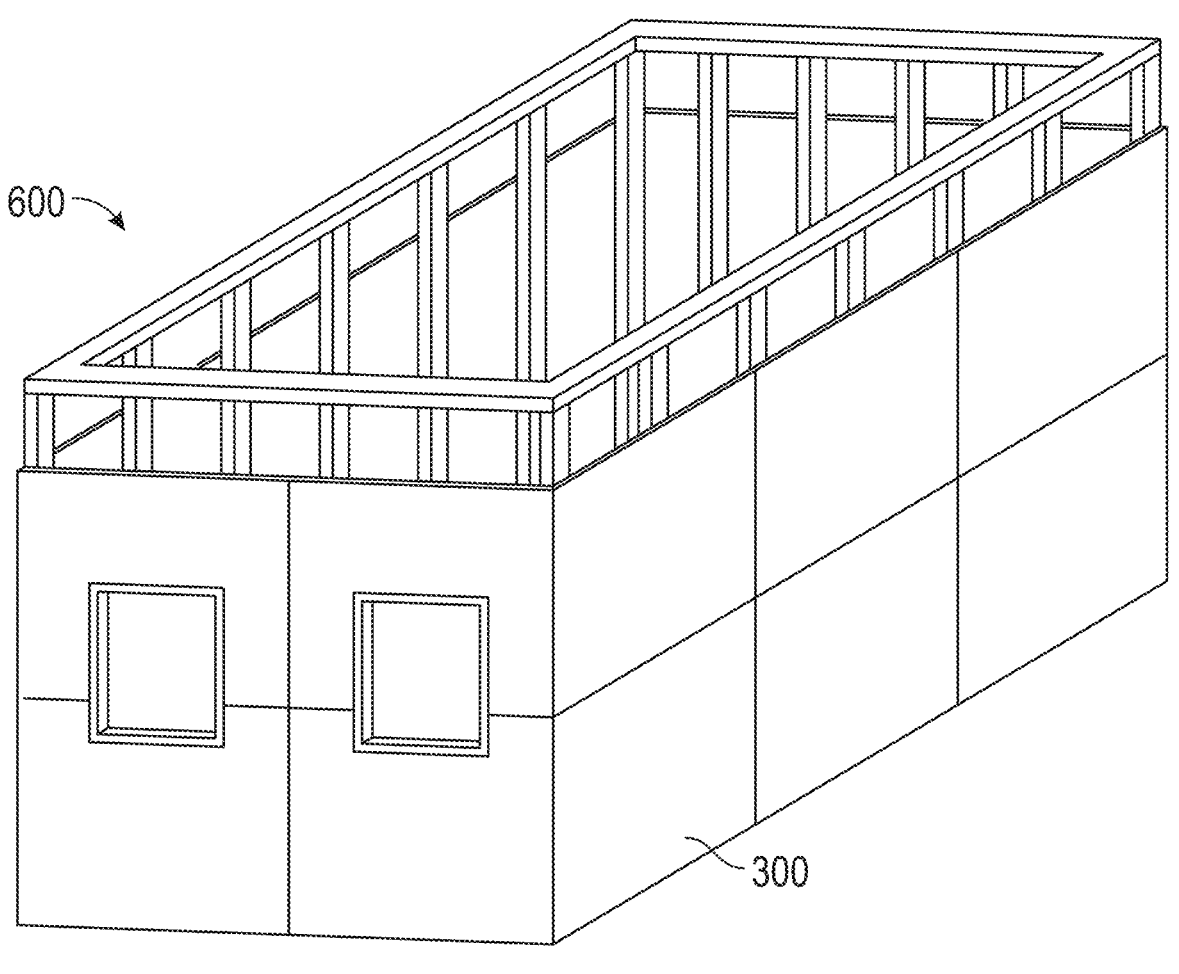
FIG. 6 illustrates an environmental view of a finished CHB product embodying features consistent with the principles of the present disclosure.
Figure 7:
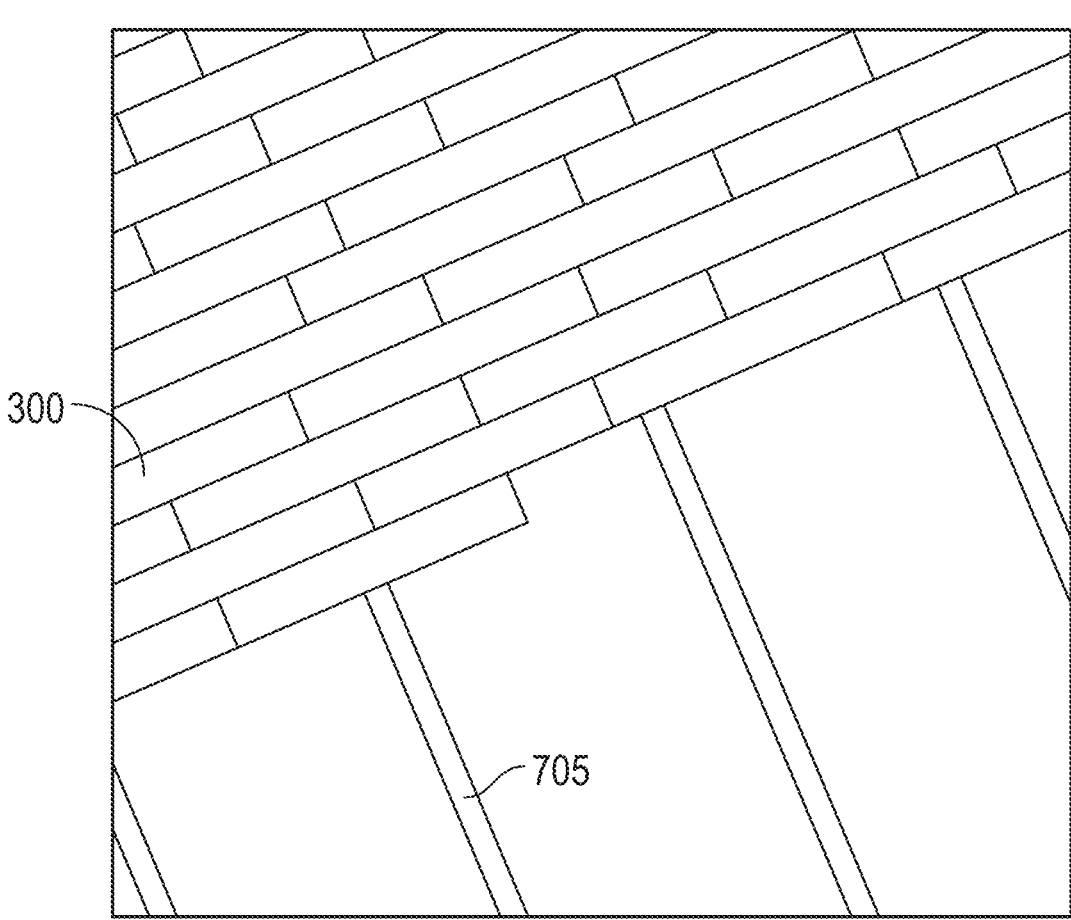
FIG. 7 illustrates an environmental view of a finished CHB product embodying features consistent with the principles of the present disclosure.
Figure 8:
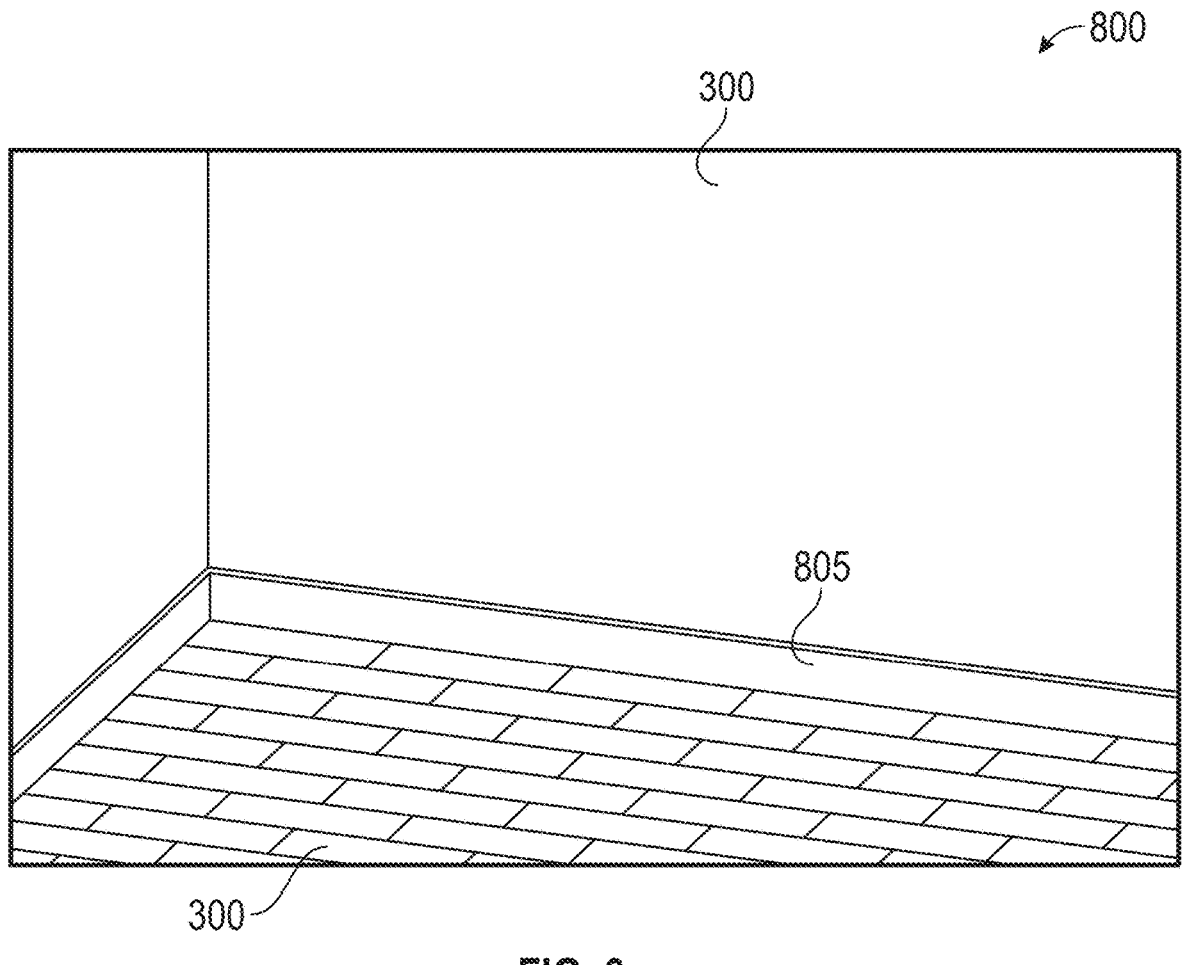
FIG. 8 illustrates an environmental view of a finished CHB product embodying features consistent with the principles of the present disclosure.
Figure 9A:
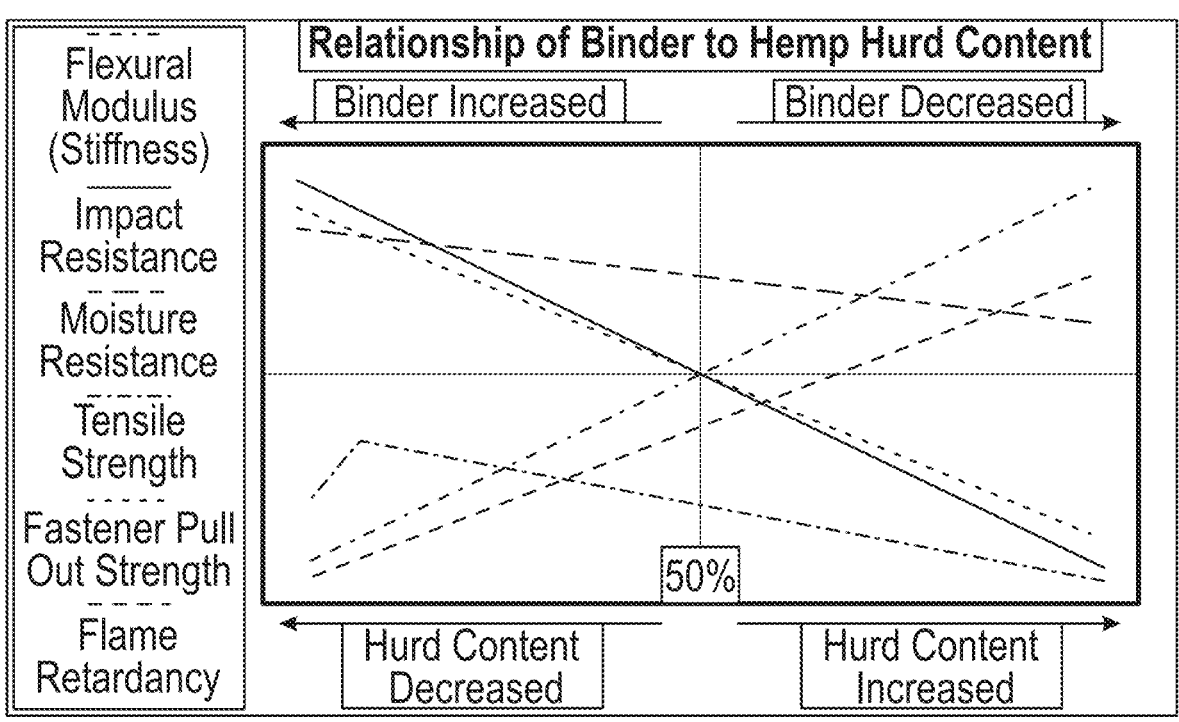
FIG. 9A is a chart illustrating physical properties of CHB as a function of the amount of hemp bast fiber relative to the amount of binder material used to produce said CHB.
Figure 9B:
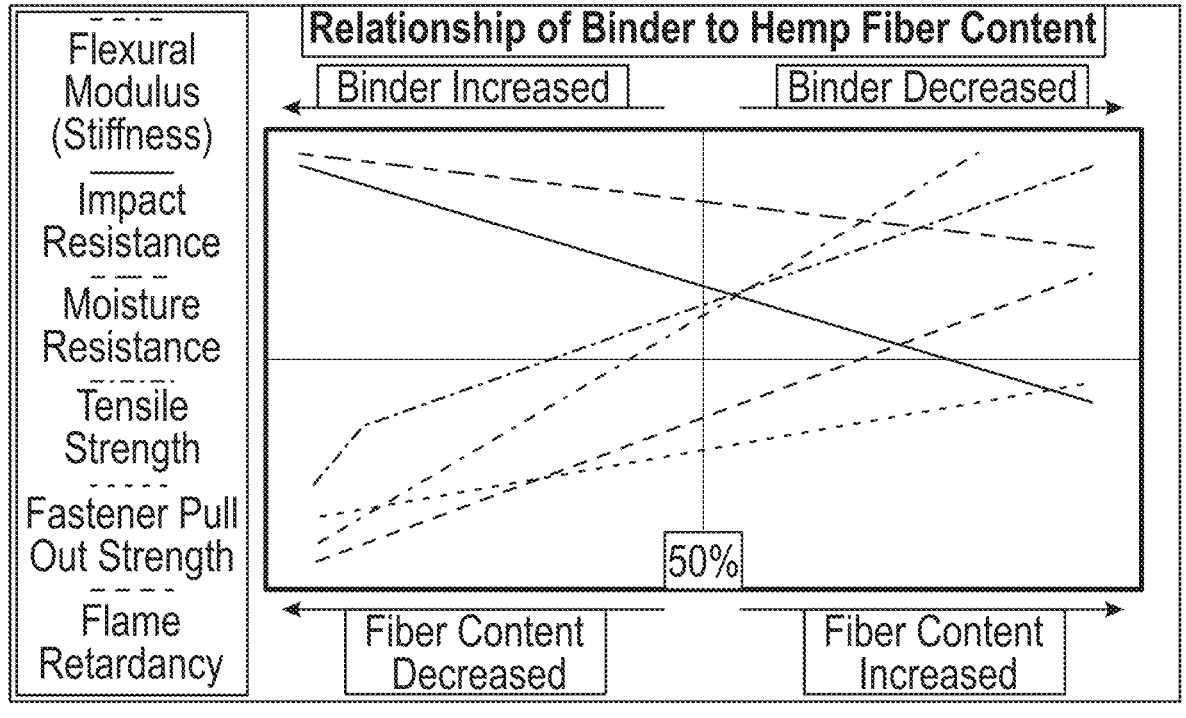
FIG. 9B illustrates physical properties of CHB as a function of the amount of hemp hurd relative to the amount of binder material used to produce said CHB.
Figure 10:
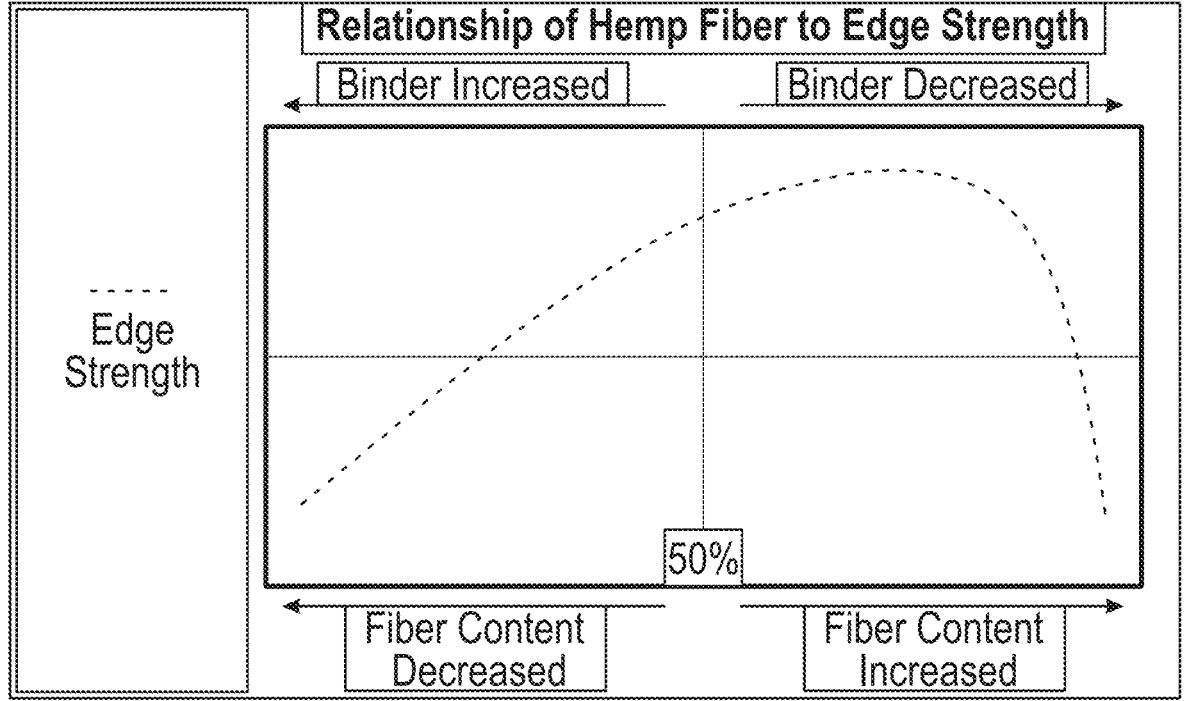
FIG. 10 illustrates edge strength of CHB as a function of the amount of hemp bast fiber used to produce said CHB.
Figure 11:
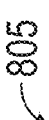
FIG. 11 illustrates at least one molded shape that may be incorporated into a finished CHB product and embodying features consistent with the principles of the present disclosure.
Figure 12:
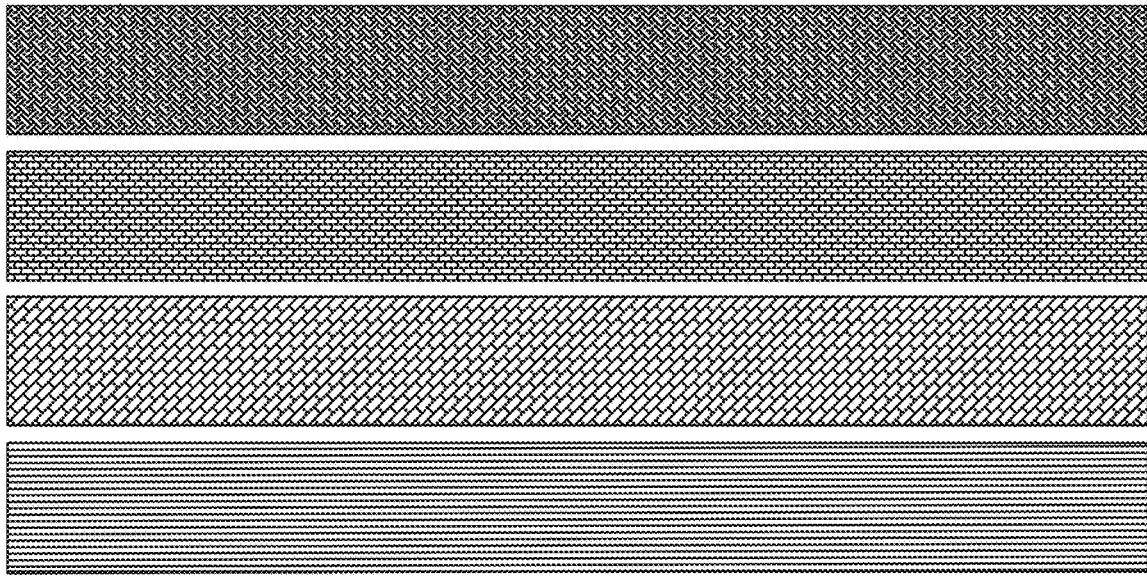
FIG. 12 illustrates a top view of an extrudate sheet comprising a pattern and embodying features consistent with the principles of the present disclosure.
Figure 13:
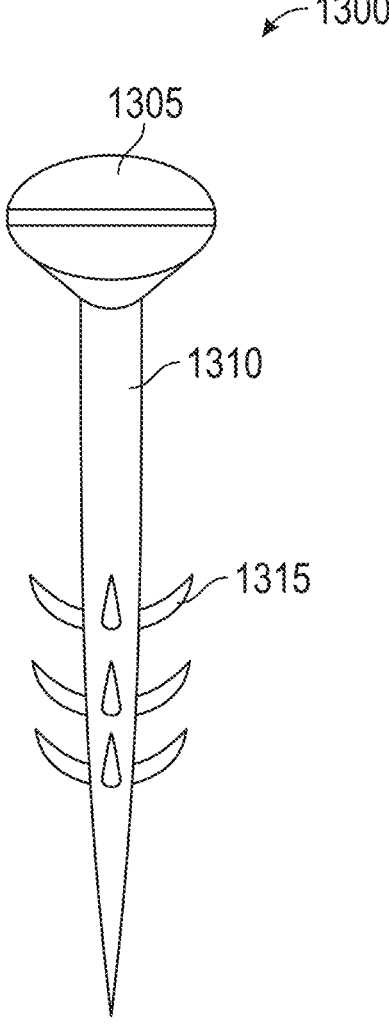
FIG. 13 illustrates a perspective view of an optional fastener embodying features consistent with the principles of the present disclosure.
Figure 14:
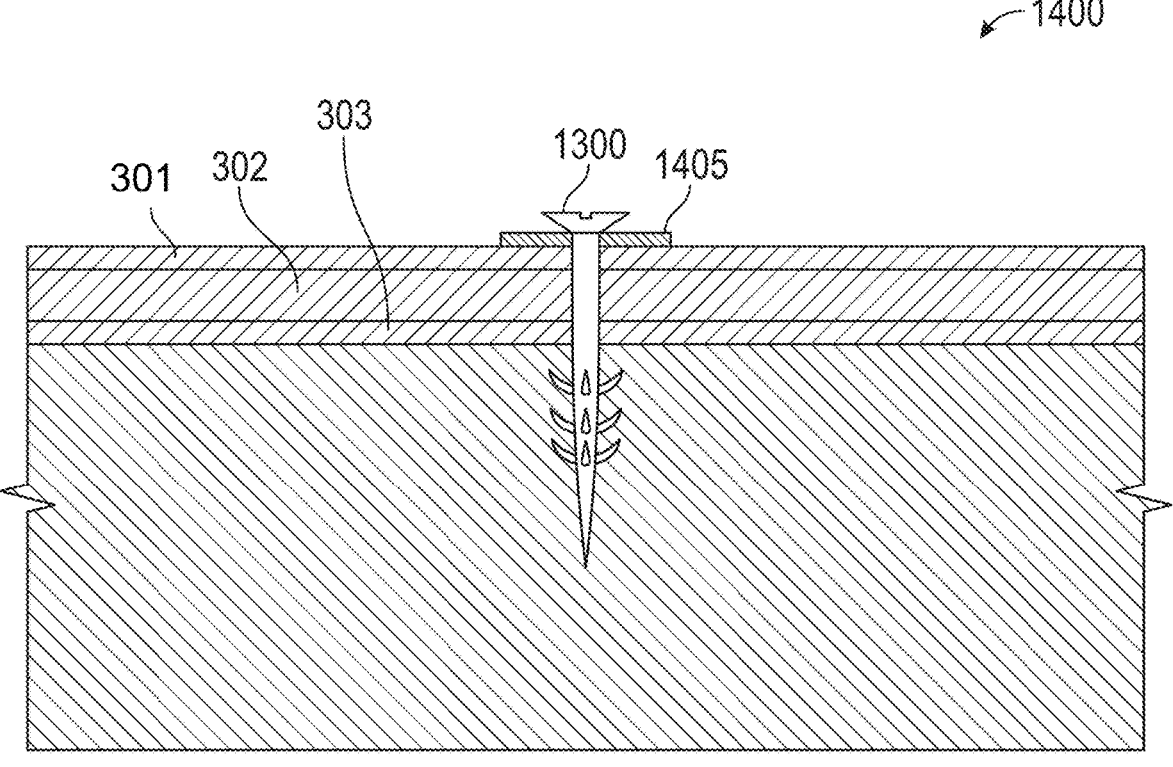
FIG. 14 illustrates an environmental view of an optional fastener embodying features consistent with the principles of the present disclosure.
Figure 17:
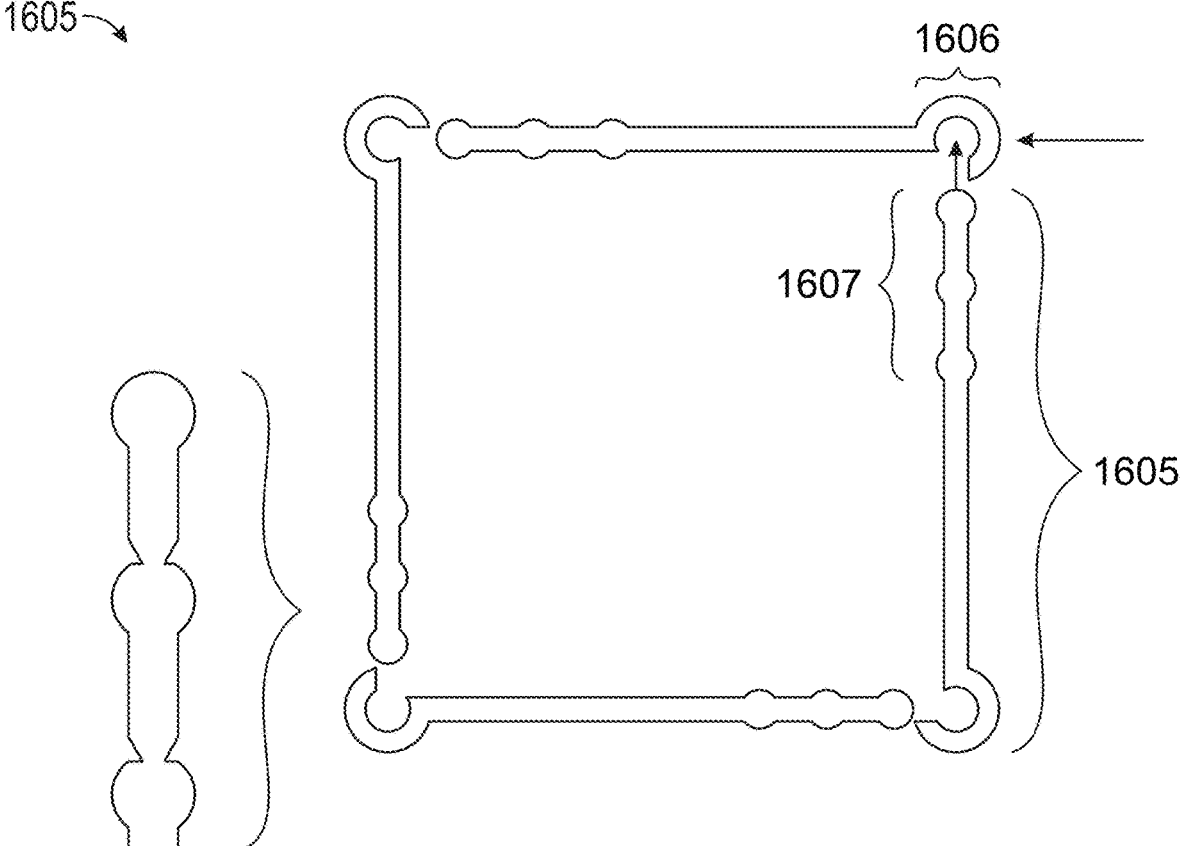
FIG. 17 illustrates how CHDB having a score and ball pattern may be used to create ductwork embodying features consistent with the principles of the present disclosure.

FIGS. 1-15 illustrate embodiments of a finished coextruded hemp composite board (CHB) product used as a replacement for floor boards, roof boards, exterior walls, and interior walls. FIG. 1 is an exemplary diagram of a system 100 that may be used to produce a finished CHB product 300, wherein said system 100 generally comprises a separation arrangement 105, upstream extrusion arrangement 110, and downstream extrusion arrangement 115. FIGS. 2A-2C illustrate different sizes of hemp feedstocks that may be used to produce a finished CHB product 300. FIGS. 3A-3C illustrate top views of finished CHB products 300 comprising various forms of interlocking panels. FIG. 4 illustrates a bottom view of a finished CHB product 300 comprising channels 405 specifically designed for the installation of electrical hardware, plumbing, radiant heating 705, etc. FIG. 5 illustrates an environmental view 500 of a finished CHB product 300 serving as the decking for a roof. FIG. 6 illustrates an environmental view 600 of a finished CHB product 300 serving as the structural sheathing for a building. FIG. 7 illustrates an environmental view 700 of a finished CHB product 300 comprising channels 405 and installed with radiant heating 705 to create heated flooring. FIG. 8 illustrates an environmental view 800 of a finished CHB product 300 comprising at least one molded shape 805 and used as wallboard in the interior of a structure. FIGS. 9A and 9B depict how physical properties of a finished CHB product 300 may be altered by changing the amount of hemp feedstock used relative the amount of binder material 107C. FIG. 10 depicts how edge strength of a finished CHB product 300 may be altered by changing the amount of hemp bast fibers 107A relative the amount of binder material 107C. FIG. 11 illustrates at least one molded shape 805 that may be incorporated into a finished CHB product 300. FIG. 12 illustrates an extrudate sheet before and after the application of a pattern 11200. FIG. 13 illustrates an optional fastener 1300 that may be used to secure a finished CHB product 300 to a building structure. FIG. 14 illustrates an environmental view of an optional fastener 1300 used to secure a finished CHB product 300 to a building structure. FIG. 15 illustrates the alignment of hemp feedstocks within the extrudate sheet after ejection of the extrudate from the upstream extrusion arrangement 110. FIG. 16 illustrates a cross-sectional view of ductwork of a heating, ventilation, and air conditioning system (HVAC) that is made from coextruded hemp duct board (CHDB) 1605. FIG. 17 illustrates how CHDB 1605 having a "score and ball" pattern 1607 may be fitted together using hook ends 1606 to create ductwork. FIGS. 18-26 illustrate tables containing example layer combinations that may be used to create a finished CHB product. It is understood that any method steps associated with a method described in the present disclosure may be carried out by a user using the system illustrated in FIGS. 1, 3-8, and 11-17.

As illustrated in FIG. 1, the process of making a finished CHB product 300 involves processing and separating hemp biomass into hemp feedstocks, primarily that of hemp bast fiber 107A and hemp hurd 107B, via the separation arrangement 105 before combining said hemp feedstocks with a binder material 107C (preferably natural binder, thermoplastic, thermoset polymer, and/or epoxy resin) via the upstream extrusion arrangement 110 to create an extrudate(s) that is subsequently molded and processed into a final product having the desired characteristics defined by the downstream extrusion arrangement 115. The extrudate(s) created within the extruder(s) of the upstream extrusion arrangement 110 is pushed through a die where the shape is formed via said extrusion arrangement into a coextruded extrudate sheet and modified via post extrusion processing until the finished CHB product 300 is obtained. The amount of hemp biomass relative to the binder is the primary variable that determines the various physical/mechanical properties of the finished CHB product 300 and allows for the finished CHB product 300 to be customized for the desired application. In a preferred embodiment, the finished CHB product 300 is configured to have interlocking panels, which increases structural stability and reduces the chance of moisture, mold and pest infiltration penetrating into the resulting structure. Further customization via the use of chemical treatments and secondary feedstocks may be used to create highly customized, anisotropic composite materials for use in a wide range of applications.

The hemp feedstocks used to produce a finished CHB product 300 are obtained by processing hemp stalks. In a preferred embodiment, as illustrated in FIG. 1, the separation arrangement 105 comprises an opener, shredder, screener, and a series of separation equipment configured to decompress, segregate, and screen, said hemp biomass, respectively into its various components, primarily hemp hurd 107B and hemp bast fiber 107A. In embodiments where only shorter hemp bast fibers 107A or hemp hurd 107B are desirable, processing machinery may be used to convert all the longer bast fibers and hurd into shorter components having a maximum desired length. Due to the nature of processing natural materials, as in hemp feedstocks, an inconsistent range of product lengths for the hemp hurd 107B and hemp bast fiber 107A can be expected. The processing of the hemp biomass using currently available commercial equipment, will result in hemp feedstocks with a range of lengths and widths that are outside of specification targets.

For example, FIG. 2A illustrates a first pass of hurd material produced from the decortication stage of the processing line, resulting in a size variance outside the specification range that are as small as 5 microns to as large as 30 millimeters. For example, FIG. 2B illustrates a first pass of hurd material produced from the decortication stage of the processing line but with an increased dwell time, resulting in a size variance where the range can be small as 5 microns to as large as 30 millimeters. For example, FIG. 2C illustrates a first pass of hurd material produced from the decortication stage of the processing line but with an increased dwell time as well as hammer milling, resulting in a size variance can be small as 5 microns to as much as 500 microns. Therefore, it is likely that the hemp feedstocks can have a large variance in size unless a screening method is used to separate the hemp feedstocks into narrower size ranges, which by nature will reduce the range of sizes, but may never completely remove the variability in size. Once the hemp has been processed into the desired feedstocks, the hemp feedstocks are preferably transferred to an upstream extrusion arrangement 110 along with a binder material 107C to create the extrudate(s) that will be used to form the coextruded extrudate sheet that is subsequently transformed into the finished CHB product 300. However, in other preferred embodiments, the hemp feedstocks may be chemically treated, such as with PEG (Polyethylene glycol), GMS (Glycerol monostearate) and GTS (Glycerol tristearate), prior to being transferred to an upstream extrusion arrangement 110, which may improve the conveyance of the hemp feedstocks as well as protect the hemp feedstocks throughout the extrusion process. In a preferred embodiment, secondary feedstocks may also be added to the extruder(s) to create the finished CHB product 300.

Though the feedstocks may be added directly to the upstream extrusion arrangement 110 without mixing (due to the mixing that occurs within the extruder(s)), some preferred embodiments of the system may mix and/or blend the hemp feedstocks prior to the extruder(s) or mix the hemp feedstocks with a binder or other ingredients to create a blended feedstock that is subsequently transferred to the extruder(s) of the upstream extrusion arrangement 110. In some preferred embodiments, the hemp biomass may not be segregated in the aforementioned separation arrangement 105. Instead, the hemp stalk will be shredded and screened to a preferred size based on the required performance of the final board in its intended application. Blending/mixing of these unseparated hemp feedstock may occur within the separation arrangement 105 or just prior to the addition of the hemp feedstocks to the extruder(s) of the upstream extrusion arrangement 110. In some preferred embodiments, a blending/mixing machine may be used to recombine hemp feedstocks. This may be of particular importance when combining hemp feedstocks derived from multiple hemp sources or from different hemp plant genetics. For example, different genetic strains of hemp may have different percentages of hurd and bast fiber as well as varied structural characteristics. Similar genetic strains can have different percentages of hurd and bast fiber depending on the growing conditions, location, water qualities, and available nutrients, etc. The objectives of mixing/blending include, but are not limited to, more consistent combination of bast fiber and hurd, increased processing efficiencies, more consistent functional properties of a finished CHB product 300 due to increased dispersive and distributed mixing properties, and more uniform distribution of feedstock(s) with the binder prior to undergoing extrusion.

As previously mentioned, the finished CHB product 300 may comprise a combination of hemp feedstocks and binder material 107C to obtain the desired physical characteristics. For example, the hemp feedstock may comprise a combination of hemp hurd 107B and hemp bast fiber 107A, which when combined with the desired binder material 107C may create a finished CHB product 300 having specific physical characteristics that differ than the physical characteristics of a finished CHB product 300 using the same binder material 107C but with the inclusion of only hemp hurd 107B or hemp bast fiber 107A. In one preferred embodiment, the extrudate(s) used to create the optimal finished CHB product 300 comprises a single hemp feedstock having a single desired length and/or diameter. In this example, hemp bast fiber 107A acting as the lone hemp feedstock may be combined with a desired binder material 107C to create a finished CHB product 300 having specific physical characteristics to meet a unique market requirement. The hemp bast fiber 107A having a maximum length of 15 millimeters may yield optimal results when combined with a specific binder. Alternatively, hemp bast fiber 107A with a maximum length of 0.5 millimeters may yield similar results for the same market requirement but with different binder. In another preferred embodiment, the extrudate(s) used to create an ideal finished CHB product 300 may require hemp feedstocks with one or more desired lengths and/or diameters having to combine with a specific binder to create the optimal finished CHB product 300. Therefore, the physical characteristics of the finished CHB product 300 may be highly dependent on which hemp feedstock(s) is combined with a specific binder material 107C but also how the size of the hemp feedstock(s) interacts with the binder material 107C when encapsulated within said binder material 107C. These feedstocks may be stored separately and added to the mixing machine and/or extruder(s) so that fine tuning of the finished CHB product 300 may be accomplished by simply changing the amount of each feedstock that is added to the mixing machine and/or extruder(s).

In some preferred embodiments, the hemp feedstocks (separated, non-separated, recombined, etc.), may be pre-compounded or partially pre-compounded with a binder material 107C a pelletized to create feedstock pellets, which may then be added to the upstream extrusion arrangement 110. Pelletized feedstocks are mixed and compounded in a way that further increases homogeneity of the extrudate due to the mixing that occurs prior to the feedstocks being pelletized. Secondary feedstocks may be added to the upstream extrusion arrangement 110 to create custom CHB products with similar hemp feedstock and binder material 107C compositions. In some embodiments, the feedstock pellets may further comprise secondary feedstocks, reducing the amount of work that must be done to manage the ratio of feedstocks/secondary feedstocks added to the upstream extrusion arrangement 110. The resulting finished CHB products 300 may have fewer defects as a result. Secondary feedstocks that may be pre-compounded or partially pre-compounded with the hemp feedstock and binder material 107C include, but are not limited to, color pigments, UV inhibitors, carbon black, flame retardants, metal nanoparticles, protective agents that protect hemp feedstocks and other feedstocks from degradation, or any combination thereof. Equipment that may be used to create pelletized feedstocks include, but are not limited to, single screw extruders, twin-screw extruders, "Banbury" type mixers, and Farrel Continuous Mixers (FCM), or any combination thereof. Though single screw, twin, screw, and "Banbury" type mixers are discussed as the means for creating the pelletized feedstocks, one skilled in the art will understand that other equipment and methods may be used to pre-compound the feedstocks without departing from the inventive subject matter described herein.

In a preferred embodiment, hemp feedstocks are compounded with binder material 107C using a FCM type mixer, which may achieve loadings of 40%-80% by weight of non-binder feedstock materials. However, other mixers may be used to compound the various feedstocks without departing from the inventive subject matter described herein. In some preferred embodiments, mixers may be used to create a plurality of pelletized feedstocks having a plurality of different loadings, which may be added to the barrel of the extruder as needed. Additionally, mixers may be used to create a plurality of specialized pelletized feedstocks comprising hemp feedstock, binder material, and one or more secondary feedstocks. By using a plurality of pelletized feedstocks and specialized pelletized feedstocks having different compositions, an "additive" approach to loading the extruder may be used. This method further increases the efficiency in which users of the upstream extrusion arrangement 110 may create customized finished EHB products. The various hemp feedstocks, binder materials, and secondary feedstocks may also be pre-blended to achieve various mechanical properties in the finished EHB product as well as increase the efficiency in which virgin polymers with recycled polymers are combined.

In a preferred embodiment, hemp hurd 107B used to create the finished CHB product 300 comprises a particle size of 0.002-8 millimeters, and the hemp bast fiber 107A used to create the finished CHB product 300 comprises a diameter range of 0.002-0.200 millimeters and a length range of 0.002-36 millimeters. However, one with skill in the art will understand that hemp hurd 107B and hemp bast fiber 107A having other diameters and/or lengths may be used without departing from the inventive subject matter described herein. Further, one with skill in the art will understand that the screening or micronization process used to create the hemp feedstocks can produce a "broad range" of outputs ranging from a "sub-micron" size to larger particles that exceed 8 millimeters. The benefit of using hemp feedstocks with a broad range of lengths and diameters is that it allows for greater loading of the hemp feedstocks and any secondary feedstocks, which may produce a superior finished CHB product 300. A cross sectional view of the finished CHB product 300 under a microscope will show the variable length and width of the feedstocks are highly dispersed throughout, resulting in a more consistent matrix between the binder material 107C and the feedstocks. This consistency contributes to the overall strength of the product by eliminating weak points in the board by allowing for more consistent binding throughout. Also, this consistency allows for better encapsulation of the raw materials and improves the "compressive strength" of the final product. Additionally, finished CHB products 300 created using hemp feedstocks with a broad range of lengths and diameters have enhanced UV resistance by eliminating UV light permeation into the hemp-binder matrix due to broad range of lengths and diameters dispersed through the finished CHB product 300 that prevent light permeation.

As previously mentioned, the physical properties of the finished CHB product 300 may be fine-tuned based on the different percentages of hemp feedstock and binder material 107C used to create the extrudate(s). A higher percentage of hemp feedstock relative to the binder material 107C will increase tensile stress, tensile strength, impact strength, and flexural modulus in the finished CHB product 300. For example, because the reactive hydroxyl groups of hemp bast fibers 107A offer effective interaction between the hemp feedstocks and a polar binder material 107C, a finished CHB product 300 having a higher percentage of hemp feedstock can absorb energy from an impact better than a finished CHB product 300 with a lower percentage of hemp feedstock. As such, a finished CHB product 300 having a higher percentage of hemp bast fiber 107A may be superior for roof boards that contain increased bast fiber content to increase board stiffness. Because the encapsulation of the hemp bast fiber 107A by the binder material 107C in all CHB versions creates a much more water-resistant material, a finished CHB product 300 comprising a higher percentage of hemp bast fiber 107A will be particularly useful in roof boards in regions that are prone to experience hailstorms, heavy rainfall or high humidity.

FIGS. 9A-10 illustrate some of the ways in which hemp hurd 107B and hemp bast fiber 107A may be used in various percentages with a binder to maximize/minimize different physical properties and/or mechanical properties of the finished CHB product 300. In particular, a higher percentage of hemp bast fiber 107A and/or hemp hurd 107B relative to a binder percentage in a finished CHB product 300 can increase edge strength, flexural modulus, tensile/pull strength, and screw pull strength (fastener retention). Conversely, a decrease in hemp feedstocks and an increase in a binder may increase the ductile impact strength. An increase in edge strength is particularly beneficial for construction boards since boards that have higher edge strengths will experience less cracking during transport and installation and be more durable in their application. For example, finished CHB products 300 created for use as a subfloor under carpet may have a core layer comprising 30% by volume hemp feedstock and 70% by volume nonpolar, virgin polymer binder positioned between two exterior layers comprising approximately 25% by volume micronized hemp feedstock, 10% by volume bio-derived carbon, and 65% by volume nonpolar, virgin polymer binder with an amount of coupling agent to enhance bonding between the hemp feedstock encapsulated within the nonpolar, virgin polymer binder. This will result in a finished CHB product 300 optimized for subflooring, wherein the edge strength of the exterior layers is at least as great as that of existing construction boards. Further, this CHB subflooring material will possess superior water resistant, pest resistant, and rot resistance properties. In a preferred embodiment, hemp hurd 107B and hemp bast fiber 107A loading is kept between 15% and 50% by volume to reduce discontinuity, non-homogeneity, and agglomeration of the hemp feedstocks during the extrusion process; however, as little as 5% by volume and as much as 95% by volume of hemp bast fiber 107A and/or hemp hurd 107B may be used without departing from the inventive subject matter described herein.

The amount of hemp feedstock as a percentage of the extrudate for each layer depends on the targeted end use application of the finished CHB product 300. The desired material and board performance are achieved based on the increase or decrease of all the various feedstock combinations plus the impact of the board thickness. The percentage of hemp feedstock in relation to the binder material 107C may be increased or decreased, depending on the binder material 107C used, to create a finished CHB product 300 with a higher fastener retention, therefore increasing rigidity at the screw flight and the fastener grip points. For example, finished CHB products 300 comprising at least one layer having a softer binder material 107C will have a higher fastener retention despite an increased hemp hurd 107B content and lower bast fiber content, assuming highly effective dispersion and a broad array of hurd sizes are used (for instance, ranging from 5 micron to 16 mm) for the extrudate.

Further, fastener retention increases as the amount of hemp feedstock increases, the board thickness increases, and the bast fiber length increases (to a point of diminishing returns). For example, a thicker board may utilize a blend of feedstocks that has an increased amount of hurd in a smaller micron range and decreased bast fiber content in a longer bast fiber range. This specific combination increases screw retention similar to a thinner board that contains a decreased hurd content but a higher bast fiber and binder content to achieve a balance of impact resistance, fastener retention, and flexural modulus. One skilled in the art will understand that these varied material matrices do not depart from the inventive subject matter contained herein. As such, an CHB product can be optimized for situations where it may be required to hold a plurality of fasteners under variable stresses. For example, a finished CHB product 300 optimized for use as framing for furniture construction may require a higher fastener retention due to the number of screws and/or nails used to produce the final furniture product and may require a certain amount of binder to reduce the cracking that can occur when fasteners such as screws and nails are used.

Further, in embodiments where a finished CHB product 300 is to be used in a setting where board weight is a major factor, a higher percentage of hemp feedstock may be better used due to the specific gravity being lower than that of the binder. This may result in a finished CHB product 300 with a lower density in addition to a higher fastener retention based on the type of fastener. In embodiments where a lower density board may be desired due to an installation where weight is an issue, the combination of final thickness, increased hemp feedstocks, and an appropriate amount of binder can create a lighter weight board with a high degree of strength while also preventing sagging. Further, this lighter weight board should decrease the physical burden on the installer. For example, a finished CHB product 300 optimized for the finishing of an interior ceiling may require a higher fastener retention and be lighter in weight to make it less burdensome for the installer. In this example it may be beneficial for such a finished CHB product 300 to integrate a blowing agent during the extrusion process to increase the insulative and sound deadening properties plus decreasing its weight while maintaining high fastener retention. In addition, non-foamed finished CHB products 300 containing a total of ~40% or more hemp feedstock by volume will be lighter than the traditional construction material equivalent. Foamed finished CHB products 300 can possess as little as 5% hemp feedstock and be lighter than its equivalent traditional construction material. For example, a 4'×8' sheet of a finished CHB product 300 optimized for wallboard comprising a first layer 301 containing 50% hemp feedstock by volume and 50% binder material 107C by volume and a second foamed layer comprising 60% hemp feedstock by volume and 40% binder material 107C by volume will be significantly lighter than a traditional gypsum-based board of the same size. This could greatly reduce shipping costs of construction materials over long distances and reduce the physical burden of installation.

For certain applications, a finished CHB product 300 may require a high degree of water resistance. This can be achieved by increasing the percentage of binder used to encapsulate the hemp feedstocks. For example, a finished CHB product 300 optimized for structural sheathing may require a higher moisture resistance and therefore may have a higher percentage of binder than hemp feedstock. Further, a finished CHB product 300 having at least 15% by volume of hemp feedstock will allow a clean pass through of a fastener without the board cracking. This might be particularly important for high volume installations when a high-pressure pneumatic nail gun is used. A higher binder content will also increase the thermal/hydraulic stability of the finished CHB product 300. Traditional board applications where there is a high likelihood of thermal/hydraulic expansion require a gap between the installed boards to accommodate this expansion and contraction and to avoid heaving of the boards when installed. This gap between boards is often mandated for OSB decking under roofs. A finished CHB product 300 optimized for roofs will not require any gap during installation. The finished CHB product 300 will be thermally and hydraulically stable due to the highly dispersed and encapsulated non-binder feedstocks, which will prevent any thermal/hydraulic expansion and contraction from occurring. A finished CHB product 300 optimized for roofs preferably comprises a blend of hemp feedstocks and binder material 107C that balances the impact resistance, edge strength, and fastener retention properties with the water resistance properties gained by having a higher percentage of nonpolar binder material 107C.

In a preferred embodiment, a finished CHB product 300 preferably comprises at least 30% binder material 107C. In comparison, typical oriented strand board (OSB) contains only 5% to 10% binder resulting in a much lower encapsulation of the wood particles. The limited encapsulation of the wood particles in OSB has created significant degradation problems in buildings where exposure to moisture is an issue. Processed hemp feedstocks because of their smaller particle size allow for more thorough encapsulation of the raw material by the binder. This encapsulation of the non-binder materials 107C eliminates the potential of the finished CHB product 300 wicking moisture. The same board degradation due to moisture penetration is also applicable to plywood and drywall. The hygroscopic properties of a finished CHB product 300 are de minimis when compared to those of wood-based boards like plywood and OSB and gypsum-based drywall. The inherent moisture resistance will result in increased performance and durability over the lifetime of the finished CHB product 300 when compared to the durability of traditional wood-based boards and gypsum-based drywall.

In embodiments of a finished CHB product 300 comprising a hemp feedstock having a maximum particle size of 150-200 microns and at least 30% nonpolar binder material 107C, where effective dispersion of the feedstocks has been achieved through shear forces created in the extrusion process, water molecules should be unable to penetrate more than 150-200 microns into the finished CHB product 300 due to the repulsion of said water molecules by the encapsulated nonpolar binder material 107C. However, even in embodiments of a finished CHB product 300 comprising a hemp feedstock having a maximum particle size of 150-200 microns and at least 30% nonpolar binder material 107C and where encapsulation is less than perfect, water penetration into the boards should be no greater than 1000 microns due to the unlikely scenario in which multiple particles/fibers of hemp feedstock would be aligned without any non-polar binder material 107C situated in between, as illustrated in FIG. 15. As such, a finished CHB product 300 that comprises a nonpolar binder and wherein the extrudate(s) from which it is formed underwent adequate distributive and dispersive mixing within the upstream extrusion arrangement 110 should be highly water resistant.

In a preferred embodiment, the binder material 107C may be a virgin binder material 107C, post-consumer/industrial waste binder material 107C, or a combination of the two. Types of materials that may act as the binder material 107C include, but are not limited to, starch-based binders, polymers, polyester resin, epoxy resin, polyurethane resin, ISO resin, vinyl ester resin, and methyl ethyl ketone peroxide (MEKP). In a preferred embodiment, the binder material 107C is at least one of a thermoplastic/thermoset, epoxy binder, non-polymer binder, non-epoxy binder, or any combination thereof. For example, a thermoplastic may be combined with a low temperature epoxy (LTE) to create a binder material 107C that may be both curable and/or polymerizable, depending on the desired finished CHB product 300. In some preferred embodiments, the epoxy may be a heat-cured epoxy, which may be combined with a thermoplastic having a melt temperature similar in range to the curing temperature of the epoxy.

The hemp bast fiber 107A and hemp hurd 107B are preferably combined with a polymer binder to create the extrudate(s). The polymer binder is preferably that of the thermoplastic resin material possessing the ability to encapsulate the hemp feedstocks that reduce water absorption of the finished CHB product 300. In a preferred embodiment, thermoplastics used as a feedstock to create the finished CHB product 300 include, but are not limited to polypropylene (PP)(sPP)(aPP), copolymer polypropylene/polypropylene random copolymer (PPR), Polypropylene random crystallinity temperature (PP-RCT), polyethylene (PE), linear low density polyethylene (LLDPE), ultra-high molecular weight polyethylene (UHMWPE), high density polyethylene (HDPE), low density polyethylene (LDPE), polyethylene terephthalate (PET or PETE), polyamide (Nylon/PA), acrylonitrile butadiene styrene (ABS), acrylonitrile styrene acrylate (ASA), cellulose acetate (CA), polybutylene terephthalate (PBT), polycarbonates (PC), polymethyl methacrylate (PMMA), polyvinyl chloride (PVC), polyphenylene oxide (PPO), polystyrene (PS), extruded polystyrene (XPS), styrene acrylonitrile (SAN), thermoplastic elastomer (TPE), thermoplastic urethane (TPU), ethylene propylene diene terpolymer (EPDM), polyisocyanurates (PIR), styrene butadiene styrene (SBS), phenolic resins, or any combination thereof. In some preferred embodiments, biodegradable resins may be preferred. These include but are not limited to Polyhydroxyalkanoates (PHA), Polylactic acid (PLA), Polybutylene adipate terephthalate (PBAT), or Polycaprolactone.

As previously mentioned, some embodiments of a finished CHB product 300 may further comprise secondary feedstocks and/or chemical treatment of the hemp feedstocks or secondary feedstocks. For instance, chemical treatments used to increase conveyance may be used to treat hemp feedstocks, as previously noted, but may also be used to treat non-hemp feedstocks such as wood fines and the other non-binder, natural feedstocks. Secondary feedstocks may be added to the hemp feedstocks and binder material 107C to optimize a finished CHB product 300 so that it has physical/mechanical properties designed for a specific purpose. Types of secondary feedstocks that may be used to optimize a finished CHB product 300 include, but are not limited to, bio-derived carbon, gypsum, glass fiber, wood fines, blowing agents, additive flame retardants, anti-static agents, antimicrobial agents, coupling agents, feedstock protective agents, or any combination thereof. Blowing agents may be defined as an additive used to produce a cellular structure within the finished CHB product 300 by causing a foaming process within the extrudate(s) before or after it is ejected from the extruder(s). The cellular structure resulting from the use of this secondary feedstock decreases density and increases the insulative properties of the finished CHB product 300. Further, because the amount of feedstock used to create each cubic foot of finished CHB product 300 is reduced due to the resulting cellular structure, the cost to produce a blown, finished CHB product 300 is also reduced. As such, a blown, finished CHB product 300 may be useful in applications such as a gypsum-based wallboard replacement. Compounds that may act as the blowing agent include, but are not limited to, amines, amides, urea, urea-formaldehyde resins, dicyandiamide, melamine, polyamides, or any combination thereof.

Additive flame retardants may be defined as secondary feedstocks designed to inhibit/prevent the ignition of the binder material 107C and/or hemp feedstocks of the finished CHB product 300. In a preferred embodiment, flame retardants suppress the ignition of the binder material 107C and/or hemp feedstocks by creating a layer of charring on the outer surface of the finished CHB product 300 when said finished CHB product 300 is exposed to heat and/or a flame. Preferably the additive flame retardant comprises an acid source, charring agent, and blowing agent. Compounds that may act as the acid source include, but are not limited to, ammonium salts phosphates, polyphosphates, sulfates, and halides. Compounds that may act as the charring agent may include, but are not limited to, polyhydric compounds, starch, dextrin, sorbitol pentaerythritol (monomer, dimer, trimer), phenol-formaldehyde resins, and methylol melamine, or any combination thereof. In other embodiments, red phosphorous may be added to the hemp feedstocks and binder material 107C at a concentration between 2-10% by volume. This may be particularly useful for a finished CHB product 300 comprised of a thermoplastic binder material 107C such as polyolefins (for example polypropylene and polyethylene, etc.) polyamides, polyesters, polycarbonates, and ethyl-vinyl acetate or thermoset binder materials 107C such as polyurethanes, epoxies, melamine formaldehyde, and polyisocyanurates since it can catalyze char creation with said thermoplastic binder materials 107C and thermoset binder materials 107C as well as the hemp feedstocks to help prevent further combustion. Furthermore, the high thermal stability of red phosphorous (up to 240 degrees Celsius) allows for it to survive the extrusion process without decomposing.

Anti-static agents may be defined as secondary feedstocks designed to reduce the static retention of the finished CHB product 300. Because hemp feedstocks can themselves act as antistatic agents, a finished CHB product 300 will not usually require the addition of an antistatic agent. However, in embodiments of a finished CHB product 300 that comprises a very high percentage of binder material 107C, an antistatic agent may be used. In a preferred embodiment, carbon may be used as the antistatic agent. Types of carbon that may be used as an antistatic agent include but are not limited to a bio-based carbon, graphene, carbon nanotubes, carbon fibers, carbon black, graphite, or any combination thereof. UV stabilization agents may be defined as secondary feedstocks that combat the deterioration of the binder material 107C and significantly extend the life span of the finished CHB product 300 by inhibiting the photo oxidation process. UV stabilization agents may be effective at only 0.1-0.5% by volume relative to the weight of the binder material 107C and can be added during the extrusion process. In a preferred embodiment, types of secondary feedstocks that may be used as the UV stabilization agent include, but are not limited to, UV absorbers, quenchers, hindered amine light stabilizers, or any combination thereof. UV degradation may also be prohibited by the addition of carbon black for boards of a black color, or TIO2 for boards of a white color, or other color pigments, as well as hemp and other reclaimed feedstocks as all of these "solids" reduce the permeation of UV light into the polymer matrix or any other binder utilized in the production of CHB.

Antimicrobial agents may be defined as secondary feedstocks designed to prevent the growth of bacteria, microbes, and other organic growth that may reduce the effective lifetime of the finished CHB product 300. In a preferred embodiment, an antimicrobial additive is applied to the coextruded extrudate sheet after extrusion. However, some embodiments of the finished CHB product 300 may comprise antimicrobial additives that are added during the extrusion process. In a preferred embodiment, metal nanoparticles may be used as a secondary feedstock that act as an antimicrobial agent and may be added to the hemp feedstock and binder material 107C during the extrusion process. Metal nanoparticles that may act as an antimicrobial added during the extrusion process include, but are not limited to, Zinc Omadine, Silver (Ag), gold (Au), titanium oxide (TiO2), copper oxide (CuO), zinc oxide (ZnO), magnesium oxide (MgO), or any combination thereof. Colorants may be added during the extrusion process to assist with the identification of a finished CHB product 300, reduce the number of labor steps during construction, increase thermal stability, etc. For example, by adding a colorant to the finished CHB product 300 to impart a neutral color, it may reduce the amount of time required to paint since the color may eliminate the need for a primer coating. In some instances, the addition of a colorant to the finished CHB product 300 may obviate the need to paint all together. For example, the addition of titanium dioxide to the finished CHB product 300 optimized for wallboard may impart a white color on the finished CHB product 300, resulting in wallboard that does not need painting after installation except to hide seems and fasteners. Further, some colorants may provide multiple benefits. For instance, the addition of carbon black may color the finished CHB product 300 black as well as increase thermal stability and impart antistatic properties. The addition of bio-carbon may even allow the finished CHB product 300 to act as a carbon sink.

Secondary feedstocks in the form of materials obtained from various waste streams may also be used as secondary feedstocks. By including materials from industrial/residential waste streams, a finished CHB product 300 may have a reduced cost and a positive environmental impact. In a preferred embodiment, materials obtained from waste streams and used as secondary feedstocks include, but are not limited to, wood fines, bio-carbon, gypsum, glass, post-consumer/industrial plastics, or any combination thereof. The use of post-consumer/industrial plastic may be particularly useful for a finished CHB product 300 optimized for applications in which slight reductions in physical and mechanical properties due to the degradation of the polymeric material are acceptable. Finished CHB products 300 possessing a plurality of foamed layers may be created using various combinations of these waste streams to create a customized finished CHB product 300 optimized for wallboard. For example, a first foamed layer of a finished CHB product 300 optimized for wallboard may comprise 5% by volume hemp feedstock, 2% by volume wood fines, 5% by volume recycled gypsum, 2% by volume recycled glass, 1% by volume bio-based carbon, and 80% by volume post-consumer plastic, and 5% virgin thermoplastic, whereas a second foamed layer may comprise 20% by volume hemp feedstock, 20% by volume recycled gypsum, and 60% by volume virgin plastic. The second layer 302 could serve as the outward facing layer since the foamed layer comprising virgin plastic will have superior mechanical/physical properties. In addition, a paper layer may be adhered to the outward facing layer of the finished CHB product 300 optimized for wallboard during post-extrusion processing, resulting in a finished CHB product 300 optimized for wallboard that looks similar to conventional drywall but possesses improved durability as well as improved acoustical, insulative, and hygroscopic properties. Flame retardants, antimicrobial agents, and other additives may be applied to the coextruded extrudate sheet during processing via the downstream extrusion arrangement to increase the performance of the finished CHB product as well as to allow the finished CHB product to conform with national, regional, and/or local building codes, as required. Additionally, this finished CHB product 300 optimized for wallboard will be an environmentally superior product compared to that of conventional drywall by using hemp feedstocks and diverse waste streams that in combination can help reduce waste and enhance carbon capture.

The blends using hemp biomass combined with those waste streams can create a variety of composite boards that exceed the standard baseline requirements in a multitude of applications that currently use plywood, particle board, MDF, fiber board, ceiling tiles, block board, hard board, insulation board, and OSB. Where a market exists for these types of manufactured wood-based boards, there is little inherent flexibility in their manufacture, and almost no flexibility in their material composition due to their need to be mass produced using very capital-intensive processes. Finished CHB products 300 have a significant advantage over OSB and other wood-based construction boards because of its low-cost material composition and manufacturing processes. Importantly, the component mix of the extrudate(s) used to create the coextruded extrudate sheet can be altered easily to meet different market requirements. As such, finished CHB products 300 can be a cost-effective alternative to current wood products in all construction applications and additionally for those markets that require customization in addition to enhanced performance.

Chemical treatments that may be used to treat the hemp feedstocks to change structural features of the hemp feedstocks include, but not limited to, NaOH, polyethyleneimine, $Na_2SO_4$, and $Ca(OH)_2$. Chemically altering structural features of the hemp feedstocks may modify certain properties, such as hydrophilicity, and improve the flame-retardant properties of the resulting hemp-based composite. For example, the addition of phosphorous to the hemp enhances the limiting oxygen index (LOI) of hemp-based composites, resulting in a decreased rate of heat release and increase in its resistance to combustion. Additional treatment with phosphines can enhance flame retardancy as well. Treatment of hemp feedstocks with water-soluble sulfonic acid derivatives can reduce surface polarity (lowering water solubility) of the hemp feedstocks in addition to improving thermal stability, resulting in a stronger hemp-polymeric matrix and higher flame resistance.

Additionally, depending on the type of binder material 107C used, weak bonding between the hydrophilic hemp feedstocks and a hydrophobic binder material 107C may result in a weaker hemp-binder matrix. Therefore, in some embodiments, hemp feedstocks may need chemical treatment to enhance bonding in any resulting fiber-binder matrix interface of the composite material. Chemical treatment of the hemp feedstocks may be particularly useful when said chemical treatments additionally reduce hydrophilicity of said feedstocks. When chemical treatment to reduce hydrophilicity and increase bonding between the feedstock and binder material 107C is combined with the use of a nonpolar binder material 107C (such as polyethylene (PE), polypropylene (PP), and polystyrene (PS)), the resulting finished CHB product 300 may be particularly water resistant. As such, some preferred embodiments of the finished CHB product 300 contain at least 30% of a nonpolar binder material 107C and no more than 70% hemp feedstock. At least part of said hemp feedstock has been chemically treated to increase binding between it and the nonpolar binder material 107C as well as to reduce the hydrophilicity of the hemp feedstock. Chemical treatments that may be used to increase bonding between the hemp feedstocks include, but are not limited to, maleic anhydride and stearic acid.

Tables 1-9 illustrate various compositions, board/layer thicknesses, and layer compositions of finished CHB products 300 optimized for use as floor board, roof board, exterior walls, interior walls, fencing, and decking. Tables 1-9 further describe key additives that may be added to each layer as well as features that may be added when ejected from the manifold and/or added via the downstream extrusion arrangement 115 that can further increase performance of the finished CHB product 300. Tables 1 and 2 illustrate embodiments of finished CHB products 300 optimized for use as wall board with board thicknesses ranging from ½" to 4". Tables 3-5 illustrate embodiments of finished CHB products 300 optimized for use as floor board with board thicknesses ranging from ⅝" to 1⅛". Tables 6 and 7 illustrate embodiments of finished CHB products 300 optimized for use as roof board with board thicknesses ranging from ⅝" to ¾". Tables 8 and 9 illustrate embodiments of CHB optimized for use as decking and fencing with board thicknesses of 1½".

Though Tables 1-9 illustrate several ways in which coextruded layers may be combined to create a finished CHB product 300, other layer combinations may be used without departing from the inventive subject matter described herein. For example, Table 1 provides embodiments of finished CHB products 300 optimized for use as wallboard and comprising two or more layers containing 40% to 95% binder material 107C and 5% to 60% hemp feedstock. However, other embodiments of finished CHB products 300 optimized for use as wallboard may comprise 70% or more hemp feedstock and 30% or less binder material 107C without departing from the inventive subject matter described herein. For example, a first non-foamed layer containing 40% hemp feedstock by volume and 60% binder material 107C by volume; a second foamed layer containing 65% hemp feedstock by volume and 35% binder material 107C by volume; and a third non-foamed layer containing 40% hemp feedstock by volume and 60% binder material 107C by volume, though not disclosed in Table 1, is fully encompassed by the inventive subject matter described herein. For example, though not disclosed in Tables 3-5, a finished CHB product 300 optimized for use as floor board and comprising four or more layers of variable thickness is fully encompassed by the inventive subject matter described herein. As such, Tables 1-9 provide basic guidelines for creating a finished CHB product 300 to suit a particular purpose but cannot encompass every potential combination that may be used to create finished CHB products 300.

One skilled in the art will understand that physical characteristics of the finished CHB product 300 may change based on several factors, including the type of extrusion process used, board thickness of the finished CHB product 300, the number of layers of the finished CHB product 300, how secondary feedstocks interact with the hemp-binder matrix, whether the feedstocks are virgin or recycled materials, percentages of feedstocks used, structural characteristics of the feedstocks (such as length and diameter), etc. Tables 1-9 contain several embodiments of finished CHB products 300 and are representative of the noted characteristics of these positive combinations. Due to the process of manufacture of traditional construction materials, finished CHB products 300 inherently possess superior physical characteristics in comparison.

Finished CHB products 300 will be lighter and possess superior physical characteristics to OSB, plywood and gypsum-based drywall when optimized for exterior walls and interior walls. For example, as illustrated in Table 1, a finished CHB product 300 optimized for use as exterior sheathing may comprise a first non-foamed layer containing 50% hemp feedstock by volume and 50% binder material 107C by volume and a second foamed layer containing 20% hemp feedstock by volume and 80% binder material 107C by volume. The resulting WB1 could be installed in a way such that the more water resistant first layer 301 faces the exterior of a structure whereas the more insulative second layer 302 faces the interior of the structure. When compared to traditional OSB, WB1 would provide superior moisture-resistance, mold-resistance and pest-resistant qualities to the structure due to the high binder material 107C containing first layer 301 as well as provide superior insulative properties due to the higher R-value of the foamed second layer 302. For example, as illustrated in Table 2, a finished CHB product 300 optimized for use as interior walls may comprise a first non-foamed layer of approximately 50% by volume hemp feedstock and 50% by volume non-polar, virgin polymer binder and a second foamed layer of approximately 20% by volume hemp feedstock and 80% by volume non-polar, virgin polymer binder extruded on top of an insulated construction board, which serves as a third layer 303. A fourth layer of approximately 50% by volume hemp feedstock and 50% by volume natural binder material 107C may be extruded onto the opposite side of insulated construction board to create WB10, a highly insulated, water-resistant, construction board possessing superior acoustical deadening qualities. There is currently no comparable construction material to WB10, and this is only possible due to the unique extrusion process used to create the finished CHB products 300 described herein.

Neither OSB nor plywood can match the performance of the finished CHB products 300 optimized for floor board as disclosed in Tables 3-5. Furthermore, as the board thickness increases, a higher percentage of hemp feedstock may be used with a lower percentage of binder material 107C to achieve similar superior physical properties when compared to that of OSB and plywood. This may reduce the cost of finished CHB products 300 optimized for flooring as well as impart more wood like qualities. In addition, non-foamed finished CHB products 300 containing a total of ~40% or more hemp feedstock by volume will be lighter than the traditional construction material equivalent. Finished CHB products 300 comprising foamed layers can possess as little as 5% hemp feedstock and be lighter than its equivalent traditional construction material. For example, a 4'×8' sheet of a finished CHB product 300 optimized for floorboard comprising a first layer 301 containing 50% hemp feedstock by volume and 50% binder material 107C by volume and a second foamed layer comprising 60% hemp feedstock by volume and 40% binder material 107C by volume will be significantly lighter than a traditional OSB or plywood board of the same size. This could greatly reduce shipping costs of construction materials over long distances as well as reduce the physical burden of installation.

Finished CHB products 300 will almost always possess superior physical properties when compared to equivalent OSB or plywood roof board products. For example, as illustrated in Table 6, a finished CHB product 300 optimized for use as low-profile roof board may comprise a first non-foamed layer containing 40% hemp feedstock by volume and 60% binder material 107C by volume; a second non-foamed layer containing 50% hemp feedstock by volume and 50% binder material 107C by volume; and a third non-foamed layer containing 40% hemp feedstock by volume and 60% binder material 107C by volume. The resulting finished CHB product 300 (RB3) possesses superior moisture resistance, thermal/hydraulic stability, edge strength, stiffness, impact strength, and sound deadening properties when compared to that of OSB and plywood. As the board thickness of roof board increases, the finished CHB products 300 embodied in Tables 6-7 will continue to possess superior physical properties when compared to that of OSB or plywood having a similar thickness. Each layer preferably contains between 15% to 70% by volume of hemp feedstock, depending on the target application and board thickness. For example, in cold climates, thermoplastics will become more brittle as the temperature approaches freezing (and falls below freezing), so a finished CHB product 300 comprising a higher amount of hemp feedstock may be more desirable. By increasing the impact strength through either a reduction in the total hemp loading or by increasing the amount of the impact modifier, or both, an extruded board can be created that can handle cold temperature environments with greater impact resistance. Selection of the thermoplastic binder will affect the CHB's performance in cold temperatures based on the application in addition to the above. Additionally, woven materials may be incorporated into a finished CHB product 300 as a substrate layer as a way of increasing the impact strength of the finished CHB product 300. For instance, a plurality of fiberglass mesh screen substrates (such as woven roving) may be incorporated into the finished CHB product 300 to not only increase the impact factor of the finished CHB product 300 but also increase the board's resistance to pests. Additionally, hemp bast fiber, in a woven fabric or non-woven format may be used in the same fashion, as well as a hemp bast fiber and fiberglass combination, or hemp bast fiber and aramid fiber combination, or any blend of the sort to achieve differing levels of performance.

In a preferred embodiment, hemp and/or aramid fiber layers, or blends, would be extruded into the CHB to increase strength of tensile properties, and increase penetration properties when deployed in difficult military or law enforcement environments. When combined with UHMWPE (ultra-Ultra High Molecular Weight Polyethylene) in multiple layers and at a specified thickness to achieve the strictest NIJ levels of performance, these CHB boards would provide significant projectile protection as well as ancillary shrapnel from an intentional or unintentional explosion and potentially saving human disfigurement and human lives. These CHB composite boards would be beneficial for use in military, military housing, law enforcement posts, government buildings both domestic and foreign, and even in private citizen homes.

Further, the finished CHB products 300 illustrated in Tables 8 and 9 may be expected to perform better as decking and/or fencing than wood boards due to a higher water/pest resistance. More consistent "grain," resulting from the dispersive mixing, disruptive mixing, and fiber/chain alignment, should also reduce the likelihood of warping that boards used for decking and fencing are often prone to experiencing. For example, as illustrated in Table 9, a finished CHB product 300 optimized for use as decking may comprise a first non-foamed layer containing 60% hemp feedstock by volume and 40% binder material 107C by volume; a second non-foamed layer containing 50% hemp feedstock by volume and 50% binder material 107C by volume; and a third non-foamed layer containing 60% hemp feedstock by volume and 40% binder material 107C by volume. The resulting finished CHB product 300 (DFB8) possesses superior moisture resistance, thermal/hydraulic stability, edge strength, stiffness, UV resistance due to solids, and impact strength when compared to that of traditional treated lumber even without the addition of a secondary feedstock.

Moreover, the addition of a pattern 11200 may be used to simplify installation and/or increase the rate in which the finished CHB product 300 may dissipate heat. For example, a finished CHB product 300 optimized for decking and/or fencing may be "scored" in way that creates a complete sheet of decking and/or fencing boards that may be installed simultaneously while providing the look of multiple separate boards, resulting in decreased installation times without a decrease in aesthetics. For example, finished CHB products 300 optimized for fencing may be configured to utilize interlocking edges that may be used to create true privacy fences having interconnected boards/panels. Interlocking edges may also be used with finished CHB products 300 optimized for decking to create a "solid deck" having minimal or no gapping between the boards. For example, a finished CHB product 300 optimized for decking may comprise a pattern 11200 that includes a raised height with a dimpled surface that reduces contact with human feet and other body parts, as illustrated in FIG. 12. The dimpled surface will also increase the overall surface area of the finished CHB product 300, allowing the board to dissipate radiational heat more quickly. Finished CHB products 300 optimized for decking and/or fencing preferably comprise sizes commonly used for decking and/or fencing applications, including, but not limited to, 2"×4", 2"×6", 2"×8", 1"×4", 1"×6", and 1"×8".

In addition, the finished CHB products 300 listed in Tables 1-9 may comprise one or more secondary feedstocks. In some instances, secondary feedstocks may improve the physical properties of the above embodiments. For example, adding $TiO_2$ to the extrudate used to create the first extruded layer of a finished CHB product 300 optimized for interior wallboard will not only impart antibacterial properties into the board but also may reduce construction time by minimizing the amount of painting required after installation. In another example, by adding bio-carbon to the extrudate used to create one or more layers of a finished CHB product 300 will impart antistatic properties into the board while reducing the total carbon footprint of the structure in which the board is incorporated. In yet another example, by adding red phosphorus to the extrudate used to create the exterior layers of a finished CHB product 300 will enhance flame-retardant properties of the board. In yet another example, by combining a percentage of hemp feedstock with an equal percentage of glass fiber in one or more layers, a finished CHB product 300 possessing improved moisture resistance, stiffness, tensile strength, and edge strength properties may be produced. Further, coupling agents may be added to enhance the binding between layers as well as the hemp feedstock and non-polar, virgin polymer binder used to make the extrudates that form the layers, improving edge strength as well as impact strength of finished CHB products 300.

The upstream extrusion arrangement 110 generally comprises one or more hoppers, one or more driers, one or more extruders, and manifold. The feedstocks may be fed by the hopper into the extruder(s) individually or as a blend of dry components. The dryer may be used to dry the feedstocks before being fed to the extruder(s), which will result in the creation of extrudate(s) with a more consistent moisture content. Alternatively, the feedstocks may be dried in another device/section of the system, allowing the hopper heater to simply maintain the moisture content within the dried feedstocks prior to injection into the extruder(s) as well as to maintain a desirable feedstock temperature. The extruder(s) is used to mix the feedstocks under high shear force to create the extrudates(s) used to create the finished CHB product 300. In a preferred embodiment, the extruder(s) generally comprises a motor, gear box operably connected to the motor, screw operably connected to the gear box, barrel, and manifold. The screw is configured to mix the feedstocks within the barrel. Feedstocks are injected into the barrel via a throat of the barrel, wherein the feedstocks are processed into extrudates(s) as it moves through said barrel due to action of the screw.

The extrudates(s) is pushed through an opening of said barrel and into a manifold, which is configured to accept the extrudates(s) from the barrel via an entry channel and distribute said extrudates(s) across a width of a die outlet. The die outlet of the manifold molds the extrudates(s) produced by the extruder(s) into a coextruded extrudate sheet having a desired shape, wherein said desired shape may or may not require further processing via a choker bar, lower lip, flex-lip, and/or machinery of a downstream extrusion arrangement 115 to produce a finished CHB product 300. In a preferred embodiment, coextrusion feed block manifolds, slit manifolds, and multimanifolds may be used to create the coextruded extrudate sheet that is to be shaped into finished CHB products 300. An asymmetrical die outlet may be used to create features such as "tongue and groove," slots, depressions, linear scoring, ridges, waves, thicker or thinner sections, angles, profiles, etc. For example, the asymmetrical die outlet may be configured to mold an extrudates(s) optimized for furniture construction into a finished CHB product 300 having the shape of furniture frame components, which can used to replace plywood or OSB, resulting in furniture that is less expensive to produce and results in lower waste.

In some preferred embodiments, a feed block manifold is used to create the coextruded extrudate sheet where differences in viscosities of the at least two extrudates may be taken advantage of. In a feed block manifold, lower viscosity extrudates may be encapsulated by the higher viscosity extrudates. As such, a higher viscosity extrudate may be designed to comprise a larger volume percentage of hemp feedstock since it can be encapsulated by a lower viscosity extrudate possessing hydrophobic properties. In one preferred embodiment, the higher viscosity extrudate is also blown, resulting in a coextruded polymer having a foamed core. However, in embodiments where encapsulation is not needed and/or desired, a multimanifold is preferably used due to superior flow patterns within the manifold, which may result in fewer defective areas within the final coextruded hemp-based wallboard product.

As previously mentioned, some preferred embodiments of the finished CHB product 300 comprise at least one substrate layer. The substrate preferably comprises a sheet consisting of one or more layers of material. For example, a substrate may comprise a polymer layer having chain link and/or mesh incorporated onto the top and bottom surfaces. The substrate may be moved to the upstream extrusion arrangement 110 (preferably via a plurality of rollers or other means of supplying a substrate), wherein at least one manifold of the upstream extrusion arrangement 110 may be configured to extrude one or more extrudates thereon. For example, an upstream extrusion arrangement 110 comprising two manifolds may create a coextruded extrudate sheet by extruding a first extrudate on a top surface of the substrate and a second extrudate on a second surface of said substrate. The resulting coextruded extrudate sheet may then undergo post-extrusion processing via the downstream extrusion arrangement 115 to produce a finished CHB product 300.

Substrates may be used to create finished CHB products 300 that have properties that are difficult for traditional construction materials to replicate. For example, a finished CHB product 300 configured for exterior sheathing may comprise a lightweight, aluminum mesh layer that further reduces the likelihood of insect infestation. In yet another example, a finished CHB product 300 optimized for interior walls may comprise a first 6" layer of hemp or fiberglass insulation that acts as a substrate for a second coextruded layer containing 50% hemp feedstock by volume and 50% binder material 107C by volume, allowing for the simultaneous installation of wallboard and insulation. In one preferred embodiment, a woven material is used as the substrate between two or more coextruded layers. Incorporation of the woven material will increase the impact factor of the finished CHB product 300 while keeping the increase in weight at a minimum. This not only has the potential to decrease the likelihood of damage caused by hail but depending on the material used could result in a finished CHB product 300 with bullet/shrapnel resistant properties.

In one preferred embodiment, the system may comprise multiple layers that are ordered in a way that forms a coextruded hemp duct board (CHDB) 1605 and/or duct liner, which may be used for commercial and residential HVAC ducting and other air movement applications. CHDB 1605 could be configured to contain all the properties necessary in most ducting applications including, but not limited to, air sealing, insulative, sound deadening, vapor barrier, strength to weight ratio, antimicrobial and mold resistant, and fire resistance. Additionally, by using a flexible, substrate layer in combination with one or more mixed extrudate layers that are coextruded onto said flexible, substrate layer, a rigid but versatile duct board may be created for just about any HVAC application. In addition, the downstream extrusion arrangement may treat the duct board with flame retardants, antimicrobial agents, etc. and/or apply an additional substrate layer to increase the performance of the coextruded duct board product. For instance, a first layer 301 comprising a fabric mat substrate and coextruded layer of water-resistant binder and hemp feedstock may be coated and have a vapor barrier layer applied thereto by the downstream extrusion arrangement.

In one preferred embodiment, a CHDB 1605 may comprise multiple co-extruded layers based on the desired properties of the application in which the CHDB 1605 will be used. Layers that may be used to create the CHDB 1605 include, but are not limited to insulative layers, sound-deadening layers, antimicrobial layers, and laminar flow layers. Foamed coextruded layers may be used to provide insulative and sound-deadening properties as well as provide additional rigidity. Layers including secondary feedstocks could be used to provide some of the properties listed above, such as fire resistance and antistatic properties. In a preferred embodiment, the side of the finished CHB product that is meant to serve as the interior surface layer of ductwork made of CHDB 1605 may be an extruded layer of thermoplastic, thermoset, veil, or natural binder that may or may not include hemp feedstocks. In other preferred embodiments, this interior surface layer may also be loaded with secondary feedstocks, such as carbon black, to add antimicrobial and fire-retardant properties and/or to color the CHDB 1605. For instance, Zinc Omadine may be used as a secondary feedstock within the interior surface layer to prevent bacteria and mold growth in addition to bestowing fire-retardant properties to the interior surface. In other preferred embodiments, an outer surface layer of the CHDB 1605 may comprise a coextruded water-resistant layer. In yet another preferred embodiment, a vapor barrier layer, such as a reflective metallic film, may be incorporated into the board either as part of a substrate or by the downstream extrusion arrangement during post extrusion processing.

In a preferred embodiment, a substrate is used to create CHDB 1605. For instance, a fibrous glass mat may act as a first layer 301 and substrate on which a second foamed layer may adhere, wherein said second foamed layer comprises 10% by volume hemp feedstock, 5% by volume recycled glass, and 85% by volume post-consumer plastic. The resulting coextruded extrudate sheet having two layers may then act as a substrate on which a third fire-resistant layer may adhere, wherein said third fire-resistant layer comprises 30% by volume hemp feedstock, 7% by volume red phosphorus, 8% by volume black carbon, and 55% by volume post-consumer plastic. The resulting co-extruded extrudate sheet having three layers may then be used as a finished product once processed the downstream extrusion arrangement or be used as a substrate to create a four-layer duct board. In another preferred embodiment, CHDB 1605 may include a substrate layer of hemp feedstocks in the form of a woven fabric, or non-woven material as a structural layer in combination with a polymer or natural binder. This layer may be coextruded within the polymer matrix to provide increased flexural modulus and puncture strength.

In a preferred embodiment, the CHDB 1605 may be "scored" in way that allows for consistent and quick construction of ductwork from the CHDB 1605. For instance, a single 8'×8' sheet of CHDB 1605 comprising scores every 3" may be used to construct up to 8' of length a ductwork system that starts as 2'×2'×2' and tapers every 24' down to 1'×6", resulting in minimal waste and precise measurements/cuts. In other preferred embodiments, the CHDB 1605 may comprise a "score and ball" pattern 1607, as illustrated in FIG. 17. Hook ends 1606 of CHDB 1605 comprising a "score and ball" pattern 1607 may be shaped in a way that accommodates the "ball" end of the CHDB 1605, allowing for the CHDB 1605 to rotate therein. By adjusting the size of the opening of the hook end 1606 of the CHDB 1605 and the length of each CHDB 1605, a user may vary the ultimate shape of ductwork created by CHDB 1605 comprising a "score and ball" pattern 1607. In a preferred embodiment, the ultimate shape of ductwork is square, but other shapes of ductwork, including, but not limited to, triangles, pentagons, hexagons, heptagons, and octagons, may be created from CHDB 1605 comprising a "score and ball" pattern 1607 without departing form the inventive subject matter described herein. The downstream extrusion arrangement is preferably used to create the "score and ball" pattern 1607 and/or the hook ends 1606. In a preferred embodiment, the "score and ball" pattern 1607 and/or the hook end 1606 features may be incorporated into the final CHDB 1605 via methods including, but not limited to, planing, cutting, milling, routing, or any combination thereof.

In some preferred embodiments, a finished CHB product 300 may be optimized for police, military, schools, prisons, and home defense. Finished CHB products 300 optimized for these particular applications may incorporate various protection features in one or more of the layers that make up the co-extruded extrudate sheet. For instance, a finished CHB product 300 having one or more substrate layers comprised of woven and non-woven aramid fibers or fabric, such as branded Kevlar®, will possess bullet/shrapnel-resistant qualities, which may be used for most police, school, prison, and home defense applications. For instance, for military applications, a finished CHB product 300 possessing a combination of woven Kevlar® fabric and/or steel plate substrate layers may provide a very high level of bullet/shrapnel-resistant qualities. The addition of a fire retardant and a blown layer will increase the finished CHB product's 300 resistance to combustion-based attacks. For instance, for applications where rioting within a structure is a risk, a finished CHB product 300 comprising a substrate layer having a plurality of electrodes and an insulative layer comprising carbon may be used to assist with the control of unruly crowds. The electrodes would be configured to shock rioters when said rioters contact the electrodes, and the insulative layer would prevent the charge from being carried to parts of the structure that may otherwise be undesirable.

In other preferred embodiments, the finished CHB product 300 may be optimized for solar energy capture. For example, a photovoltaic backsheet may be extruded to create a substrate on which photovoltaic circuitry may be added. Once incorporated into the backsheet, an encapsulation layer may be extruded onto the circuitry and backsheet so that the circuitry is protected from the elements. Once encapsulated, photovoltaic cells may be incorporated into the encapsulated circuitry, wherein additional circuitry and encapsulation layers may be incorporated into the coextruded solar cell until the desired cell is achieved. Types of solar panels this method may be used to create include, but are not limited to, silicon, perovskite, gallium arsenide, etc. Finished CHB products 300 optimized for solar applications may be incorporated into building structures as alternatives to traditional construction materials. For instance, a finished CHB product 300 optimized for solar roofing may be configured to be installed over traditional roofing and capture solar energy.

The die outlet may be configured to create patterns 11200 as the extrudate is ejected from the die outlet to form the extrudate sheet. For example, the die may be configured to output an extrudate sheet comprising a plurality of micronized grooves on at least one of the surfaces, wherein the microgrooves increase adhesion of a finishing coating or adhesive, such as laminates, paper, films, paint, tar, wax, glue, or any combination thereof. In other embodiments, a router may be used to create channels 405 within the extrudate sheet. Patterns 11200 that may be implemented into the extrudate sheet via the die include, but are not limited to, micronized grooves, popcorn, orange peel, knockdown, sand swirl, slap brush, and comb. The die may also be configured to produce an extrudate sheet comprising at least one molded shape 805. In one preferred embodiment, the at least one molded shape 805 is located on one or more edges of the extrudate sheet. For example, as illustrated in FIG. 11, an extrudate sheet optimized for wallboard may comprise an architectural molding on one edge and a flat surface on the other edge, wherein the architectural molding formed by the die as the extrudate is extruded to form the extrudate sheet. Molded shapes 805 that may be implemented into the extrudate sheet via the die include, but are not limited to, base architectural molding, ceiling molding, crown architectural molding, and corner architectural molding.

The die may also be configured to produce a coextruded extrudate sheet comprising at least one molded shape 805. In one preferred embodiment, the at least one molded shape 805 is located on one or more edges of the coextruded extrudate sheet. For example, as illustrated in FIG. 11, a coextruded extrudate sheet optimized for wallboard may comprise an architectural molding on one edge and a flat surface on the other edge, wherein the architectural molding formed by the die as extrudates(s) is extruded to form the coextruded extrudate sheet. Molded shapes 805 that may be implemented into the coextruded extrudate sheet via the die include, but are not limited to, base architectural molding, ceiling molding, crown architectural molding, and corner architectural molding.

Additionally, a finished CHB product 300 may be optimized as ordered components that make up a structure and/or frame. Due to the die outlet and processing via the downstream extrusion arrangement 115, finished CHB products 300 in the form of ordered components may take on shapes that traditional construction materials may not easily accommodate, allowing for easy assembly of whatever the finished CHB products 300 in the form of ordered components is configured to make. In a preferred embodiment, ordered components may be used to produce framing for furniture, such as the framing of a sofa or loveseat. In another preferred embodiment, ordered components may be optimized to create entire building structures. A plurality of ordered components optimized for the creation of building structures are preferably configured to fit together in a very specific manner and may comprise finished CHB products 300 optimized for beams, exterior sheathing, wallboards, roof boards, flooring, floor underlayment, fencing, decking, and other construction boards required for construction of a building structure.

In a preferred embodiment, the building structure created by ordered components optimized for the creation of building structures is a shelter. As such, ordered components optimized for the creation of building structures may be extruded, molded, and processed to fit together in such a way that an emergency shelter could be constructed in a relatively quick timeframe when compared to emergency structures built using traditional construction materials. In less time-sensitive examples, ordered components optimized for the creation of building structures may be configured to fit together in a way such that they form commercial structures and/or residential structures. This would result in more affordable, durable, weather resistant, and environmentally friendly commercial and/or residential structures than what are currently available today. In yet another preferred embodiment, ordered components optimized for the creation of building structures may be configured to fit together in a way such that a modular building is formed. Modular buildings that may be created by ordered components optimized for the creation of building structures include, but are not limited to, modular homes, portable offices, mobile hospitals, and/or portable classrooms.

In a preferred embodiment, ordered components are provided in "kit form", wherein a CHB structure kit includes all of the components necessary for erecting a building structure. For instance, an CHB structure kit optimized for the creation of an emergency structure may comprise a plurality of finished CHB products 300 and fasteners that allow for the emergency structure to be quickly erected, utilized during the emergency, deconstructed, and returned to kit form. Additionally, these kits may utilize a "dowel and hole" method for quick erection where the panels, beams, boards, etc. may have factory drilled holes to accept dowels to allow for quick erection and quick disassembly using a minimal amount of non-powered hand tools in areas that are in a state of disarray or loss of power due to a natural disaster or lack of general power availability. The CHB structure kit optimized for the creation of an emergency structure may then be erected in another location if necessary. For instance, after a hurricane, an emergency service provider having a plurality of CHB structure kits configured to provide emergency shelter could be quickly assembled so that victims of the natural disaster have protection from the elements. Once the emergency has passed, the CHB structure kits may be deconstructed and made ready for deployment during the next natural disaster. For instance, a mobile hospital servicing poor, rural areas may assemble CHB structure kits configured to provide mobile hospital facilities. After servicing the poor, rural community, the CHB structure kits may be deconstructed and made ready for deployment in the next poor, rural community. Because the CHB boards are highly water resistant, and as such more durable and less prone to potential mold and mildew complications, they are suitable for a wide multitude of environments.

The thickness of a finished CHB product 300 is preferably determined by the manifold and the downstream extrusion arrangement 115. The board thickness of the finished CHB product 300 is preferably between ½" and 4"; however, the manifold and downstream extrusion arrangement 115 may create other board thicknesses without departing from the inventive subject matter described herein. The thickness of the board may be specific to the application, wherein the feedstocks to make the finished CHB product 300 may also be specific for a particular application. For example, a finished CHB product 300 optimized for roof board and containing 30% low temperature epoxy in total by volume binder and 70% hemp feedstock in total by volume may require a total board thickness of ⅝". In another example, a finished CHB product 300 optimized for subflooring and containing 40% thermopolymer binder in total by volume and 60% hemp feedstock in total by volume may require a total board thickness of ²³⁄₃₂". In yet another example, a finished CHB product 300 optimized for interior walls and containing 50% natural binder in total by volume and 50% hemp feedstock in total by volume may require a total board thickness of ⁷⁄₁₆". In yet another example, a finished CHB product 300 optimized for exterior sheathing and containing 60% thermoset binder in total by volume and 40% hemp feedstock in total by volume may require a total board thickness of only ½". The examples set forth are representations of blends that could perform in multiple applications or uses based on the final blend and desired thickness and may be modified to meet a certain requirement in performance based on a number of economic (performance versus cost), or other required attributes.

As illustrated in FIGS. 3 and 4, the finished CHB product 300 preferably comprises a top surface, bottom surface, and a plurality of sides. Once the coextruded extrudate sheet has been pushed through the die outlet, it may be further shaped and gradually cooled by the downstream extrusion arrangement 115. In a preferred embodiment, the downstream extrusion arrangement 115 comprises a plurality of rollers, heater/coolers, cutters, molders, sanders, painters, and stacker. Initial sizing past the manifold may be accomplished via the plurality of rollers that compress the coextruded extrudate sheet to the desired thickness and/or corrugate the coextruded extrudate sheet with a desired texture. In another preferred embodiment, a series of polishing rollers may be used to achieve a finished CHB product 300 that has a surface finish with low variability, which may allow for a more consistent application of a secondary finish or coating, such as paint and tar. In some embodiments, heated rollers may be used to keep the temperature of the coextruded extrudate sheet high enough such that the coextruded extrudate sheet remains pliable throughout much of the post extrusion process. This may allow for further sizing, compression, and compaction of the coextruded extrudate sheet until a desired finished CHB product 300 is produced. In some preferred embodiments, a plurality of water-cooled rollers or a cooling tank may be used to cool the coextruded extrudate sheet once it has been shaped and/or patterned. When the coextruded extrudate sheet has cooled beyond a "pliable or malleable state", further processing may be accomplished via planing, sanding, routing, cutting, or any combination thereof.

In one preferred embodiment, rollers and/or a post-curing processing methods may be used to form patterns 11200 on one or more surfaces of the coextruded extrudate sheet while it is still pliable. In some embodiments, patterns 11200 created by rollers and/or a post-curing processing methods may be implemented on the surfaces in addition to patterns 11200 created by the die. For example, the die may be configured to create a coextruded extrudate sheet having a knockdown pattern 11200 on one or more surfaces of the coextruded extrudate sheet whereas the rollers may be configured to add a plurality of micronized grooves to one or more surfaces of the coextruded extrudate sheet. Patterns 11200 that may be implemented into the coextruded extrudate sheet via the rollers and/or post-curing processing methods include, but are not limited to, micronized grooves, popcorn, orange peel, knockdown, sand swirl, slap brush, and comb.

Rollers and/or a post-curing processing methods of the downstream extrusion arrangement 115 may also be configured to produce a coextruded extrudate sheet comprising at least one molded shape 805. Molded shapes 805 may be formed by the rollers and/or post-curing processing methods either with the output direction of the die or perpendicular with the output direction of the die. For example, as illustrated in FIG. 11, a coextruded extrudate sheet may be shaped by the rollers into a single piece having a plurality of architectural molding shapes in a single piece and perpendicular to the output direction of the die. Molded shapes 805 that may be implemented into the coextruded extrudate sheet via the die include, but are not limited to, base architectural molding, ceiling molding, crown architectural molding, and corner architectural molding. Where the coextruded extrudate sheet has cooled beyond a "pliable or malleable state", further processing may be accomplished by several finishing processes, including, but not limited to, planing, sanding, cutting, routing, scoring or any combination thereof.

A planer and/or sander may be used to size the coextruded extrudate sheet to its final thickness, width, and/or length. Additionally, the use of a planer, sander, router, etc. may be used to transform the sides of the coextruded extrudate sheet into interlocking edges. As illustrated in FIGS. 3A-3C, the finished CHB product 300 may comprise a first edge 305A and second edge 305B configured to interlock with one another. In a preferred embodiment, a plurality of finished CHB boards may be fitted together using locking edges, wherein a first edge 305A of a first finished CHB boards 300A is configured to interlock with a second edge 305B of a second finished CHB boards 300B. The plurality of edges of the finished CHB boards is preferably "tongue and groove" style, which allows for the first finished CHB boards 300A to interlock with the second finished CHB boards 300B, as illustrated in FIG. 3A. In another preferred embodiment, the locking edges of the finished CHB boards may be comprise a notch and groove style edge as depicted in FIGS. 3B and 3C, which may allow for easier installation when compared to other locking edge styles. The finished CHB board used for construction is generally rectangular in shape, as depicted in FIGS. 3A, 3B, 4, 6, 7, and 8; however, in other preferred embodiments, the finished CHB product 300 may comprise abstract shapes that allow for the interlocking of the finished CHB product 300 in multiple directions to create a more structurally stable structure, as depicted in FIGS. 3C and 5.

In some embodiments, the planer, sander, router, etc. may be used to create texture to increase bonding of laminates, paper, films, paint, tar, wax, glue, or any combination thereof. In other embodiments, a router may be used to create channels 405 within the coextruded extrudate sheet. The channels 405 are preferably located on the bottom surface of the coextruded extrudate sheet and sized in a way such that electrical hardware, plumbing, and radiant heating 705 may installed in the channels 405. The arrangement of the channels 405 may be the same for each finished CHB product 300 or may comprise a plurality of patterns 11200 that may be mixed and matched to create a custom channel. For example, a finished CHB product 300 optimized for use with electrical hardware may comprise a plurality of perpendicular channels 405 that allow for the routing of electrical wiring through said finished CHB product 300. In another example, a finished CHB product 300 optimized for use with radiant heating 705 may comprise different channels 405 that may be aligned in a way that allows a user to create a custom route for a custom, radiant flooring system through said finished CHB product 300. In embodiments of a finished CHB product 300 that are to be used for radiant heating 705, the board thickness of at least ½ inch is preferable so that the finished CHB product 300 can accommodate the plumbing required for the radiant heating system.

In one preferred embodiment, an inline cutting device may be used to cut the coextruded extrudate sheet to the desired length. The inline cutting device may also be used to cut more intricate shapes into the coextruded extrudate sheet, such as slots, holes, custom angles, edges, and fastener points. In a preferred embodiment, the inline cutting device comprises at least one of reciprocal blades, wheels, knives, laser, water, or CNC type cutting. For right-angled smooth cuts, it is essential to select the correct saw speed and blade for the polymer used and the thickness of the coextruded extrudate sheet. After cutting, the resulting finished CHB product 300 is lifted by a stacker and stacked. Alternatively, the stacker may move the finished CHB product 300 to a conveyor where it may be at least one of primed, painted, chemically treated, corona treated, edge coated, laser etched, laminated, tarred or any combination thereof. In embodiments comprising a coextruded extrudate sheet having layers of multiple colors, planing, sanding, cutting, routing, and scoring may be used to create unique pattern 11200/color combinations that is not achievable in traditional construction boards.

As illustrated in FIG. 13, an optional fastener 1300 may be used to fasten the finished CHB product 300 to a structure. The optional fastener 1300 preferably comprises a cylindrical body 1310 comprising a trailing end, advancing end, and proximal portion having plurality of barbs 1315. As illustrated in FIG. 13, the head 1305 of the optional fastener 1300 is located at the trailing end and generally has a larger radius than the plurality of barbs 1315 located on the proximal portion. In other embodiments, the head 1305 of the optional fastener 1300 may have a radius equal in size to the radius of the plurality of barbs 1315 in instances where a more finished product is needed. In some preferred embodiments, the head 1305 of the optional fastener 1300 is not cylindrical in shape. The shape of the head 1305 of the optional fastener 1300 may be rounded, oval, brad, oval countersunk, diamond, duplex, flat, spring, cup, and checkered. Further, the optional fastener 1300 may be optimized for use in a nail gun.

In a preferred embodiment, as illustrated in FIG. 14, the structure in which the optional fastener 1300 is being secured to is a building frame. The proximal portion of the optional fastener 1300 may have a fixed diameter, or it may have a varied diameter. For example, the diameter of the proximal portion having a plurality of barbs 1315 may be larger than the diameter of the proximal portion not having a plurality of barbs 1315. In one preferred embodiment, the proximal portion may end in a tip, wherein the proximal portion is barbed at least three quarters of the way to said tip. This may allow a user to implant an optional fastener 1300 without the need of predrilling a hole into the building frame in which the optional fastener 1300 is to be placed. The plurality of barbs 1315 of the proximal portion may vary in form, angle, and depth, depending on the need. For example, the shape of the plurality of barbs 1315 of an optional fastener 1300 designed for subflooring may have a smaller depth, which may result in less grip to the building frame. In another example, the shape of the plurality of barbs 1315 of an optional fastener 1300 designed for roofing may be more hooklike and the angle may be more acute to allow for stronger grip with the finished CHB product 300.

Some embodiments of an optional fastener 1300 may also comprise a washer 1405. A washer 1405 may be defined as a conical body having a central bore extending longitudinally through the washer 1405 and defined by an inner surface, wherein the diameter of the central bore is no wider than the head 1305 on the trailing end of the optional fastener 1300 in which the washer 1405 is paired. A washer 1405 further comprises an upper end, lower end, outer surface, and inner surface. The optional fastener 1300 may be inserted into a washer 1405 via the central bore. As the optional fastener 1300 is inserted into the finished CHB product 300, the head 1305 of the optional fastener 1300 may come into contact with the surface of the washer 1405 at the upper end. The larger surface area of the washer 1405 may spread the compression force of the optional fastener 1300 over a larger area of the finished CHB product 300, thus decreasing the likelihood that too much pressure is applied to a portion of the finished CHB product 300 in which the optional fastener 1300 is being implanted. In some preferred embodiments of a washer 1405, the material used to create the washer 1405 is flexible to allow for attachment after creation of the optional fastener 1300. Further, some embodiments of the washer 1405 may comprise a water-resistant material such as rubber and silicon which may seal the area in which optional fastener 1300 penetrates into the finished CHB product 300.

Due to the use of recycled materials and sustainable hemp feedstocks, the various finished CHB products 300 described herein will result in a tremendous benefit to the environment when evaluated through a life cycle analysis (LCA). Finished CHB products 300 under LCA will show that by using sustainable hemp feedstocks, reclaimed "waste" materials from construction and manufacturing processes, reduced shipping weights, and streamlined processing will dramatically offset the carbon offenses in the construction industry, and provide permanent carbon sequestration opportunities that currently do not exist today in available solutions. Additionally, the finished CHB products 300 described may include carbonized materials by way of secondary feedstocks, allowing for high carbon sequestration crops, such as hemp and/or bamboo, to be grown and turned into bio-carbon via pyrolysis before incorporation into the finished CHB products 300 as a carbon sink. As such, when compared with traditional construction materials, the LCA will show that the finished CHB products 300 described herein are not only superior in terms of carbon capture, lifespan, and physical properties but are also more sustainable.

Although the systems and processes of the present disclosure have been discussed for use within the construction material field, one of skill in the art will appreciate that the inventive subject matter disclosed herein may be utilized in other fields or for other applications in which hemp-based composites are needed. The implementations set forth in the foregoing description do not represent all implementations consistent with the subject matter described herein. Instead, they are merely some examples consistent with aspects related to the described subject matter. Although a few variations have been described in detail above, other modifications or additions are possible. For example, the implementations described above can be directed to various combinations and sub-combinations of the disclosed features and/or combinations and sub-combinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, materials, and arrangements of the parts and process stages which have been described and illustrated to explain the nature of this inventive subject matter can be made without departing from the principles and scope of the inventive subject matter.

What is claimed is:

1. A coextruded hemp board (CHB) comprising:
at least one flexible, substrate layer configured to accept a mixed extrudate on at least one surface,
   wherein said at least one flexible, substrate layer forms a first layer of a rigid composite board,
   wherein said rigid composite board comprises a bottom surface, top surface, first edge, second edge, upper edge, and lower edge, and
at least one mixed extrudate layer comprising said mixed extrudate,
   wherein said at least one mixed extrudate layer forms one or more additional layers of said rigid composite board,
   wherein said mixed extrudate comprises a binder material and a hemp feedstock that is not coated in a coupling agent,
   wherein each layer of said at least one mixed extrudate layer has a density that is consistent throughout and a concentration of said hemp feedstock that is consistent throughout,
   wherein components of said hemp feedstock comprise hemp hurd and hemp bast fiber,
   wherein said hemp hurd and said hemp bast fiber are separate components of a hemp biomass,
   wherein said hemp hurd is separated from said hemp bast fiber prior to creation of said mixed extrudate,
   wherein said at least one mixed extrudate layer is extruded onto said at least one flexible, substrate layer,
   wherein said mixed extrudate comprises at least 5% of a total volume percentage of a hemp feedstock and no more than 50% of said total volume percentage of said hemp feedstock,
   wherein said mixed extrudate comprises at least 50% of said total volume percentage of binder material,
   wherein said hemp feedstock is substantially encapsulated by said binder material within said mixed extrudate,
   wherein said mixed extrudate is substantially oriented within said binder material in a single output direction of an extruder due to a shear force acting on said mixed extrudate as it was ejected from a manifold.

2. The coextruded hemp board (CHB) of claim 1, wherein said at least one flexible, substrate layer comprises at least one of glass, metal, polymer, or natural material.

3. The coextruded hemp board (CHB) of claim 1, further comprising a first locking feature located on said first edge and that extends from said upper edge to said lower edge,
   wherein said first locking feature is rounded and comprises a diameter that is longer in length than a thickness of said rigid composite board.

4. The coextruded hemp board (CHB) of claim 3, further comprising a second locking feature located on said second edge,
   wherein said second edge is located opposite said first edge of said rigid composite board,
   wherein said second locking feature of said second edge comprises a hook configured to interlock with said first locking feature.

5. The coextruded hemp board (CHB) of claim 3, further comprising two or more "score and ball" patterns aligned parallel to said first edge, wherein cutting said rigid composite board along a score between two balls of said two or more "score and ball patterns" creates said first locking feature.

6. The coextruded hemp board (CHB) of claim 5, further comprising a second locking feature located on said second edge, wherein said second edge is located opposite said first edge of said rigid composite board, wherein said second locking feature of said second edge comprises a hook configured to hold a rounded edge locking feature.

7. The coextruded hemp board (CHB) of claim 1, wherein said at least one mixed extrudate layer has been chemically treated to increase bonding with at least one other layer.

8. The coextruded hemp board (CHB) of claim 1, wherein one or more layers of said at least one mixed extrudate layer is a foamed layer created by said mixed extrudate and a blowing agent, wherein gasses of said blowing agent dissolve into said mixed extrudate prior to ejection from said manifold.

9. The coextruded hemp board (CHB) of claim 1, further comprising at least one of carbon, glass fiber, wood fines, and gypsum in said mixed extrudate, wherein said carbon, glass fiber, wood fines, and gypsum are added to said extruder at a point prior to ejection of said mixed extrudate from said manifold.

10. A coextruded hemp board (CHB) comprising:

at least one flexible, substrate layer configured to accept a mixed extrudate on at least one surface, wherein said at least one flexible, substrate layer forms a first layer of a rigid composite board, wherein said rigid composite board comprises a bottom surface, top surface, first edge, second edge, upper edge, and lower edge, at least one mixed extrudate layer comprising said mixed extrudate, wherein said at least one mixed extrudate layer forms one or more additional layers of said rigid composite board, wherein said mixed extrudate comprises a binder material and a hemp feedstock that is not coated in a coupling agent, wherein components of said hemp feedstock comprise hemp hurd and hemp bast fiber, wherein each layer of said at least one mixed extrudate layer has a density that is consistent throughout and a concentration of said hemp feedstock that is consistent throughout, wherein said hemp hurd and said hemp bast fiber are separate components of a hemp biomass, wherein said hemp hurd is separated from said hemp bast fiber prior to creation of said mixed extrudate, wherein said mixed extrudate comprises at least 5% of a total volume percentage of a hemp feedstock and no more than 50% of said total volume percentage of said hemp feedstock, wherein said mixed extrudate comprises at least 50% of said total volume percentage of binder material, wherein said hemp feedstock is substantially encapsulated by said binder material within said mixed extrudate, wherein said mixed extrudate is substantially oriented within said binder material in a single output direction of an extruder due to a shear force acting on said mixed extrudate as it was ejected from a manifold, and a first locking feature located on said first edge and a second locking feature on said second edge, wherein said first edge of said rigid composite board is located opposite said second edge of said rigid composite board, wherein said first locking feature extends from said upper edge to said lower edge, wherein said second locking feature extends from said upper edge to said lower edge, wherein said first locking feature is rounded and comprises a diameter that is greater than a thickness of said rigid composite board, wherein said second locking feature of said second edge comprises a hook configured to interlock with said first locking feature.

11. The coextruded hemp board (CHB) of claim 10, wherein said at least one flexible, substrate layer comprises at least one of glass, metal, polymer, or natural material.

12. The coextruded hemp board (CHB) of claim 10, further comprising two or more "score and ball" patterns aligned parallel to said first edge and formed on at least one of said top surface or said bottom surface, wherein cutting said rigid composite board along a score between two balls of said two or more "score and ball" patterns creates said first locking feature.

13. The coextruded hemp board (CHB) of claim 10, wherein one or more layers of said at least one mixed extrudate layer is a foamed layer created by said mixed extrudate and a blowing agent, wherein gasses of said blowing agent dissolve into said mixed extrudate prior to ejection from said manifold.

14. The coextruded hemp board (CHB) of claim 10, further comprising at least one of carbon, glass fiber, wood fines, and gypsum in said mixed extrudate, wherein said carbon, glass fiber, wood fines, and gypsum are added to said extruder at a point prior to ejection of said mixed extrudate from said manifold.

15. A coextruded hemp board (CHB) comprising:

at least one flexible, substrate layer configured to accept a mixed extrudate on at least one surface, wherein said at least one flexible, substrate layer forms a first layer of a rigid composite board, wherein said rigid composite board comprises a bottom surface, top surface, first edge, second edge, upper edge, and lower edge, at least one mixed extrudate layer comprising said mixed extrudate, wherein said at least one mixed extrudate layer forms one or more additional layers of said rigid composite board, wherein said at least one mixed extrudate layer forms said bottom surface, wherein said mixed extrudate comprises a binder material and a hemp feedstock that is not coated in a coupling agent, wherein each layer of said at least one mixed extrudate layer has a density that is consistent throughout and a concentration of said hemp feedstock that is consistent throughout, wherein components of said hemp feedstock comprise hemp hurd and hemp bast fiber, wherein said hemp hurd and said hemp bast fiber are separate components of a hemp biomass, wherein said hemp hurd is separated from said hemp bast fiber prior to creation of said mixed extrudate, wherein said mixed extrudate comprises at least 5% of a total volume percentage of a hemp feedstock and up to 50% of said total volume percentage of said hemp feedstock, wherein said mixed extrudate comprises at least 50% of said total volume percentage of binder material, wherein said hemp feedstock is substantially encapsulated by said binder material within said mixed extrudate, wherein said mixed extrudate is substantially oriented within said binder material in a single output direction of an extruder due to a shear force acting on said mixed extrudate as it was ejected from a manifold, and a "score and ball" pattern formed on at least one of said top surface or said bottom surface and aligned parallel to said first edge.

16. The coextruded hemp board (CHB) of claim 15, wherein said at least one flexible, substrate layer comprises at least one of glass, metal, polymer, or natural material.

17. The coextruded hemp board (CHB) of claim 15, further comprising a first locking feature located on said first edge and that extends from said upper edge to said lower edge, wherein said first locking feature is at least partially rounded and comprises a diameter that is greater than a thickness of said rigid composite board.

18. The coextruded hemp board (CHB) of claim 17, further comprising a second locking feature located on said second edge, wherein said second edge is located opposite said first edge of said rigid composite board, wherein said second locking feature of said second edge comprises a hook configured to hold said first locking feature therein.

19. The coextruded hemp board (CHB) of claim 15, wherein said at least one mixed extrudate layer has been chemically treated to increase bonding with at least one other layer.

20. The coextruded hemp board (CHB) of claim 15, wherein one or more layers of said at least one mixed extrudate layer is a foamed layer created by said mixed extrudate and a blowing agent, wherein gasses of said blowing agent dissolve into said mixed extrudate prior to ejection from said manifold.

21. The coextruded hemp board (CHB) of claim 15, further comprising at least one of carbon, glass fiber, wood fines, and gypsum in said mixed extrudate, wherein said carbon, glass fiber, wood fines, and gypsum are added to said extruder at a point prior to ejection of said mixed extrudate from said manifold.

* * * * *